(12) United States Patent
Isoyama et al.

(10) Patent No.: US 11,502,387 B2
(45) Date of Patent: Nov. 15, 2022

(54) ANTENNA, WIRELESS COMMUNICATION DEVICE, WHEEL, TIRE PRESSURE MONITORING SYSTEM, AND VEHICLE

(71) Applicant: KYOCERA Corporation, Kyoto (JP)

(72) Inventors: Shinji Isoyama, Yokohama (JP);
Hiroshi Uchimura, Kagoshima (JP);
Hiroshi Yamasaki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 52 days.

(21) Appl. No.: 16/963,813

(22) PCT Filed: Jan. 7, 2019

(86) PCT No.: PCT/JP2019/000114
§ 371 (c)(1),
(2) Date: Jul. 21, 2020

(87) PCT Pub. No.: WO2019/142679
PCT Pub. Date: Jul. 25, 2019

(65) Prior Publication Data
US 2021/0057799 A1    Feb. 25, 2021

(30) Foreign Application Priority Data

Jan. 22, 2018  (JP) .............................. JP2018-008414

(51) Int. Cl.
*H01Q 1/22*    (2006.01)
*B60C 23/04*    (2006.01)
(Continued)

(52) U.S. Cl.
CPC ....... *H01Q 1/2241* (2013.01); *B60C 23/0408* (2013.01); *H01Q 9/0414* (2013.01); *H01Q 13/08* (2013.01); *H01Q 15/14* (2013.01)

(58) Field of Classification Search
CPC .... H01Q 1/2241; H01Q 9/0414; H01Q 13/08; B60C 23/0408
See application file for complete search history.

(56) References Cited

U.S. PATENT DOCUMENTS

| 6,677,915 B1 | 1/2004 | Yablonovitch et al. |
| 7,352,277 B2 | 4/2008 | Sato |

(Continued)

FOREIGN PATENT DOCUMENTS

| CN | 1658429 A | 8/2005 |
| EP | 3605736 A1 | 2/2020 |

(Continued)

OTHER PUBLICATIONS

Yasutaka Murakami et al., Low-Profile Design and Bandwidth Characteristics of Artificial Magnetic Conductor with Dielectric Substrate, 2015, pp. 172-179, vol. J98-B, No. 2, IEEE, Japan, 8pp.

(Continued)

*Primary Examiner* — Andrea Lindgren Baltzell
*Assistant Examiner* — Amal Patel
(74) *Attorney, Agent, or Firm* — Hauptman Ham, LLP

(57) ABSTRACT

An antenna is installed on an installation surface of a wheel. The antenna includes a first conductor, a second conductor, one or more third conductors, a fourth conductor, and a feeding line. The first conductor and the second conductor face each other in a first axis. The one or more third conductors are located between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected via the third conductor. A surface of the fourth (Continued)

conductor faces the installation surface of the wheel in a second axis perpendicular to the first axis.

17 Claims, 97 Drawing Sheets

(51) Int. Cl.
*H01Q 9/04* (2006.01)
*H01Q 13/08* (2006.01)
*H01Q 15/14* (2006.01)

(56) References Cited

U.S. PATENT DOCUMENTS

| | | | |
|---|---|---|---|
| 2005/0179529 A1* | 8/2005 | Sato | B60C 23/0433 340/445 |
| 2005/0242937 A1 | 11/2005 | Yokoi et al. | |
| 2006/0044118 A1 | 3/2006 | Katou et al. | |
| 2009/0102633 A1 | 4/2009 | Ebinuma et al. | |
| 2010/0277374 A1 | 11/2010 | Ju et al. | |
| 2015/0102965 A1* | 4/2015 | Irci | H01Q 21/28 343/702 |

FOREIGN PATENT DOCUMENTS

| | | |
|---|---|---|
| GB | 2067842 B | 7/1981 |
| JP | H10315720 A | 12/1998 |
| JP | H11321255 A | 11/1999 |
| JP | 2004330842 A | 11/2004 |
| JP | 2005269608 A | 9/2005 |
| JP | 200674369 A | 3/2006 |
| JP | 200759966 A | 3/2007 |
| JP | 2007059966 A * | 3/2007 |
| WO | 2004000579 A1 | 12/2003 |
| WO | 2006003934 A1 | 1/2006 |

OTHER PUBLICATIONS

Yasutaka Murakami et al., Optimum Configuration of Reflector for Dipole Antenna with AMC Reflector, 2015, pp. 1212-1220, vol. 98-B, No. 11, IEEE, 9pp.

Wei Liu et al., "Metamaterial-Based Wideband Shorting-Wall Loaded Mushroom Array Antenna", 2015 9th European Conference on Antennas and Propagation, EURAAP, Apr. 13, 2015, pp. 1-4, XP033212584, 4pp.

* cited by examiner

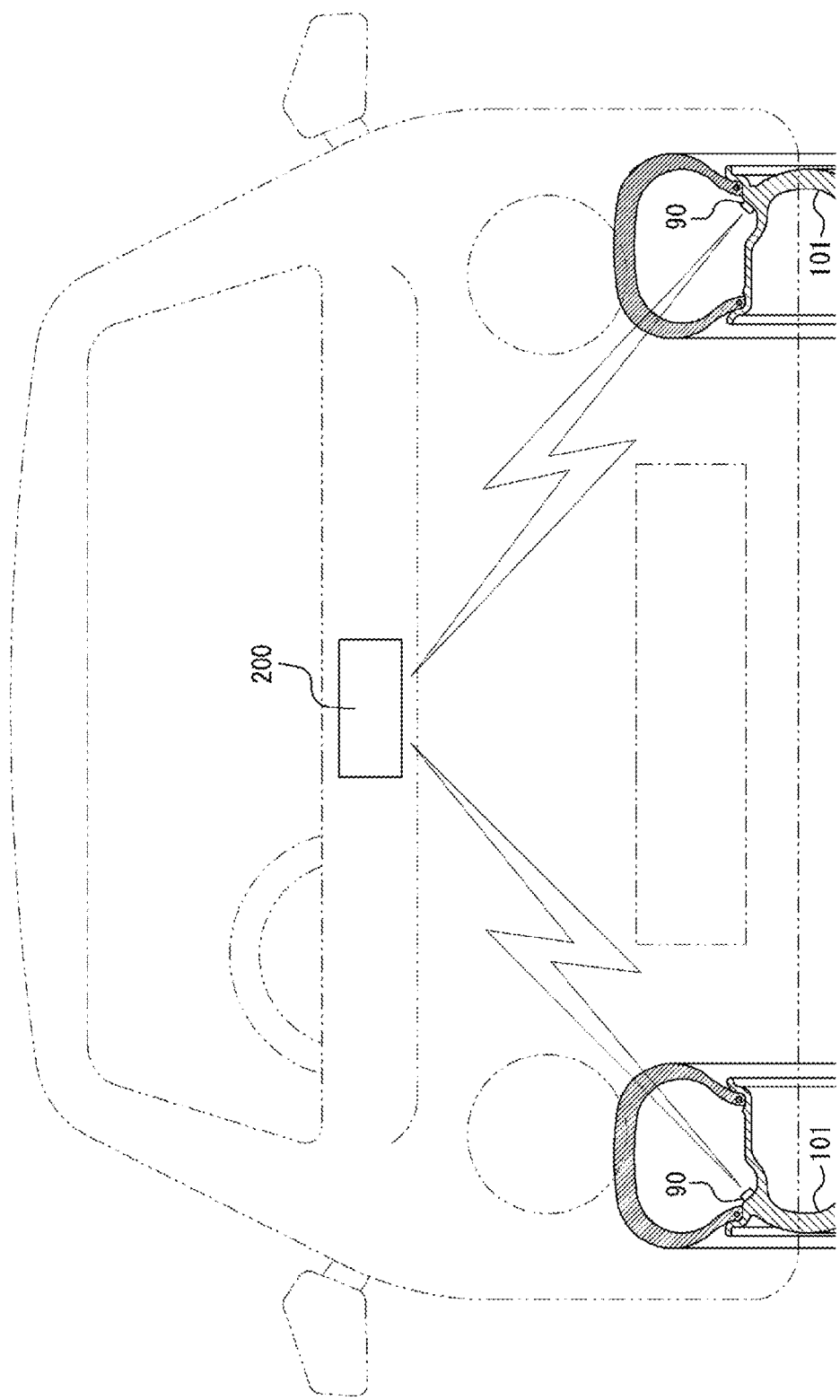

ANTENNA, WIRELESS COMMUNICATION DEVICE, WHEEL, TIRE PRESSURE MONITORING SYSTEM, AND VEHICLE

CROSS-REFERENCE OF RELATED APPLICATIONS

This application is a National Stage of PCT international application Ser. No. PCT/JP2019/000114 filed on Jan. 7, 2019 which designates the United States, incorporated herein by reference, and which is based upon and claims the benefit of priority from Japanese Patent Application No. 2018-008414 filed on Jan. 22, 2018, the entire contents of which are incorporated herein by reference.

FIELD

The present disclosure relates to an antenna, a wireless communication device, a wheel, a tire pressure monitoring system, and a vehicle.

BACKGROUND

Conventionally, a wireless communication technology using an antenna installed on a conductor such as a metal has been known. An electromagnetic wave radiated from the antenna is reflected by a metal conductor. The electromagnetic wave reflected by the metal conductor has a phase shift of 180°. The reflected electromagnetic wave is combined with the electromagnetic wave radiated from the antenna. The electromagnetic wave radiated from the antenna may have a small amplitude due to the combination with the electromagnetic wave having a phase shift. As a result, the amplitude of the electromagnetic wave radiated from the antenna becomes small. An influence of the reflected wave is reduced by setting a distance between the antenna and the metal conductor to be ¼ of a wavelength λ of the radiated electromagnetic wave.

On the other hand, there has been proposed a technology for reducing the influence of the reflected wave by using an artificial magnetic conductor. This technology is described in Non Patent Literatures 1 and 2, for example.

CITATION LIST

Non Patent Literature

Non Patent Literature 1: Murakami et al., "Low-profile design and band characteristic of artificial magnetic conductor using dielectric substrate", IEICE (B), Vol. J98-B No. 2, pp. 172-179

Non Patent Literature 2: Murakami et al., "Optimized configuration of reflector for dipole antenna with AMC reflection board" IEICE (B), Vol. J98-B No. 11, pp. 1212-1220

SUMMARY

An antenna according to an aspect of the present disclosure is installed on an installation surface of a wheel. The antenna includes a first conductor, a second conductor, one or more third conductors, a fourth conductor, and a feeding line. The first conductor and the second conductor face each other in a first axis. The one or more third conductors are located between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected via the third conductor. A surface of the fourth conductor faces the installation surface of the wheel in a second axis perpendicular to the first axis.

A wireless communication device according to an aspect of the present disclosure is installed on an installation surface of a wheel. The wireless communication device includes an antenna. The antenna includes a first conductor, a second conductor, one or more third conductors, a fourth conductor, and a feeding line. The first conductor and the second conductor face each other in a first axis. The one or more third conductors are located between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected via the third conductor. A surface of the fourth conductor faces the installation surface of the wheel in a second axis perpendicular to the first axis.

A wheel according to an aspect of the present disclosure includes an antenna. The antenna includes a first conductor, a second conductor, one or more third conductors, a fourth conductor, and a feeding line. The first conductor and the second conductor face each other in a first axis. The one or more third conductors are located between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected via the third conductor. A surface of the fourth conductor faces the installation surface of the wheel in a second axis perpendicular to the first axis.

A tire pressure monitoring system according to an aspect of the present disclosure includes a first wireless communication device and a second wireless communication device. The first wireless communication device is installed on an installation surface of a wheel. The first wireless communication device includes an antenna and an air pressure sensor. The antenna includes a first conductor, a second conductor, one or more third conductors, a fourth conductor, and a feeding line. The first conductor and the second conductor face each other in a first axis. The one or more third conductors are located between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected via the third conductor. A surface of the fourth conductor faces the installation surface of the wheel in a second axis perpendicular to the first axis. The first wireless communication device is configured to transmit a signal from the antenna to the second wireless communication device based on information detected by the air pressure sensor.

A vehicle According to an aspect of the present disclosure includes a first wireless communication device and a second wireless communication device. The first wireless communication device installed on an installation surface of a wheel. The first wireless communication device includes an antenna and an air pressure sensor. The antenna includes a first conductor, a second conductor, one or more third conductors, a fourth conductor, and a feeding line. The first conductor and the second conductor face each other in a first axis. The one or more third conductors are located between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected via the third conductor. A surface of the fourth conductor faces the installation surface of the wheel in a second axis perpendicular to the first axis. The first wireless communication device is configured to transmit a signal from the antenna to the second wireless communication device based on information detected by the air pressure sensor.

BRIEF DESCRIPTION OF DRAWINGS

FIG. 93 is a schematic view illustrating one embodiment of a wheel on which the wireless communication device is installed.

DESCRIPTION OF EMBODIMENTS

The present disclosure relates to provision of an antenna, a wireless communication device, a wheel, a tire pressure monitoring system, and a vehicle that improve a usefulness of wireless communication technology when the antenna is installed on a member of a conductor, which may be metal, of the wheel. According to the present disclosure, the usefulness of the wireless communication technology is improved when the antenna is installed on the member of the conductor, which may be metal, of the wheel. Hereinafter, embodiments of the present disclosure will be described with reference to the drawings.

Figure 89:
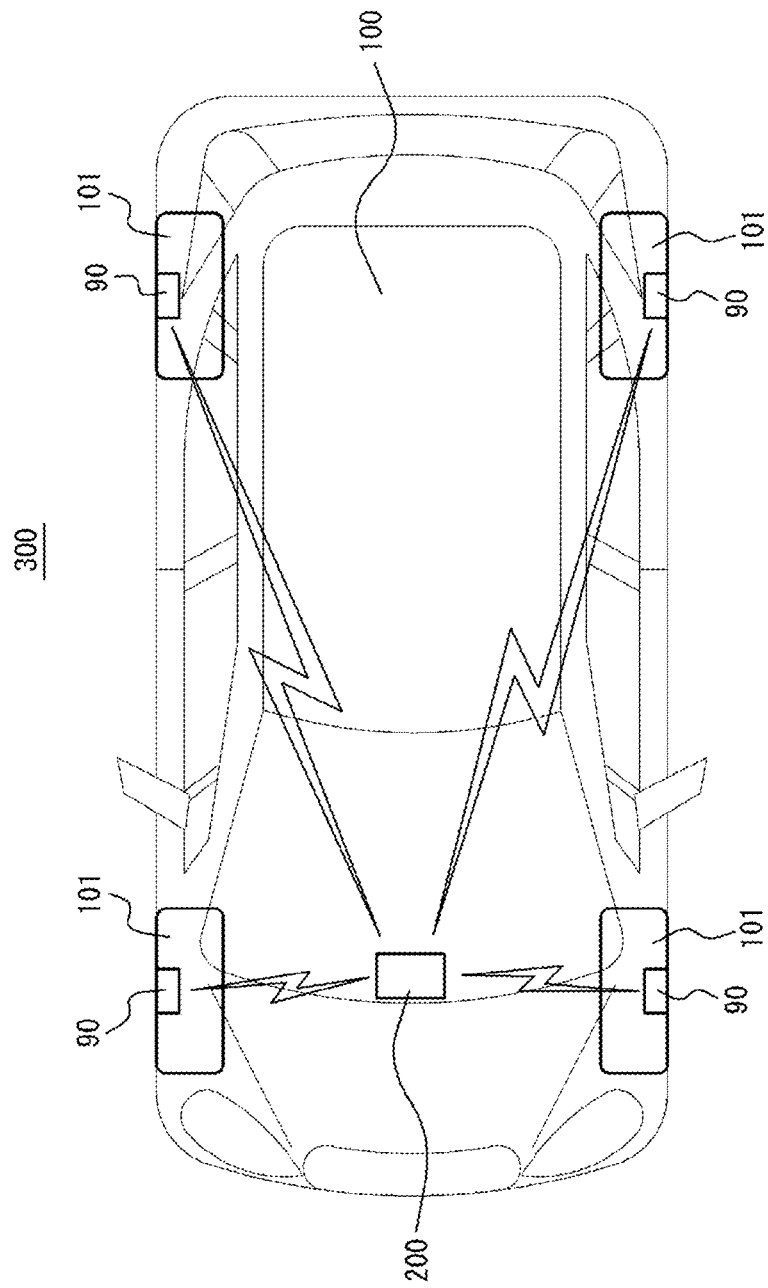
FIG. 89 is a schematic view illustrating one embodiment of a tire pressure monitoring system.

FIG. 89 is a view illustrating a schematic configuration of a tire pressure monitoring system (Tire Pressure Monitoring System) according to one embodiment of the present disclosure. A tire pressure monitoring system 300 includes a plurality of wireless communication devices. The tire pressure monitoring system 300 may include, for example, a wireless communication device 90 installed on a wheel 101 of a vehicle 100 and including an antenna and an air pressure sensor. In addition, the tire pressure monitoring system 300 may include another wireless communication device 200 installed in the same vehicle 100 as the wireless communication device 90. The wireless communication device 90 transmits a signal from the antenna to another wireless communication device 200 based on information on air pressure detected by the air pressure sensor or the like.

The antenna according to one embodiment of the present disclosure is an artificial magnetic conductor having a ground conductor by having a configuration described later. As a result, even when the antenna is installed on a conductor such as metal, the antenna is unlikely to be affected by the conductor when radiating electromagnetic waves. For this reason, the wireless communication device 90 including the antenna may be installed on the member of the conductor such as metal that constitutes the wheel 101 of the vehicle 100 to be used for various applications described later.

Examples of the vehicle 100 include, but are not limited to, an automobile, an industrial vehicle, and a living vehicle. Examples of the vehicle may include an airplane traveling on a runway. Examples of the automobile include, but are not limited to, a passenger car, a truck, a bus, a motorcycle, a trolleybus, and the like, and may include other vehicles traveling on a road. Examples of the industrial vehicle include industrial vehicles for agriculture and construction. Examples of the industrial vehicle include, but are not limited to, a forklift and a golf cart. Examples of the industrial vehicle for agriculture include, but are not limited to, a tractor, a tiller, a transplanter, a binder, a combine harvester, and a lawnmower. Examples of the industrial vehicle for construction include, but are not limited to, a bulldozer, a scraper, an excavator, a crane vehicle, a dump truck, and a road roller. Examples of the living vehicle include, but are not limited to, a bicycle, a wheelchair, a baby carriage, a wheelbarrow, and an electric standing motorcycle. Examples of a power engine of the vehicle include, but are not limited to, an internal combustion engine such as a diesel engine, a gasoline engine, and a hydrogen engine, and an electric engine such as a motor. Examples of the vehicle include those that travel manually. The classification of the vehicle is not limited to the above. For example, the automobile may include an industrial vehicle that can travel on the road, and the same vehicle may be included in multiple classifications.

(Antenna)

An antenna according to one embodiment of the present disclosure will be described below. A resonant structure may include a resonator. The resonant structure includes a resonator and another member and may be realized in a composite manner. A resonator 10 illustrated in FIGS. 1 to 62 includes a base 20, pair conductors 30, a third conductor 40, and a fourth conductor 50. The base 20 is in contact with the pair conductors 30, the third conductor 40, and the fourth conductor 50. In the resonator 10, the pair conductors 30, the third conductor 40, and the fourth conductor 50 function as a resonator. The resonator 10 may resonate at a plurality of resonance frequencies. Of the resonance frequencies of the resonator 10, one resonance frequency is a first frequency $f_1$. A wavelength of the first frequency $f_1$ is $\lambda_1$. The resonator 10 may use at least one of the at least one resonance frequency as an operating frequency. The resonator 10 uses the first frequency $f_1$ as the operating frequency.

The base 20 may include either a ceramic material or a resin material as a composition. Examples of the ceramic material include an aluminum oxide sintered body, an aluminum nitride sintered body, a mullite sintered body, a glass ceramic sintered body, crystallized glass obtained by precipitating a crystal component in a glass base material, and a microcrystalline sintered body such as mica or aluminum titanate. Examples of the resin material include a material obtained by curing an uncured material such as an epoxy resin, a polyester resin, a polyimide resin, a polyamide-imide resin, a polyetherimide resin, and a liquid crystal polymer.

The pair conductors 30, the third conductor 40, and the fourth conductor 50 may include any one of a metal material, an alloy of metal materials, a cured material of a metal paste, and a conductive polymer as a composition. The pair conductors 30, the third conductor 40, and the fourth conductor 50 may all be of the same material. The pair conductors 30, the third conductor 40, and the fourth conductor 50 may all be of different materials. Any combination of the pair conductors 30, the third conductor 40, and the fourth conductor 50 may be made of the same material. Examples of the metal material include copper, silver, palladium, gold, platinum, aluminum, chromium, nickel, cadmium lead, selenium, manganese, tin, vanadium, lithium, cobalt, titanium, and the like. The alloy includes a plurality of metal materials. Examples of the metal paste agent include a powder of a metal material kneaded together with an organic solvent and a binder. Examples of the binder include an epoxy resin, a polyester resin, a polyimide resin, a polyamide-imide resin, and a polyetherimide resin. Examples of the conductive polymer include a polythiophene-based polymer, a polyacetylene-based polymer, a polyaniline-based polymer, a polypyrrole-based polymer, and the like.

The resonator 10 has two pair conductors 30. The pair conductors 30 include a plurality of conductors. The pair conductors 30 include a first conductor 31 and a second conductor 32. The pair conductors 30 may include three or more conductors. Each conductor of the pair conductors 30 is separated from another conductor in a first axis. In each conductor of the pair conductors 30, one conductor may be paired with another conductor. Each conductor of the pair conductors 30 can be seen as an electric conductor from the resonator between the paired conductors. The first conductor 31 is located away from the second conductor 32 in the first axis. Each of the conductors 31 and 32 extends along a second plane that intersects the first axis.

In the present disclosure, the first axis (first axis) is illustrated as an x direction. In the present disclosure, a third axis (third axis) is illustrated as a y direction. In the present disclosure, a second axis (second axis) is illustrated as a z direction. In the present disclosure, a first plane (first plane) is illustrated as an xy plane. In the present disclosure, a second plane (second plane) is illustrated as a yz plane. In the present disclosure, a third plane (third plane) is illustrated as a zx plane. Each of these planes is a plane (plane) in a coordinate space (coordinate space) and does not indicate a specific plate (plate) or a specific surface (surface). In the present disclosure, a surface integral (surface integral) in the xy plane may be referred to as a first surface integral. In the present disclosure, a surface integral in the yz plane may be referred to as a second surface integral. In the present disclosure, a surface integral in the zx plane may be referred to as a third surface integral. The surface integral (surface integral) is counted in units of a square meter (square meter) or the like. In the present disclosure, a length in the x direction may be simply referred to as "length". In the present disclosure, a length in the y direction may be simply referred to as "width". In the present disclosure, a length in the z direction may be simply referred to as "height".

In one example, the conductors 31 and 32 are located at respective ends of the base 20 in the x direction. A part of each of the conductors 31 and 32 may face the outside of the base 20. A part of each of the conductors 31 and 32 may be located inside the base 20, and another part thereof may be located outside the base 20. Each of the conductors 31 and 32 may be located within the base 20.

The third conductor 40 functions as a resonator. The third conductor 40 may include at least one of a line type resonator, a patch type resonator, and a slot type resonator. In one example, the third conductor 40 is located on the base 20. In one example, the third conductor 40 is located at an end of the base 20 in the z direction. In one example, the third conductor 40 may be located within the base 20. A part of the third conductor 40 may be located inside the base 20, and another part may be located outside the base 20. A part of the surface of the third conductor 40 may face the outside of the base 20.

The third conductor 40 includes at least one conductor. The third conductor 40 may include a plurality of conductors. When the third conductor 40 includes a plurality of conductors, the third conductor 40 may be referred to as a third conductor group. The third conductor 40 includes at least one conductive layer. The third conductor 40 includes at least one conductor in one conductive layer. The third conductor 40 may include a plurality of conductive layers. For example, the third conductor 40 may include three or more conductive layers. The third conductor 40 includes at least one conductor in each of the plurality of conductive layers. The third conductor 40 extends in the xy plane. The xy plane includes the x direction. Each conductive layer of the third conductor 40 extends along the xy plane.

In an example of a plurality of embodiments, the third conductor 40 includes a first conductive layer 41 and a second conductive layer 42. The first conductive layer 41 extends along the xy plane. The first conductive layer 41 may be located on the base 20. The second conductive layer 42 extends along the xy plane. The second conductive layer 42 may be capacitively coupled to the first conductive layer 41. The second conductive layer 42 may be electrically connected to the first conductive layer 41. The two conductive layers that are capacitively coupled may face each other in the y direction. The two conductive layers that are capacitively coupled may face each other in the x direction. The two conductive layers that are capacitively coupled may face each other on the first plane. The two conductive layers facing each other in the first plane may be restated as having two conductors on one conductive layer. The second conductive layer 42 may be located so that at least a part thereof overlaps the first conductive layer 41 as viewed in the z direction. The second conductive layer 42 may be located in the base 20.

The fourth conductor 50 is located apart from the third conductor 40. The fourth conductor 50 is electrically connected to each of the conductors 31 and 32 of the pair conductors 30. The fourth conductor 50 is electrically connected to the first conductor 31 and the second conductor 32. The fourth conductor 50 extends along the third conductor 40. The fourth conductor 50 extends along the first plane. The fourth conductor 50 extends from the first conductor 31 to the second conductor 32. The fourth conductor 50 is located on the base 20. The fourth conductor 50 may be located in the base 20. A part of the fourth conductor 50 may be located inside the base 20, and another part thereof may be located outside the base 20. A part of the surface of the fourth conductor 50 may face the outside of the base 20.

In an example of a plurality of embodiments, the fourth conductor 50 may function as a ground conductor in the resonator 10. The fourth conductor 50 may serve as a potential reference for the resonator 10. The fourth conductor 50 may be connected to the ground of a device including the resonator 10.

In an example of a plurality of embodiments, the resonator 10 may include the fourth conductor 50 and a reference potential layer 51. The reference potential layer 51 is located apart from the fourth conductor 50 in the z direction. The reference potential layer 51 is electrically insulated from the fourth conductor 50. The reference potential layer 51 may serve as a potential reference for the resonator 10. The reference potential layer 51 may be electrically connected to the ground of the device including the resonator 10. The fourth conductor 50 may be electrically separated from the ground of the device including the resonator 10. The reference potential layer 51 faces either the third conductor 40 or the fourth conductor 50 in the z direction.

In an example of a plurality of embodiments, the reference potential layer 51 faces the third conductor 40 via the fourth conductor 50. The fourth conductor 50 is located between the third conductor 40 and the reference potential layer 51. The spacing between the reference potential layer 51 and the fourth conductor 50 is narrower than the spacing between the third conductor 40 and the fourth conductor 50.

In the resonator 10 including the reference potential layer 51, the fourth conductor 50 may include one or more conductors. In the resonator 10 including the reference potential layer 51, the fourth conductor 50 may include one or more conductors, and the third conductor 40 may be one conductor connected to the pair conductors 30. In the resonator 10 including the reference potential layer 51, each of the third conductor 40 and the fourth conductor 50 may include at least one resonator.

In the resonator 10 including the reference potential layer 51, the fourth conductor 50 may include a plurality of conductive layers. For example, the fourth conductor 50 may include a third conductive layer 52 and a fourth conductive layer 53. The third conductive layer 52 may be capacitively coupled to the fourth conductive layer 53. The third conductive layer 52 may be electrically connected to the first conductive layer 41. The two conductive layers that are capacitively coupled may face each other in the y direction. The two conductive layers that are capacitively coupled may face each other in the x direction. The two conductive layers that are capacitively coupled may face each other on the xy plane.

The distance between the two conductive layers facing each other in the z direction and capacitively coupled is shorter than the distance between the conductor group and the reference potential layer 51. For example, the distance between the first conductive layer 41 and the second conductive layer 42 is shorter than the distance between the third conductor 40 and the reference potential layer 51. For example, the distance between the third conductive layer 52 and the fourth conductive layer 53 is shorter than the distance between the fourth conductor 50 and the reference potential layer 51.

Each of the first conductor 31 and the second conductor 32 may include one or more conductors. Each of the first conductor 31 and the second conductor 32 may be one conductor. Each of the first conductor 31 and the second conductor 32 may include a plurality of conductors. Each of the first conductor 31 and the second conductor 32 may include at least one fifth conductive layer 301 and a plurality of fifth conductors 302. The pair conductors 30 include at least one fifth conductive layer 301 and a plurality of fifth conductors 302.

The fifth conductive layer 301 extends in the y direction. The fifth conductive layer 301 extends along the xy plane. The fifth conductive layer 301 is a layered conductor. The fifth conductive layer 301 may be located on the base 20.

The fifth conductive layer 301 may be located in the base 20. The plurality of fifth conductive layers 301 are separated from each other in the z direction. The plurality of fifth conductive layers 301 are arranged in the z direction. The plurality of fifth conductive layers 301 partially overlap each other as viewed in the z direction. The fifth conductive layer 301 electrically connects a plurality of fifth conductors 302. The fifth conductive layer 301 is a connecting conductor that connects a plurality of fifth conductors 302. The fifth conductive layer 301 may be electrically connected to any conductive layer of the third conductor 40. In one embodiment, the fifth conductive layer 301 is electrically connected to the second conductive layer 42. The fifth conductive layer 301 may be integrated with the second conductive layer 42. In one embodiment, the fifth conductive layer 301 may be electrically connected to the fourth conductor 50. The fifth conductive layer 301 may be integrated with the fourth conductor 50.

Each fifth conductor 302 extends in the z direction. The plurality of fifth conductors 302 are separated from each other in the y direction. The distance between the fifth conductors 302 is equal to or less than ½ wavelength of $\lambda_1$. When the distance between the electrically connected fifth conductors 302 is equal to or less than $\lambda_1/2$, each of the first conductor 31 and the second conductor 32 can reduce leakage of electromagnetic waves in a resonance frequency band from between the fifth conductors 302. Since the pair conductors 30 have a small leakage of the electromagnetic waves in the resonance frequency band, the pair conductors 30 appear as an electric conductor from the unit structure. At least some of the plurality of fifth conductors 302 are electrically connected to the fourth conductor 50. In one embodiment, some of the plurality of fifth conductors 302 may electrically connect the fourth conductor 50 and the fifth conductive layer 301. In one embodiment, the plurality of fifth conductors 302 may be electrically connected to the fourth conductor 50 via the fifth conductive layer 301. Some of the plurality of fifth conductors 302 may electrically connect one fifth conductive layer 301 to another fifth conductive layer 301. The fifth conductor 302 may employ a via conductor and a through-hole conductor.

The resonator 10 includes the third conductor 40 that functions as a resonator. The third conductor 40 may function as an artificial magnetic conductor (AMC; Artificial Magnetic Conductor). The artificial magnetic conductor may also be called a reactive impedance surface (RIS; Reactive Impedance Surface).

The resonator 10 includes the third conductor 40 functioning as a resonator between two pair conductors 30 facing each other in the x direction. The two pair conductors 30 can be seen as an electric conductor (Electric Conductor) extending from the third conductor 40 in the yz plane. The resonator 10 has an electrically opened end in the y direction. The resonator 10 has high impedance in the zx planes at both ends in the y direction. The zx planes at both ends of the resonator 10 in the y direction can be seen as a magnetic conductor (Magnetic Conductors) from the third conductor 40. Since the resonator 10 is surrounded by two electric conductors and two high impedance surfaces (magnetic conductors), the resonator of the third conductor 40 has an artificial magnetic conductor character (Artificial Magnetic Conductor Character) in the z direction. By being surrounded by two electric conductors and two high impedance surfaces, the resonator of the third conductor 40 has a finite number of artificial magnetic conductor characters.

In the "artificial magnetic conductor character", a phase difference between an incident wave and a reflected wave at an operating frequency is 0 degree. In the resonator 10, a phase difference between the incident wave and the reflected wave at a first frequency $f_1$ is 0 degree. In the "artificial magnetic conductor character", a phase difference between the incident wave and the reflected wave is −90 degrees to +90 degrees in an operating frequency band. The operating frequency band is a frequency band between a second frequency $f_2$ and a third frequency $f_3$. The second frequency $f_2$ is a frequency at which the phase difference between the incident wave and the reflected wave is +90 degrees. The third frequency $f_3$ is a frequency at which the phase difference between the incident wave and the reflected wave is −90 degrees. A width of the operating frequency band determined based on the second and third frequencies may be, for example, 100 MHz or more when the operating frequency is about 2.5 GHz. The width of the operating frequency band may be, for example, 5 MHz or greater when the operating frequency is about 400 MHz.

The operating frequency of the resonator 10 may be different from the resonance frequency of each resonator of the third conductor 40. The operating frequency of the resonator 10 may vary depending on the length, size, shape, material, and the like of the base 20, the pair conductors 30, the third conductor 40, and the fourth conductor 50.

In an example of a plurality of embodiments, the third conductor 40 may include at least one unit resonator 40X. The third conductor 40 may include one unit resonator 40X. The third conductor 40 may include a plurality of unit resonators 40X. The unit resonator 40X is located so as to overlap the fourth conductor 50 as viewed in the z direction. The unit resonator 40X faces the fourth conductor 50. The unit resonator 40X may function as a frequency selective surface (FSS; Frequency Selective Surface). The plurality of unit resonators 40X are arranged along the xy plane. The plurality of unit resonators 40X may be regularly arranged on the xy plane. The unit resonators 40X may be arranged in a square grid (square grid), an oblique grid (oblique grid), a rectangular grid (rectangular grid), and a hexagonal grid (hexagonal grid).

The third conductor 40 may include a plurality of conductive layers arranged in the z direction. Each of the plurality of conductive layers of the third conductor 40 includes at least one unit resonator. For example, the third conductor 40 includes a first conductive layer 41 and a second conductive layer 42.

The first conductive layer 41 includes at least one first unit resonator 41X. The first conductive layer 41 may include one first unit resonator 41X. The first conductive layer 41 may include a plurality of first divisional resonators 41Y obtained by dividing one first unit resonator 41X into a plurality of parts. The plurality of first divisional resonators 41Y may be at least one first unit resonator 41X with an adjacent unit structure 10X. The plurality of first divisional resonators 41Y are located at the ends of the first conductive layer 41. The first unit resonator 41X and the first divisional resonator 41Y may be called a third conductor.

The second conductive layer 42 includes at least one second unit resonator 42X. The second conductive layer 42 may include one second unit resonator 42X. The second conductive layer 42 may include a plurality of second divisional resonators 42Y obtained by dividing one second unit resonator 42X into a plurality of parts. The plurality of second divisional resonators 42Y may be at least one second unit resonator 42X with an adjacent unit structure 10X. The plurality of second divisional resonators 42Y are located at the ends of the second conductive layer 42. The second unit resonator 42X and the second divisional resonator 42Y may be called a third conductor.

At least a part of the second unit resonator 42X and the second divisional resonator 42Y is located so as to overlap with the first unit resonator 41X and the first divisional resonator 41Y as viewed in the Z direction. In the third conductor 40, at least a part of the unit resonators and the divisional resonators of each layer are stacked in the Z direction to form one unit resonator 40X. The unit resonator 40X includes at least one unit resonator in each layer.

When the first unit resonator 41X includes a line-type or patch-type resonator, the first conductive layer 41 has at least one first unit conductor 411. The first unit conductor 411 may function as the first unit resonator 41X or the first divisional resonator 41Y. The first conductive layer 41 has a plurality of first unit conductors 411 arranged in n rows and m columns in the xy directions, where n and m are natural numbers of 1 or greater, which are independent of each other. In one example illustrated in FIG. 1 to FIG. 9 and the like, the first conductive layer 41 has six first unit conductors 411 arranged in a grid pattern of 2 rows and 3 columns. The first unit conductors 411 may be arranged in a square grid, an oblique grid, a rectangular grid, and a hexagonal grid. The first unit conductor 411 corresponding to the first divisional resonator 41Y is located at the end of the first conductive layer 41 on the xy plane.

When the first unit resonator 41X is a slot-type resonator, at least one conductive layer of the first conductive layer 41 extends in the xy directions. The first conductive layer 41 has at least one first unit slot 412. The first unit slot 412 may function as the first unit resonator 41X or the first divisional resonator 41Y. The first conductive layer 41 may include a plurality of first unit slots 412 arranged in n rows and m columns in the xy directions, where n and m are natural numbers of 1 or greater, which are independent of each other. In the example illustrated in FIG. 6 to FIG. 9 and the like, the first conductive layer 41 has six first unit slots 412 arranged in a grid pattern of 2 rows and 3 columns. The first unit slots 412 may be arranged in a square grid, an oblique grid, a rectangular grid, and a hexagonal grid. The first unit slot 412 corresponding to the first divisional resonator 41Y is located at the end of the first conductive layer 41 on the xy plane.

When the second unit resonator 42X is a line-type resonator or a patch-type resonator, the second conductive layer 42 includes at least one second unit conductor 421. The second conductive layer 42 may include a plurality of second unit conductors 421 arranged in the xy directions. The second unit conductors 421 may be arranged in a square grid, an oblique grid, a rectangular grid, and a hexagonal grid. The second unit conductor 421 may function as the second unit resonator 42X or the second divisional resonator 42Y. The second unit conductor 421 corresponding to the second divisional resonator 42Y is located at the end of the second conductive layer 42 on the xy plane.

At least a part of the second unit conductor 421 overlaps at least one of the first unit resonator 41X and the first divisional resonator 41Y as viewed in the z direction. The second unit conductor 421 may overlap a plurality of first unit resonators 41X. The second unit conductor 421 may overlap a plurality of first divisional resonators 41Y. The second unit conductor 421 may overlap one first unit resonator 41X and four first divisional resonators 41Y. The second unit conductor 421 may overlap only one first unit resonator 41X. The center of gravity of the second unit conductor 421 may overlap one first unit resonator 41X. The center of gravity of the second unit conductor 421 may be located between the plurality of first unit resonators 41X and the first divisional resonators 41Y. The center of gravity of the second unit conductor 421 may be located between two first unit resonators 41X arranged in the x direction or the y direction.

At least a part of the second unit conductor 421 may overlap two first unit conductors 411. The second unit conductor 421 may overlap only one first unit conductor 411. The center of gravity of the second unit conductor 421 may be located between two first unit conductors 411. The center of gravity of the second unit conductor 421 may overlap one first unit conductor 411. At least a part of the second unit conductor 421 may overlap the first unit slot 412. The second unit conductor 421 may overlap only one first unit slot 412. The center of gravity of the second unit conductor 421 may be located between two first unit slots 412 arranged in the x direction or the y direction. The center of gravity of the second unit conductor 421 may overlap one first unit slot 412.

When the second unit resonator 42X is a slot-type resonator, at least one conductive layer of the second conductive layer 42 extends along the xy plane. The second conductive layer 42 has at least one second unit slot 422. The second unit slot 422 may function as the second unit resonator 42X or the second divisional resonator 42Y. The second conductive layer 42 may include a plurality of second unit slots 422 arranged on the xy plane. The second unit slots 422 may be arranged in a square grid, an oblique grid, a rectangular grid, and a hexagonal grid. The second unit slot 422 corresponding to the second divisional resonator 42Y is located at the end of the second conductive layer 42 on the xy plane.

At least a part of the second unit slot 422 overlaps at least one of the first unit resonator 41X and the first divisional resonator 41Y in the y direction. The second unit slot 422 may overlap a plurality of first unit resonators 41X. The second unit slot 422 may overlap a plurality of first divisional resonators 41Y. The second unit slot 422 may overlap one first unit resonator 41X and four first divisional resonators 41Y. The second unit slot 422 may overlap only one first unit resonator 41X. The center of gravity of the second unit slot 422 may overlap one first unit resonator 41X. The center of gravity of the second unit slot 422 may be located between a plurality of first unit resonators 41X. The center of gravity of the second unit slot 422 may be located between two first unit resonators 41X and the first divisional resonator 41Y arranged in the x direction or the y direction.

At least a part of the second unit slot 422 may overlap two first unit conductors 411. The second unit slot 422 may overlap only one first unit conductor 411. The center of gravity of the second unit slot 422 may be located between two first unit conductors 411. The center of gravity of the second unit slot 422 may overlap one first unit conductor 411. At least part of the second unit slot 422 may overlap the first unit slot 412. The second unit slot 422 may overlap only one first unit slot 412. The center of gravity of the second unit slot 422 may be located between two first unit slots 412 arranged in the x direction or the y direction. The center of gravity the second unit slot 422 may overlap one first unit slot 412.

The unit resonator 40X includes at least one first unit resonator 41X and at least one second unit resonator 42X. The unit resonator 40X may include one first unit resonator 41X. The unit resonator 40X may include a plurality of first unit resonators 41X. The unit resonator 40X may include one first divisional resonator 41Y. The unit resonator 40X may include a plurality of first divisional resonators 41Y.

The unit resonator 40X may include a part of the first unit resonator 41X. The unit resonator 40X may include one or more partial first unit resonators 41X. The unit resonator 40X includes a plurality of partial resonators among one or more partial first unit resonators 41X and one or more first divisional resonators 41Y. The plurality of partial resonators included in the unit resonator 40X are combined with the first unit resonator 41X corresponding to at least one resonator. The unit resonator 40X does not necessarily include a first unit resonator 41X but may include a plurality of first divisional resonators 41Y. The unit resonator 40X may include, for example, four first divisional resonators 41Y. The unit resonator 40X may include only a plurality of partial first unit resonators 41X. The unit resonator 40X may include one or more partial first unit resonators 41X and one or more first divisional resonators 41Y. The unit resonator 40X may include, for example, two partial first unit resonators 41X and two first divisional resonators 41Y. The unit resonator 40X may have substantially the same mirror image of the included first conductive layer 41 at the ends in the x direction. In the unit resonator 40X, the first conductive layer 41 included therein may be substantially symmetric with respect to the center line extending in the z direction.

The unit resonator 40X may include one second unit resonator 42X. The unit resonator 40X may include a plurality of second unit resonators 42X. The unit resonator 40X may include one second divisional resonator 42Y. The unit resonator 40X may include a plurality of second divisional resonators 42Y. The unit resonator 40X may include a part of the second unit resonator 42X. The unit resonator 40X may include one or more partial second unit resonators 42X. The unit resonator 40X includes a plurality of partial resonators among one or more partial second unit resonators 42X, and one or more second divisional resonators 42Y. A plurality of partial resonators included in the unit resonator 40X are combined with the second unit resonator 42X corresponding to at least one resonator. The unit resonator 40X does not necessarily include the second unit resonator 42X but may include a plurality of second divisional resonators 42Y. The unit resonator 40X may include, for example, four second divisional resonators 42Y. The unit resonator 40X may include only the plurality of partial second unit resonators 42X. The unit resonator 40X may include one or more partial second unit resonators 42X and one or more second divisional resonators 42Y. The unit resonator 40X may include, for example, two partial second unit resonators 42X and two second divisional resonators 42Y. The unit resonator 40X may have substantially the same mirror image of the included second conductive layer 42 at the ends in the x direction. In the unit resonator 40X, the second conductive layer 42 included therein may be substantially symmetric with respect to the center line extending in the y direction.

In an example of a plurality of embodiments, the unit resonator 40X includes one first unit resonator 41X and a plurality of partial second unit resonators 42X. For example, the unit resonator 40X includes one first unit resonator 41X and half of four second unit resonators 42X. The unit resonator 40X includes one first unit resonator 41X and two second unit resonators 42X. The configuration included in the unit resonator 40X is not limited to the example.

The resonator 10 may include at least one unit structure 10X. The resonator 10 may include a plurality of unit structures 10X. The plurality of unit structures 10X may be arranged on the xy plane. The plurality of unit structures 10X may be arranged in a square grid, an oblique grid, a rectangular grid, and a hexagonal grid. The unit structure 10X includes any repeating unit of the square grid (square grid), the oblique grid (oblique grid), the rectangular grid (rectangular grid), and the hexagonal grid (hexagonal grid). The unit structures 10X may function as an artificial magnetic conductor (AMC) by being arranged infinitely along the xy plane.

The unit structure 10X may include at least a part of the base 20, at least a part of the third conductor 40, and at least a part of the fourth conductor 50. The portions of the base 20, the third conductor 40, and the fourth conductor 50 included in the unit structure 10X overlap as viewed in the z direction. The unit structure 10X includes a unit resonator 40X, a part of the base 20 overlapping the unit resonator 40X as viewed in the z direction, and a fourth conductor 50 overlapping the unit resonator 40X as viewed in the z direction. The resonator 10 may include, for example, six unit structures 10X arranged in 2 rows and 3 columns.

The resonator 10 may have at least one unit structure 10X between two pair conductors 30 facing each other in the x direction. The two pair conductors 30 can be seen as an electric conductor extending from the unit structure 10X to the yz plane. The unit structure 10X has an opened end in the y direction. The unit structure 10X has high impedance in the zx planes at both ends in the y direction. The unit structure 10X can be seen as magnetic conductors in the zx planes at both ends in the y direction. The unit structures 10X may have line symmetry with respect to the z direction when repeatedly arranged. The unit structures 10X have an artificial magnetic conductor character in the z direction by being surrounded by two electric conductors and two high impedance surfaces (magnetic conductors). By being surrounded by two electric conductors and two high impedance surfaces (magnetic conductors), the unit structures 10X have a finite number of artificial magnetic conductor characters.

The operating frequency of the resonator 10 may be different from an operating frequency of the first unit resonator 41X. The operating frequency of the resonator 10 may be different from an operating frequency of the second unit resonator 42X. The operating frequency of the resonator 10 may be changed depending on the coupling of the first unit resonator 41X and the second unit resonator 42X that constitute the unit resonator 40X.

The third conductor 40 may include a first conductive layer 41 and a second conductive layer 42. The first conductive layer 41 includes at least one first unit conductor 411. The first unit conductor 411 includes a first connecting conductor 413 and a first floating conductor 414. The first connecting conductor 413 is connected to any one of the pair conductors 30. The first floating conductor 414 is not connected to the pair conductors 30. The second conductive layer 42 includes at least one second unit conductor 421. The second unit conductor 421 includes a second connecting conductor 423 and a second floating conductor 424. The second connecting conductor 423 is connected to any one of the pair conductors 30. The second floating conductor 424 is not connected to the pair conductors 30. The third conductor 40 may include the first unit conductor 411 and the second unit conductor 421.

The first connecting conductor 413 may be longer than the first floating conductor 414 in the x direction. The first connecting conductor 413 may be shorter than the first floating conductor 414 in the x direction. The first connecting conductor 413 may have a half length in the x direction as compared with the first floating conductor 414. The second connecting conductor 423 may be longer than the second floating conductor 424 in the x direction. The second connecting conductor 423 may be shorter than the second floating conductor 424 in the x direction. The second connecting conductor 423 may have a half length in the x direction as compared with the second floating conductor 424.

The third conductor 40 may include a current path 40I that serves as a current path between the first conductor 31 and the second conductor 32 when the resonator 10 resonates. The current path 40I may be connected to the first conductor 31 and the second conductor 32. The current path 40I has capacitance between the first conductor 31 and the second conductor 32. The capacitance of the current path 40I is electrically connected in series between the first conductor 31 and the second conductor 32. In the current path 40I, a conductor is separated between the first conductor 31 and the second conductor 32. The current path 40I may include a conductor connected to the first conductor 31 and a conductor connected to the second conductor 32.

In a plurality of embodiments, in the current path 40I, the first unit conductor 411 and the second unit conductor 421 partially face each other in the z direction. In the current path 40I, the first unit conductor 411 and the second unit conductor 421 are capacitively coupled. The first unit conductor 411 has a capacitance component at the end in the x direction. The first unit conductor 411 may have a capacitance component at the end in the y direction that faces the second unit conductor 421 in the z direction. The first unit conductor 411 may have capacitance components at the end in the x direction and at the end in the y direction that face the second unit conductor 421 in the z direction. The second unit conductor 421 has a capacitance component at the end in the x direction. The second unit conductor 421 may have a capacitance component at the end in the y direction that faces the first unit conductor 411 in the z direction. The second unit conductor 421 may have a capacitance component at the end in the x direction and at the end in the y direction that face the first unit conductor 411 in the z direction.

The resonator 10 can have a lower resonance frequency by increasing the capacitive coupling in the current path 40I. When achieving a desired operating frequency, the resonator 10 can have a shorter length along the x direction by increasing the capacitance coupling of the current path 40I. In the third conductor 40, the first unit conductor 411 and the second unit conductor 421 face each other in a stacking direction of the base 20 and are capacitively coupled. In the third conductor 40, capacitance between the first unit conductor 411 and the second unit conductor 421 can be adjusted by the opposing areas.

In a plurality of embodiments, the length of the first unit conductor 411 along the y direction is different from the length of the second unit conductor 421 along the y direction. In the resonator 10, when a relative position between the first unit conductor 411 and the second unit conductor 421 is deviated from an ideal position along the xy plane, since the first unit conductor 411 and the second unit conductor 421 have different lengths along the third axis, it is possible to reduce a change in the magnitude of the capacitance.

In a plurality of embodiments, the current path 40I is made of one conductor that is spatially separated from the first conductor 31 and the second conductor 32 and is capacitively coupled to the first conductor 31 and the second conductor 32.

In a plurality of embodiments, the current path 40I includes the first conductive layer 41 and the second conductive layer 42. The current path 40I includes at least one first unit conductor 411 and at least one second unit conductor 421. The current path 40I includes two first connecting conductors 413, two second connecting conductors 423, and one of one first connecting conductor 413 and one second connecting conductor 423. In the current path 40I, the first unit conductor 411 and the second unit conductor 421 may be arranged alternately along the first axis.

In some embodiments, the current path 40I includes a first connecting conductor 413 and a second connecting conductor 423. The current path 40I includes at least one first connecting conductor 413 and at least one second connecting conductor 423. In the current path 40I, the third conductor 40 has capacitance between the first connecting conductor 413 and the second connecting conductor 423. In an example of the embodiments, the first connecting conductor 413 may face the second connecting conductor 423 and have capacitance. In an example of the embodiments, the first connecting conductor 413 may be capacitively connected to the second connecting conductor 423 via another conductor.

In a plurality of embodiments, the current path 40I includes a first connecting conductor 413 and a second floating conductor 424. The current path 40I includes two first connecting conductors 413. In the current path 40I, the third conductor 40 has capacitance between two first connecting conductors 413. In an example of the embodiments, two first connecting conductors 413 may be capacitively connected via at least one second floating conductor 424. In an example of the embodiments, two first connecting conductors 413 may be capacitively connected via at least one first floating conductor 414 and a plurality of second floating conductors 424.

In a plurality of embodiments, the current path 40I includes a first floating conductor 414 and a second connecting conductor 423. The current path 40I includes two second connecting conductors 423. In the current path 40I, the third conductor 40 has capacitance between two second connecting conductors 423. In an example of the embodiments, two second connecting conductors 423 may be capacitively connected via at least one first floating conductor 414. In an example of the embodiments, two second connecting conductors 423 may be capacitively connected via a plurality of first floating conductors 414 and at least one second floating conductor 424.

In a plurality of embodiments, each of the first connecting conductor 413 and the second connecting conductor 423 may have a length of a quarter of the wavelength λ at the resonance frequency. Each of the first connecting conductor 413 and the second connecting conductor 423 may function as a resonator having a length of half the wavelength λ. Each of the first connecting conductor 413 and the second connecting conductor 423 may oscillate in an odd mode and an even mode due to capacitive coupling of the respective resonators. The resonator 10 may use the resonance frequency in the even mode after capacitive coupling as the operating frequency.

The current path 40I may be connected to the first conductor 31 at a plurality of points. The current path 40I may be connected to the second conductor 32 at a plurality of points. The current path 40I may include a plurality of conductive paths that independently conduct electricity from the first conductor 31 to the second conductor 32.

In the second floating conductor 424 that is capacitively coupled to the first connecting conductor 413, the end of the second floating conductor 424 on the side that is capacitively coupled has a shorter distance from the first connecting conductor 413 than the distance from the pair conductors 30. In the first floating conductor 414 that is capacitively coupled to the second connecting conductor 423, the end of the first floating conductor 414 on the side that is capacitively coupled has a shorter distance from the second connecting conductor 423 than the distance from the pair conductors 30.

In the resonator 10 of a plurality of embodiments, the conductive layers of the third conductor 40 may have different lengths in the y direction. The conductive layer of the third conductor 40 is capacitively coupled to another conductive layer in the z direction. When the conductive layers of the resonator 10 have different lengths in the y direction, variation in capacitance is small even if the conductive layers are shifted in the y direction. When the conductive layers of the resonator 10 have different lengths in the y direction, it is possible to widen an allowable range of displacement of the conductive layers in the y direction.

In the resonator 10 of a plurality of embodiments, the third conductor 40 has capacitance due to capacitive coupling between the conductive layers. A plurality of capacitive parts having the capacitance may be arranged in the y direction. The plurality of capacitive parts arranged in the y direction may have an electromagnetically parallel relationship. When the resonator 10 has a plurality of capacitive parts that are electrically arranged in parallel, the individual capacitive errors can be mutually complemented.

When the resonator 10 is in a resonance state, current flowing through the pair conductors 30, the third conductor 40, and the fourth conductor 50 loops. When the resonator 10 is in the resonance state, an alternating current is flowing through the resonator 10. In the resonator 10, the current flowing through the third conductor 40 is a first current, and the current flowing through the fourth conductor 50 is a second current. When the resonator 10 is in the resonance state, the first current flows in a direction different from the second current in the x direction. For example, when the first current flows in a +x direction, the second current flows in a −x direction. For example, when the first current flows in the −x direction, the second current flows in the +x direction. That is, when the resonator 10 is in the resonance state, the loop current alternately flows in the +x direction and the −x direction. The resonator 10 radiates an electromagnetic wave by repeating inversion of a loop current that creates a magnetic field.

In a plurality of embodiments, the third conductor 40 includes a first conductive layer 41 and a second conductive layer 42. Since the first conductive layer 41 and the second conductive layer 42 are capacitively coupled to each other in the third conductor 40, it seems that the current is globally flowing in one direction in the resonance state. In a plurality of embodiments, the current flowing through each conductor has a high density at the ends in the y direction.

In the resonator 10, the first current and the second current loop through the pair conductors 30. In the resonator 10, the first conductor 31, the second conductor 32, the third conductor 40, and the fourth conductor 50 form a resonance circuit. The resonance frequency of the resonator 10 is a resonance frequency of a unit resonator. When the resonator 10 includes one unit resonator, or when the resonator 10 includes a part of the unit resonator, the resonance frequency of the resonator 10 varies depending on the electromagnetic coupling of the base 20, the pair conductors 30, the third conductor 40, and the fourth conductor 50 with the surrounding of the resonator 10. For example, when the third conductor 40 has poor periodicity, the entire resonator 10 becomes one unit resonator or a part of one unit resonator. For example, the resonance frequency of the resonator 10 varies depending on the length of the first conductor 31 and the second conductor 32 in the z direction, the length of the third conductor 40 and the fourth conductor 50 in the x direction, and the capacitance of the third conductor 40 and the fourth conductor 50. For example, in the resonator 10 in which the capacitance between the first unit conductor 411 and the second unit conductor 421 is large, it is possible to lower the resonance frequency while shortening the length of the first conductor 31 and the second conductor 32 in the z direction and the length of the third conductor 40 and the fourth conductor 50 in the x direction.

In a plurality of embodiments, in the resonator 10, the first conductive layer 41 serves as an effective radiation surface of electromagnetic waves in the z direction. In a plurality of embodiments, in the resonator 10, the first surface integral of the first conductive layer 41 is larger than the first surface integral of another conductive layer. The resonator 10 may increase the radiation of electromagnetic waves by increasing the first surface integral of the first conductive layer 41.

In a plurality of embodiments, the resonator 10 may include one or more impedance elements 45. The impedance element 45 has an impedance value between a plurality of terminals. The impedance element 45 changes the resonance frequency of the resonator 10. The impedance element 45 may include a resistor (Resistor), a capacitor (Capacitor), and an inductor (Inductor). The impedance element 45 may include a variable element whose impedance value may be changed. The variable element may change the impedance value according to an electric signal. The variable element may change the impedance value by a physical mechanism.

The impedance elements 45 may be connected to two unit conductors of the third conductor 40 arranged in the x direction. The impedance elements 45 may be connected to two first unit conductors 411 arranged in the x direction. The impedance elements 45 may be connected to the first connecting conductor 413 and the first floating conductor 414, which are arranged in the x direction. The impedance elements 45 may be connected to the first conductor 31 and the first floating conductor 414. The impedance elements 45 are connected to the unit conductor of the third conductor 40 at the central portion in the y direction. The impedance elements 45 are connected to the central portion of two first unit conductors 411 in the y direction.

The impedance elements 45 are electrically connected in series between two conductors arranged in the x direction in the xy plane. The impedance elements 45 may be electrically connected in series between two first unit conductors 411 arranged in the x direction. The impedance elements 45 may be electrically connected in series between the first connecting conductor 413 and the first floating conductor 414, which are arranged in the x direction. The impedance elements 45 may be electrically connected in series between the first conductor 31 and the first floating conductor 414.

The impedance elements 45 may be electrically connected in parallel to two first unit conductors 411 and the second unit conductor 421 that are stacked in the z direction and have capacitance. The impedance elements 45 may be electrically connected in parallel to the second connecting conductor 423 and the first floating conductor 414 that are stacked in the z direction and have capacitance.

The resonator 10 may reduce the resonance frequency by adding a capacitor as the impedance element 45. The resonator 10 may have a high resonance frequency by adding an inductor as the impedance element 45. The resonator 10 may include impedance elements 45 having different impedance values. The resonator 10 may include capacitors having different electric capacities as the impedance elements 45. The resonator 10 may include inductors having different inductances as the impedance elements 45. In the resonator 10, an adjustment range of the resonance frequency is caused to be large by adding the impedance elements 45 having different impedance values. The resonator 10 may include both a capacitor and an inductor as the impedance elements 45. In the resonator 10, the adjustment range of the resonance frequency is caused to be large by adding both the capacitor and the inductor as the impedance elements 45. Since the resonator 10 includes the impedance elements 45, the entire resonator may be one unit resonator, or the entire resonator may be a part of one unit resonator.

Figure 1:
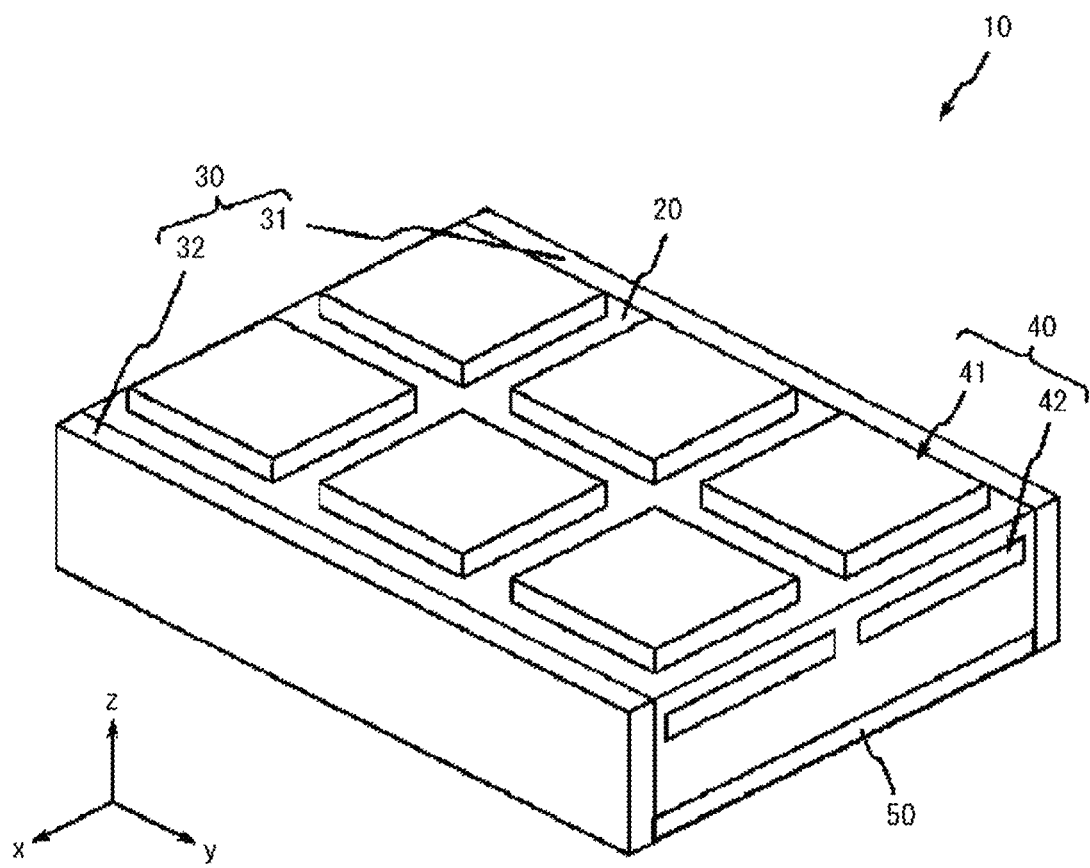
FIG. 1 is a perspective view illustrating one embodiment of a resonator.
Figure 2:
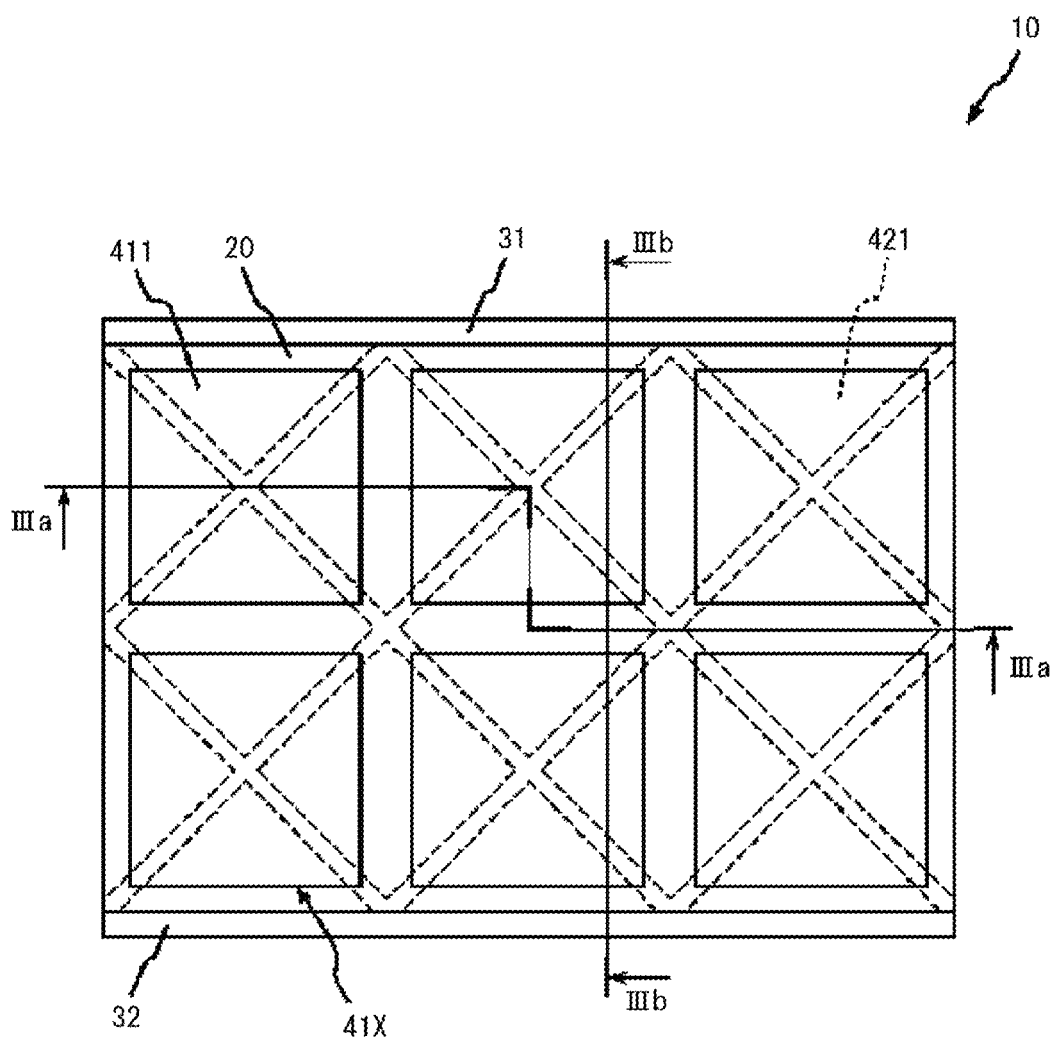
FIG. 2 is a plan view of the resonator illustrated in FIG. 1.
Figure 3A:
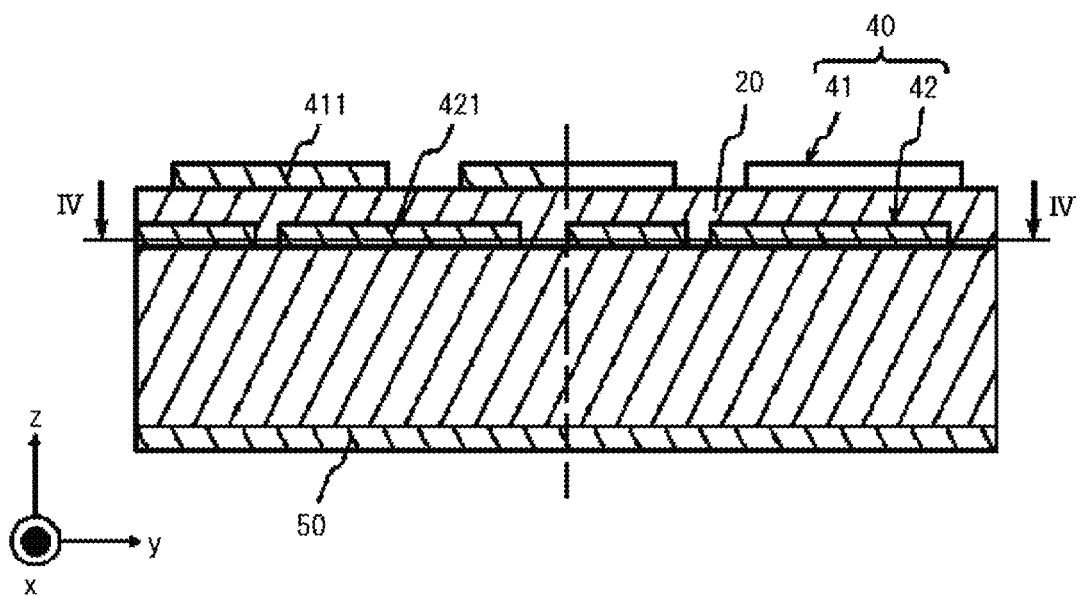
FIG. 3A is a cross-sectional view of the resonator illustrated in FIG. 1.
Figure 3B:
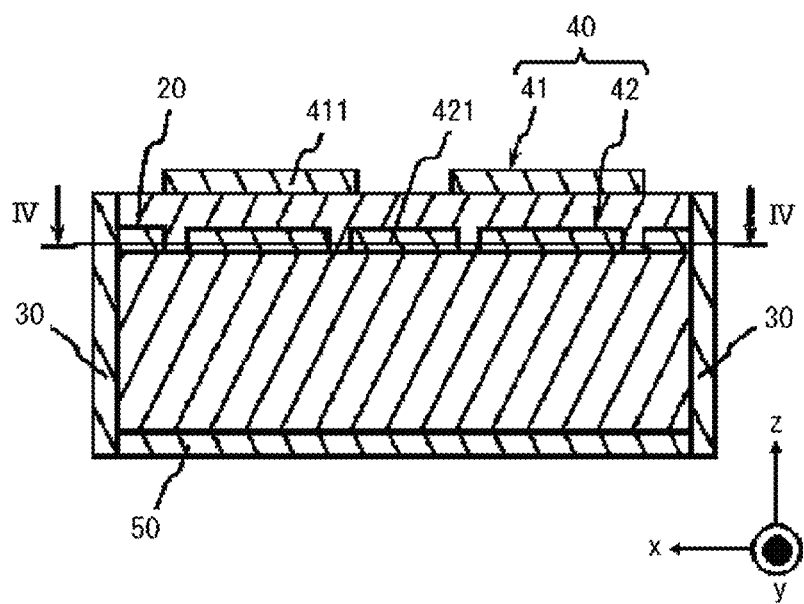
FIG. 3B is a cross-sectional view of the resonator illustrated in FIG. 1.
Figure 4:
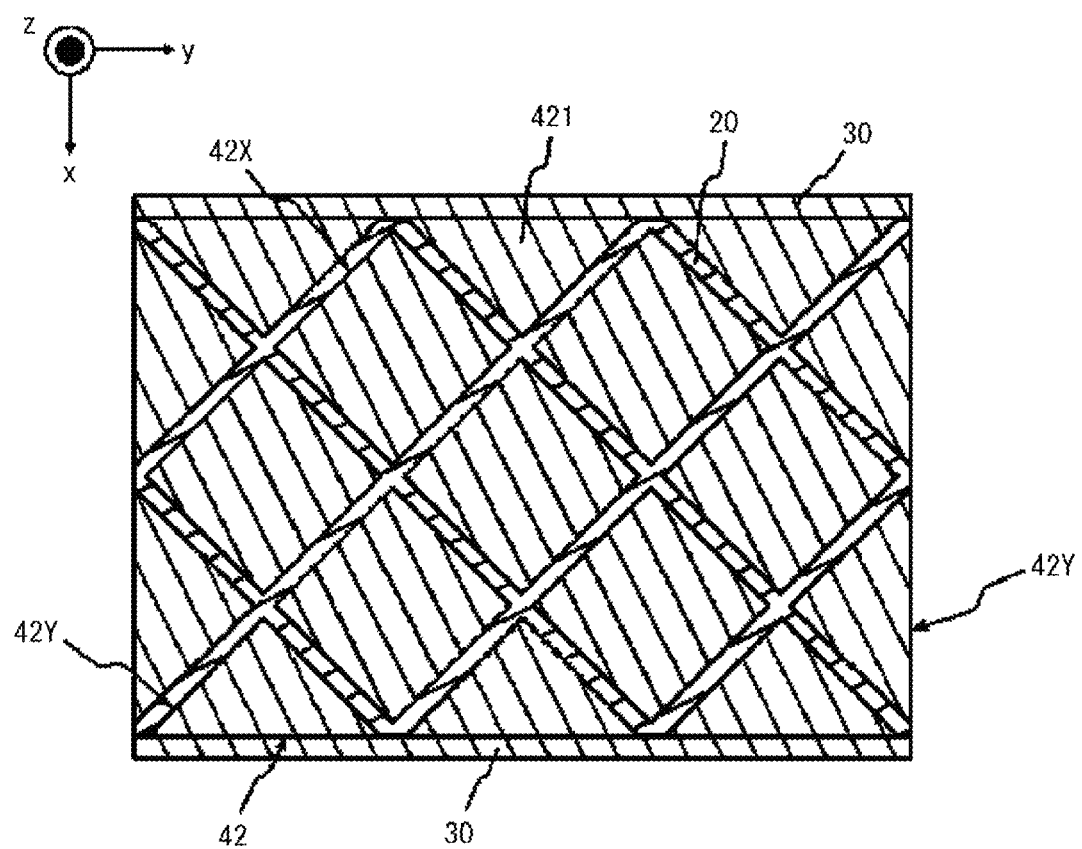
FIG. 4 is a cross-sectional view of the resonator illustrated in FIG. 1.
Figure 5:
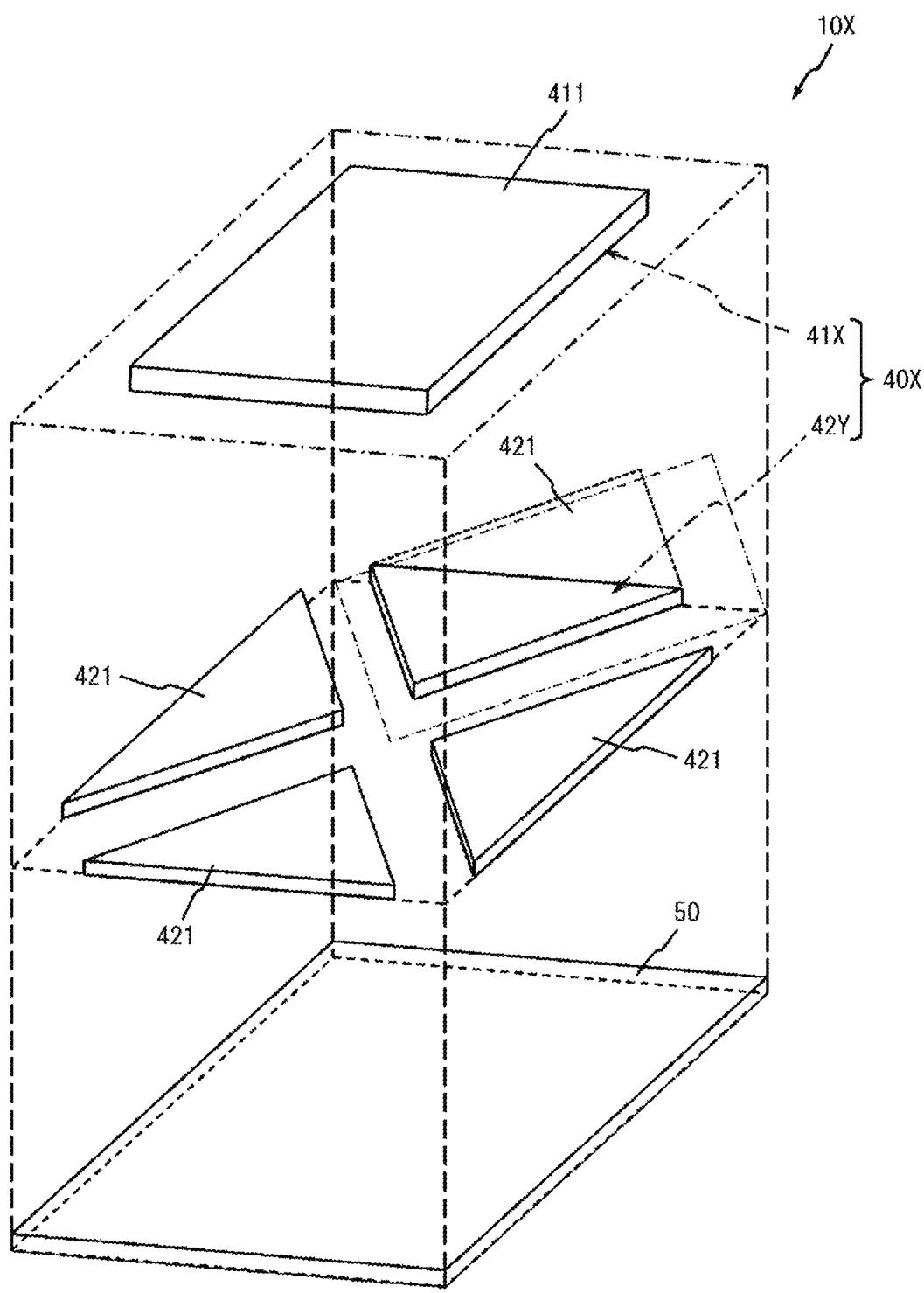
FIG. 5 is a conceptual view illustrating a unit structure of the resonator illustrated in FIG. 1.

FIGS. 1 to 5 are views illustrating a resonator 10, which is an example of a plurality of embodiments. FIG. 1 is a schematic view of the resonator 10. FIG. 2 is a plan view of the xy plane from the z direction. FIG. 3A is a cross-sectional view taken along line IIIa-IIIa illustrated in FIG. 2. FIG. 3B is a cross-sectional view taken along line IIIb-IIIb illustrated in FIG. 2. FIG. 4 is a cross-sectional view taken along line IV-IV illustrated in FIGS. 3A and 3B. FIG. 5 is a conceptual view illustrating a unit structure 10X that is an example of a plurality of embodiments.

In the resonator 10 illustrated in FIGS. 1 to 5, the first conductive layer 41 includes a patch-type resonator as a first unit resonator 41X. The second conductive layer 42 includes a patch-type resonator as a second unit resonator 42X. The unit resonator 40X includes one first unit resonator 41X and four second divisional resonators 42Y. The unit structure 10X includes the unit resonator 40X as well as a part of the base 20 and a part of the fourth conductor 50 overlapping the unit resonator 40X as viewed in the z direction.

Figure 6:
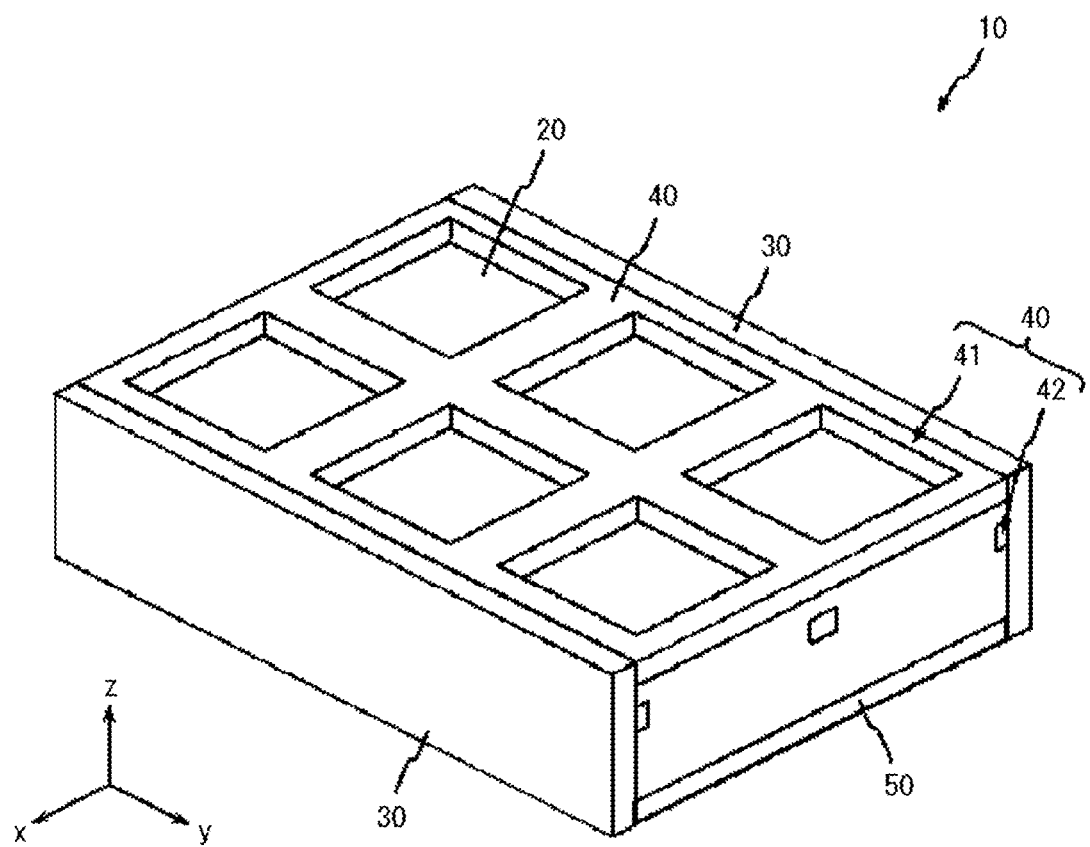
FIG. 6 is a perspective view illustrating one embodiment of a resonator.
Figure 7:
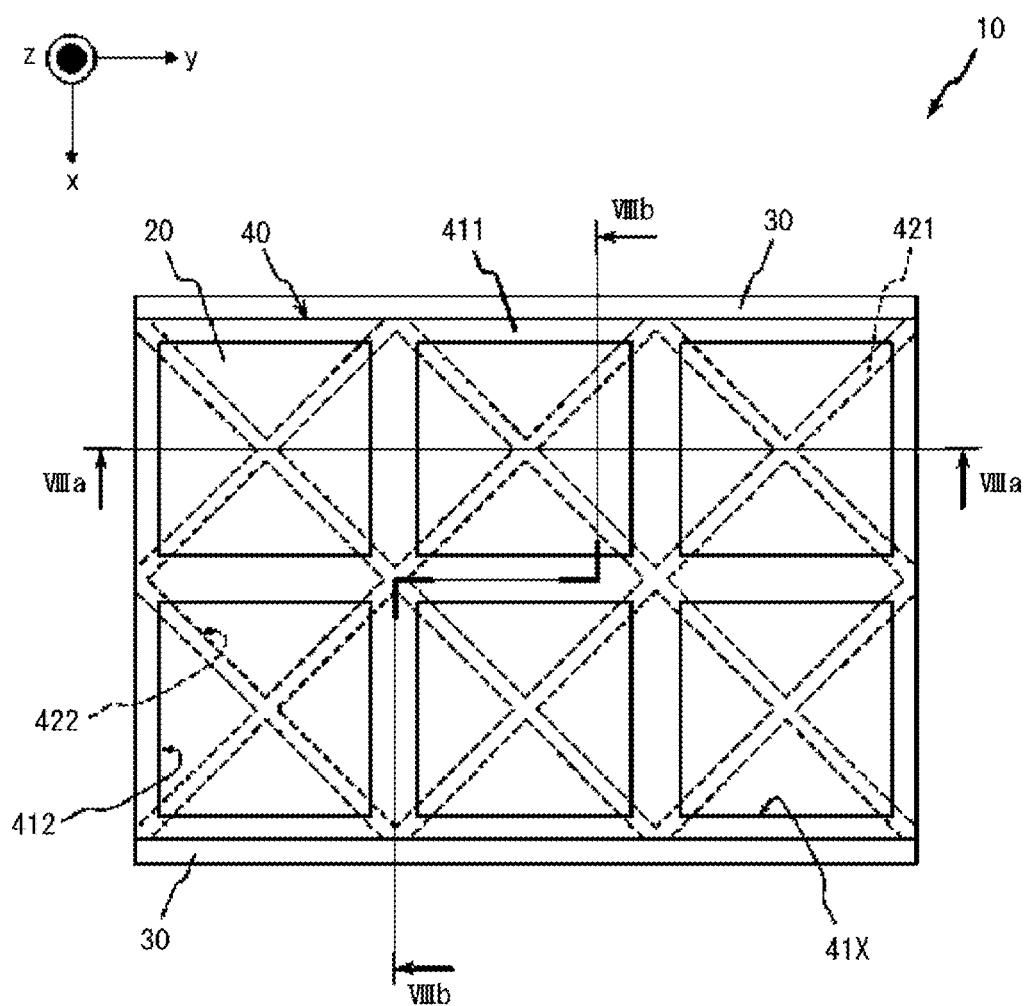
FIG. 7 is a plan view of the resonator illustrated in FIG. 6.
Figure 8A:
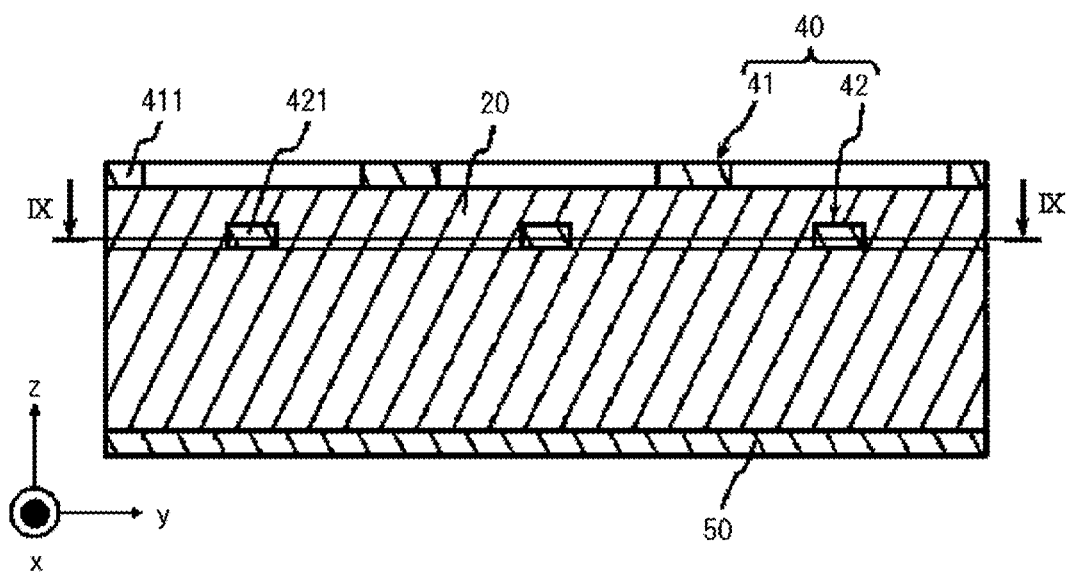
FIG. 8A is a cross-sectional view of the resonator illustrated in FIG. 6.
Figure 8B:
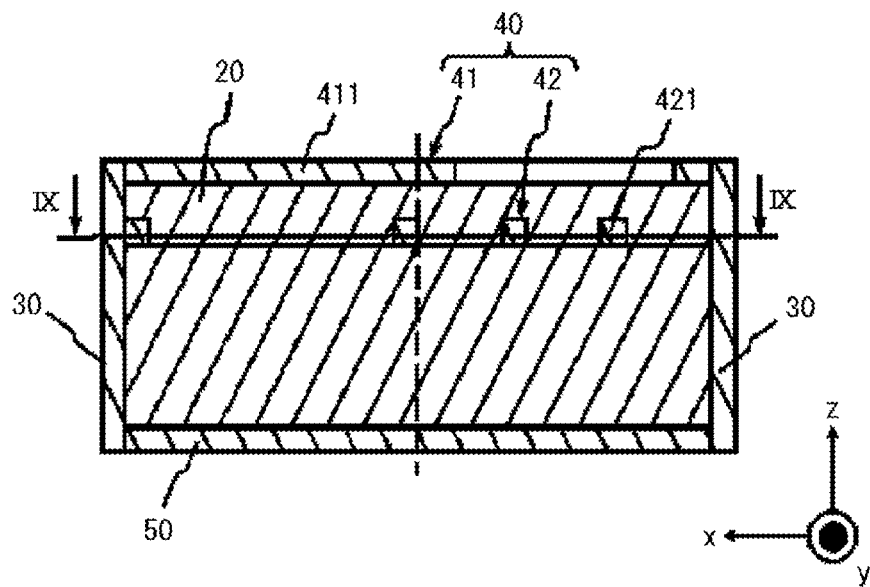
FIG. 8B is a cross-sectional view of the resonator illustrated in FIG. 6.
Figure 9:
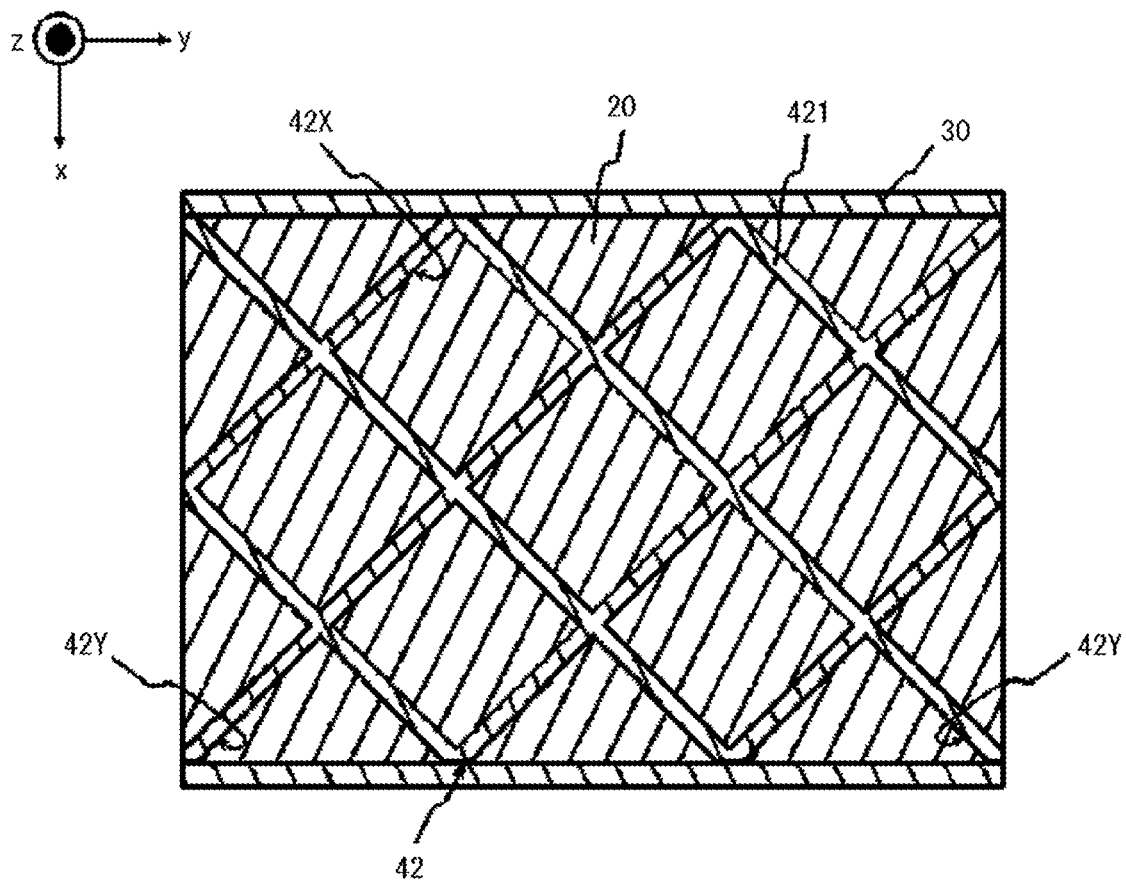
FIG. 9 is a cross-sectional view of the resonator illustrated in FIG. 6.

FIGS. 6 to 9 are views illustrating a resonator 10, which is an example of a plurality of embodiments. FIG. 6 is a schematic view of the resonator 10. FIG. 7 is a plan view of the xy plane from the z direction. FIG. 8A is a cross-sectional view taken along line VIIIa-VIIIa illustrated in FIG. 7. FIG. 8B is a cross-sectional view taken along line VIIIb-VIIIb illustrated in FIG. 7. FIG. 9 is a cross-sectional view taken along line IX-IX illustrated in FIGS. 8A and 8B.

In the resonator 10 illustrated in FIGS. 6 to 9, the first conductive layer 41 includes a slot-type resonator as the first unit resonator 41X. The second conductive layer 42 includes a slot-type resonator as the second unit resonator 42X. The unit resonator 40X includes one first unit resonator 41X and four second divisional resonators 42Y. The unit structure 10X includes the unit resonator 40X as well as a part of the base 20 and a part of the fourth conductor 50 overlapping the unit resonator 40X as viewed in the z direction.

Figure 10:
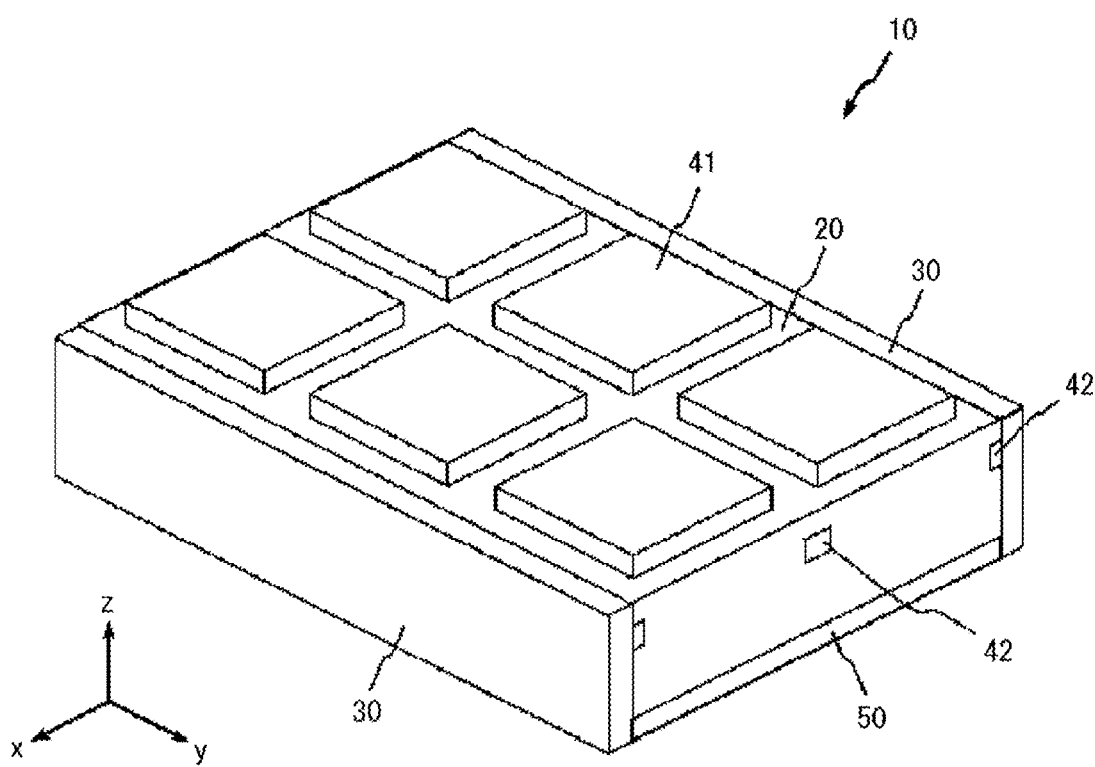
FIG. 10 is a perspective view illustrating one embodiment of a resonator.
Figure 11:
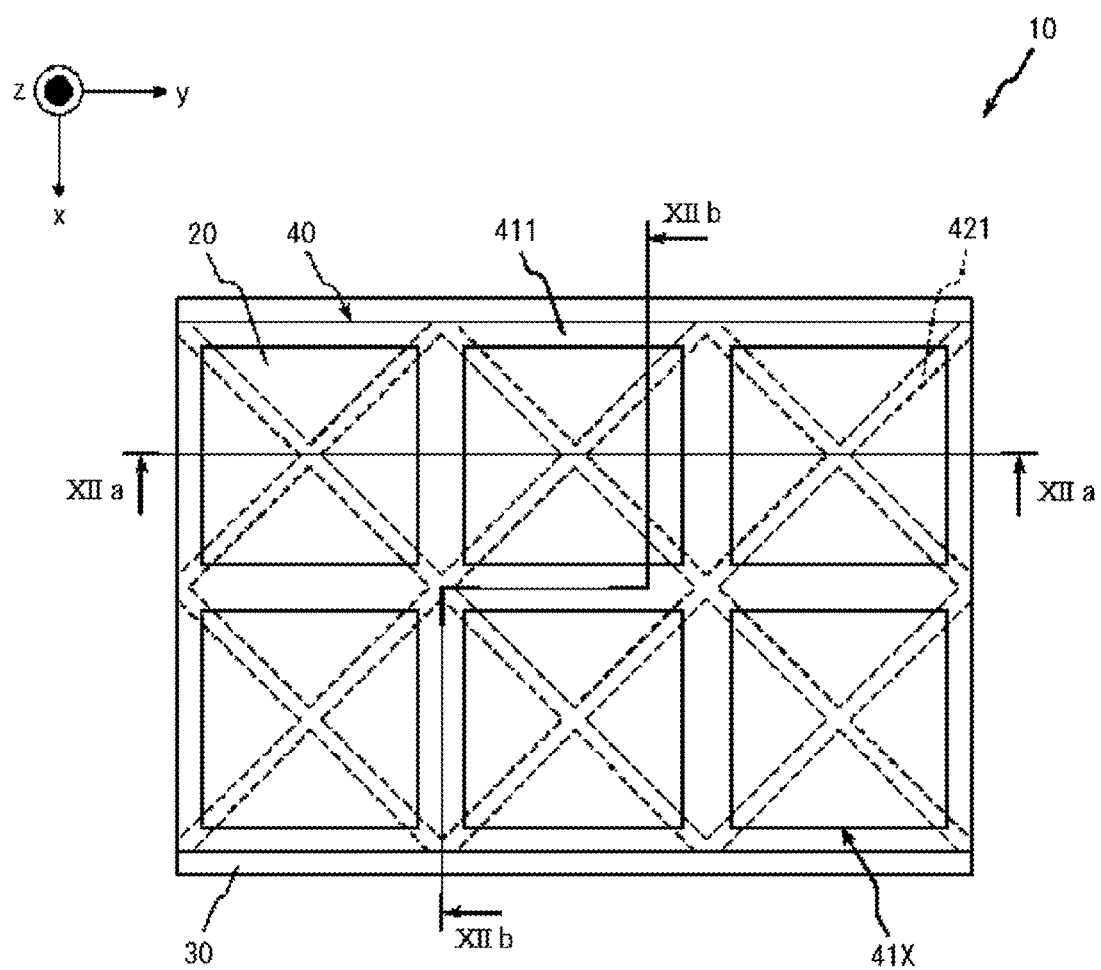
FIG. 11 is a plan view of the resonator illustrated in FIG. 10.
Figure 12A:
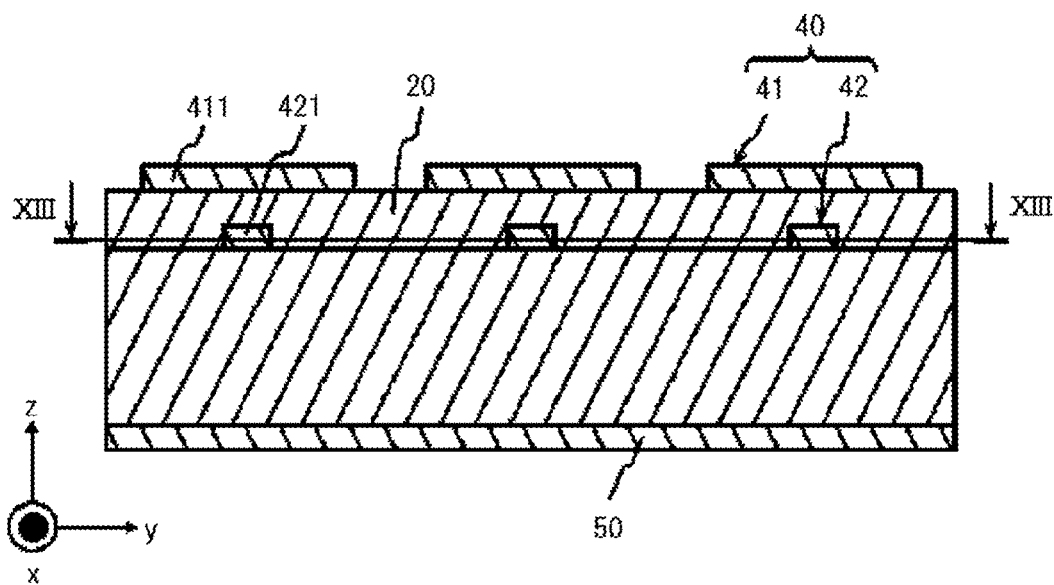
FIG. 12A is a cross-sectional view of the resonator illustrated in FIG. 10.
Figure 12B:
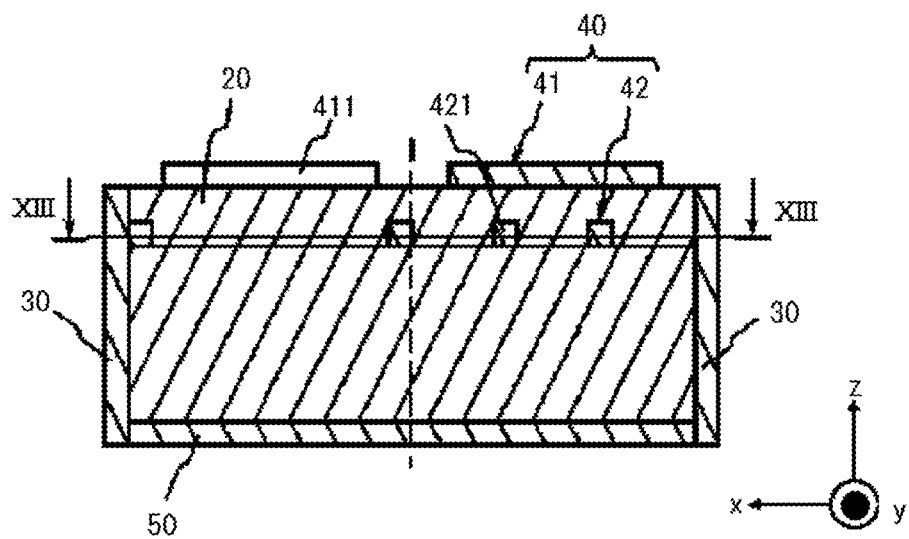
FIG. 12B is a cross-sectional view of the resonator illustrated in FIG. 10.
Figure 13:
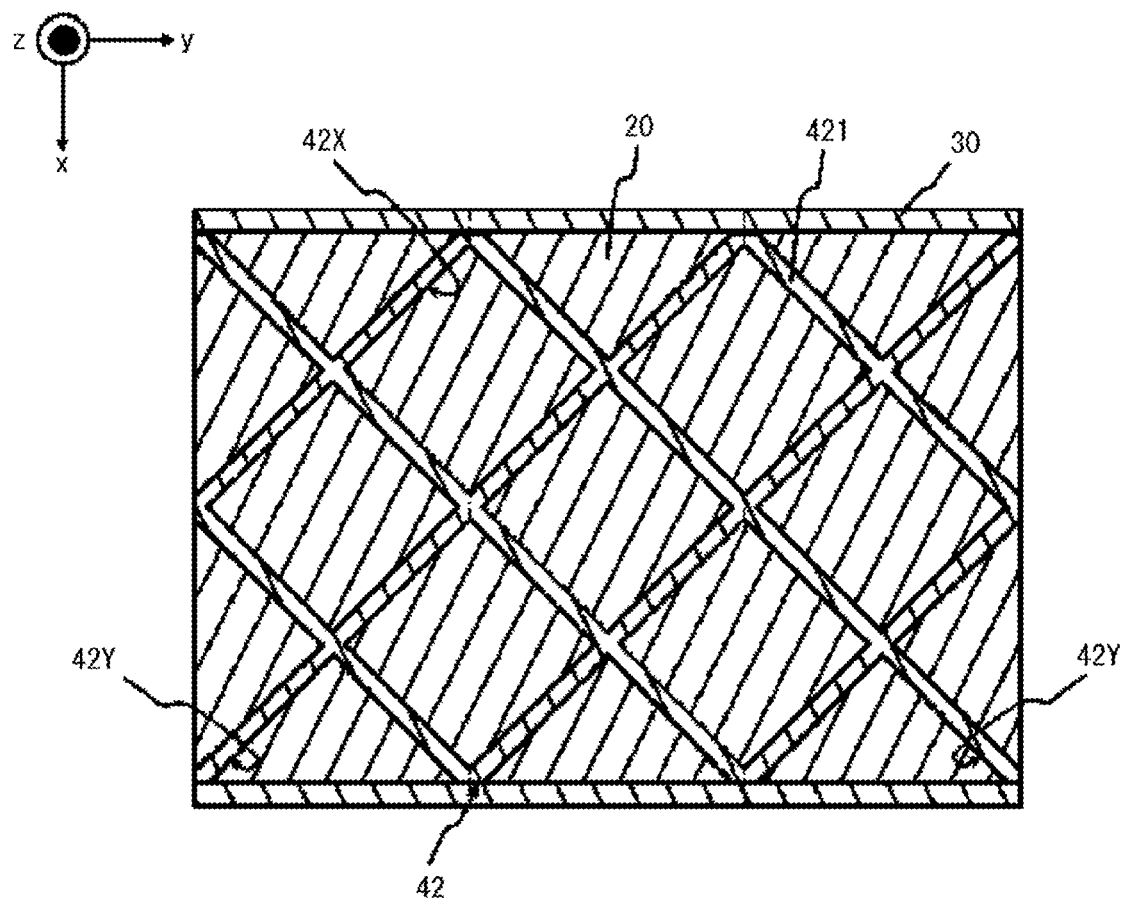
FIG. 13 is a cross-sectional view of the resonator illustrated in FIG. 10.

FIGS. 10 to 13 are views illustrating a resonator 10, which is an example of a plurality of embodiments. FIG. 10 is a schematic view of the resonator 10. FIG. 11 is a plan view of the xy plane from the z direction. FIG. 12A is a cross-sectional view taken along line XIIa-XIIa illustrated in FIG. 11. FIG. 12B is a cross-sectional view taken along line XIIb-XIIb illustrated in FIG. 11. FIG. 13 is a cross-sectional view taken along line XIII-XIII illustrated in FIGS. 12A and 12B.

In the resonator 10 illustrated in FIGS. 10 to 13, the first conductive layer 41 includes a patch-type resonator as the first unit resonator 41X. The second conductive layer 42 includes a slot-type resonator as the second unit resonator 42X. The unit resonator 40X includes one first unit resonator 41X and four second divisional resonators 42Y. The unit structure 10X includes the unit resonator 40X as well as a part of the base 20 and a part of the fourth conductor 50 overlapping the unit resonator 40X as viewed in the z direction.

Figure 14:
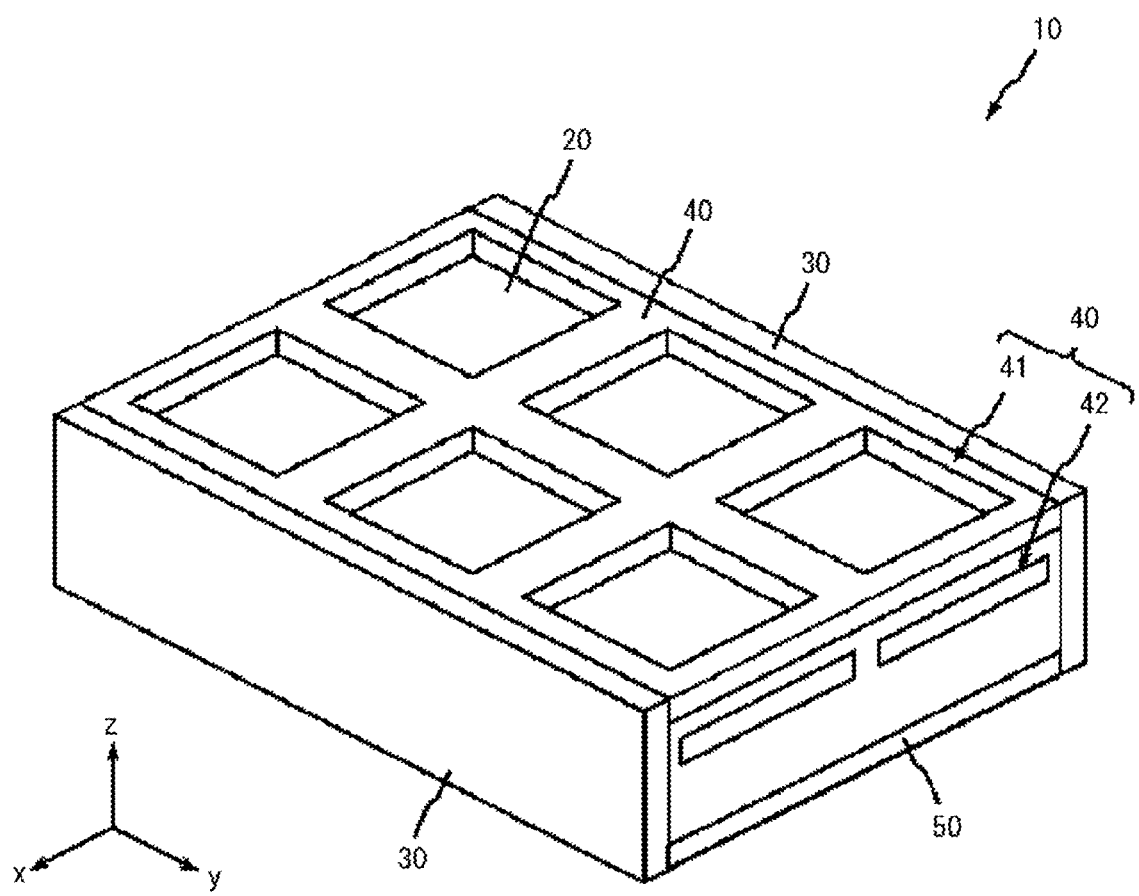
FIG. 14 is a perspective view illustrating one embodiment of a resonator.
Figure 15:
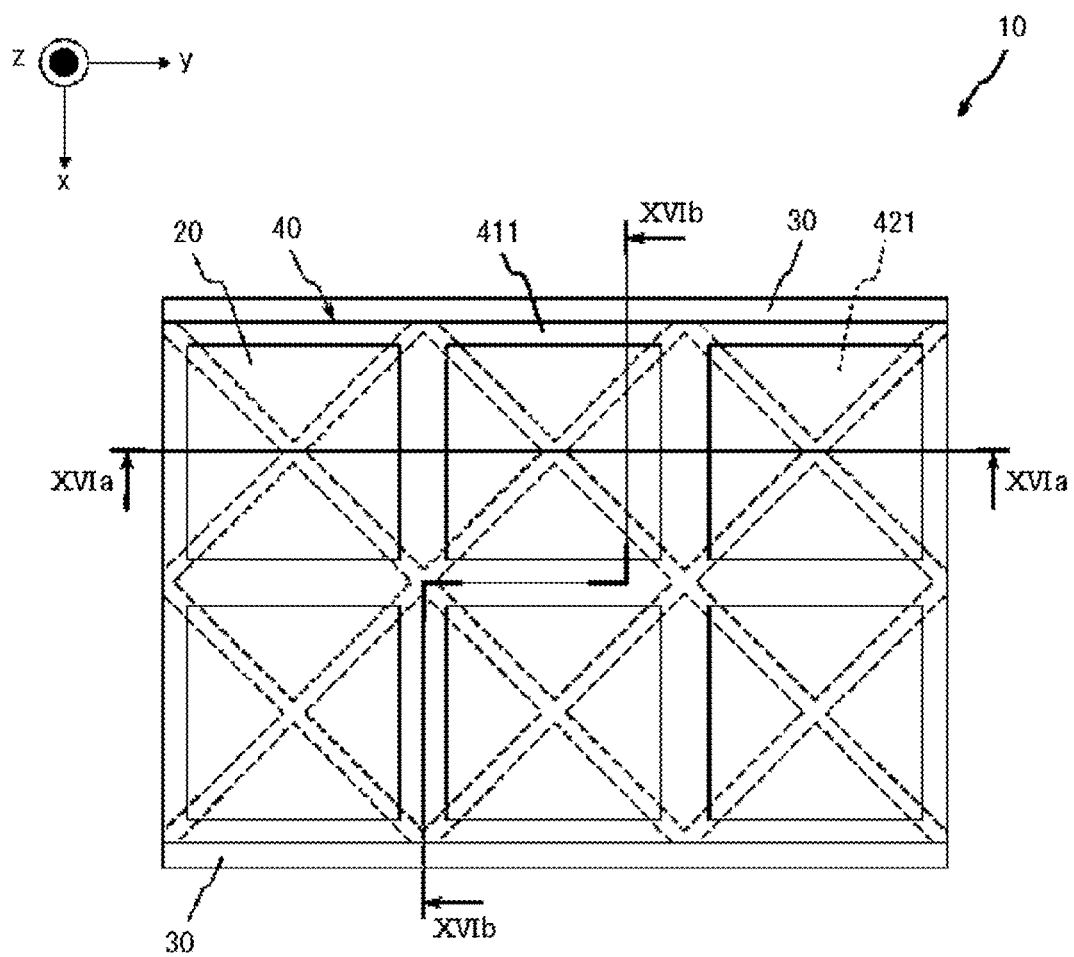
FIG. 15 is a plan view of the resonator illustrated in FIG. 14.
Figure 16A:
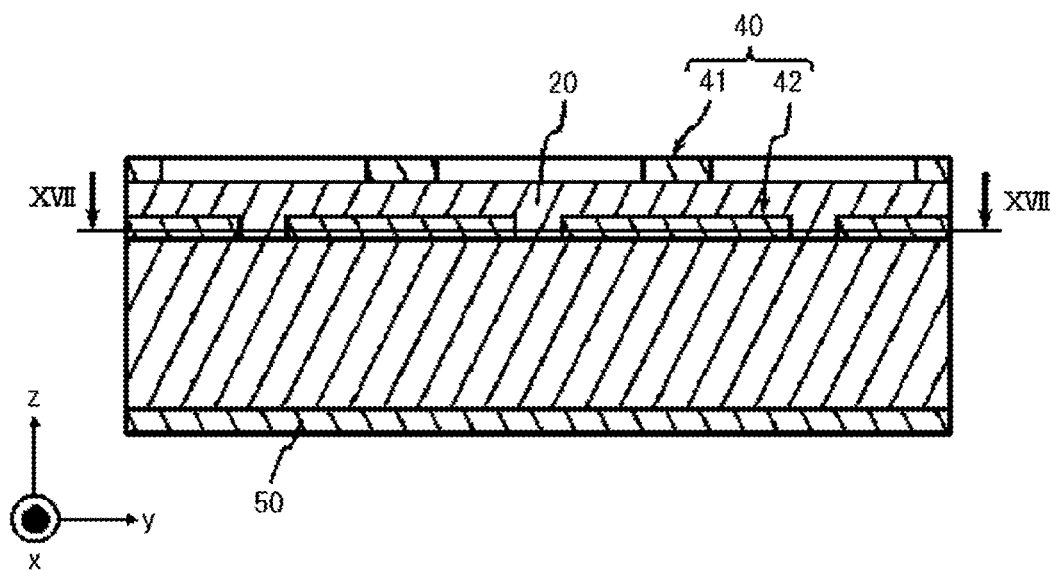
FIG. 16A is a cross-sectional view of the resonator illustrated in FIG. 14.
Figure 16B:
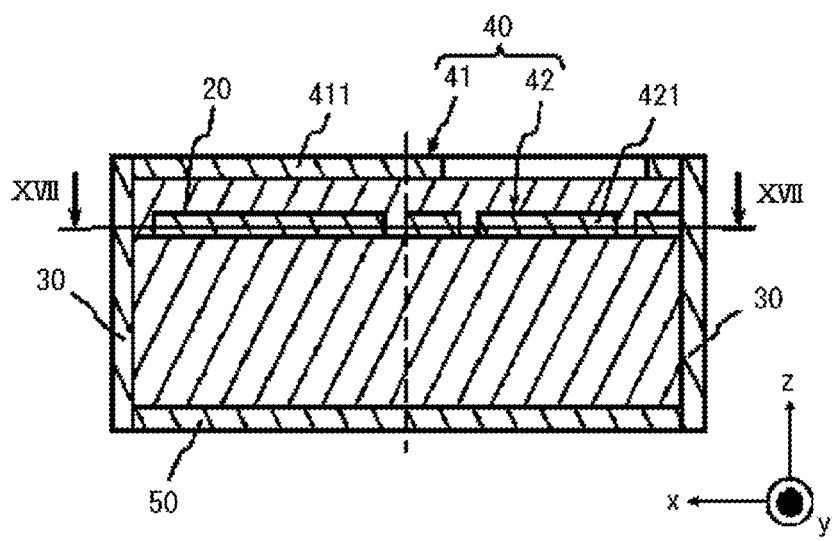
FIG. 16B is a cross-sectional view of the resonator illustrated in FIG. 14.
Figure 17:
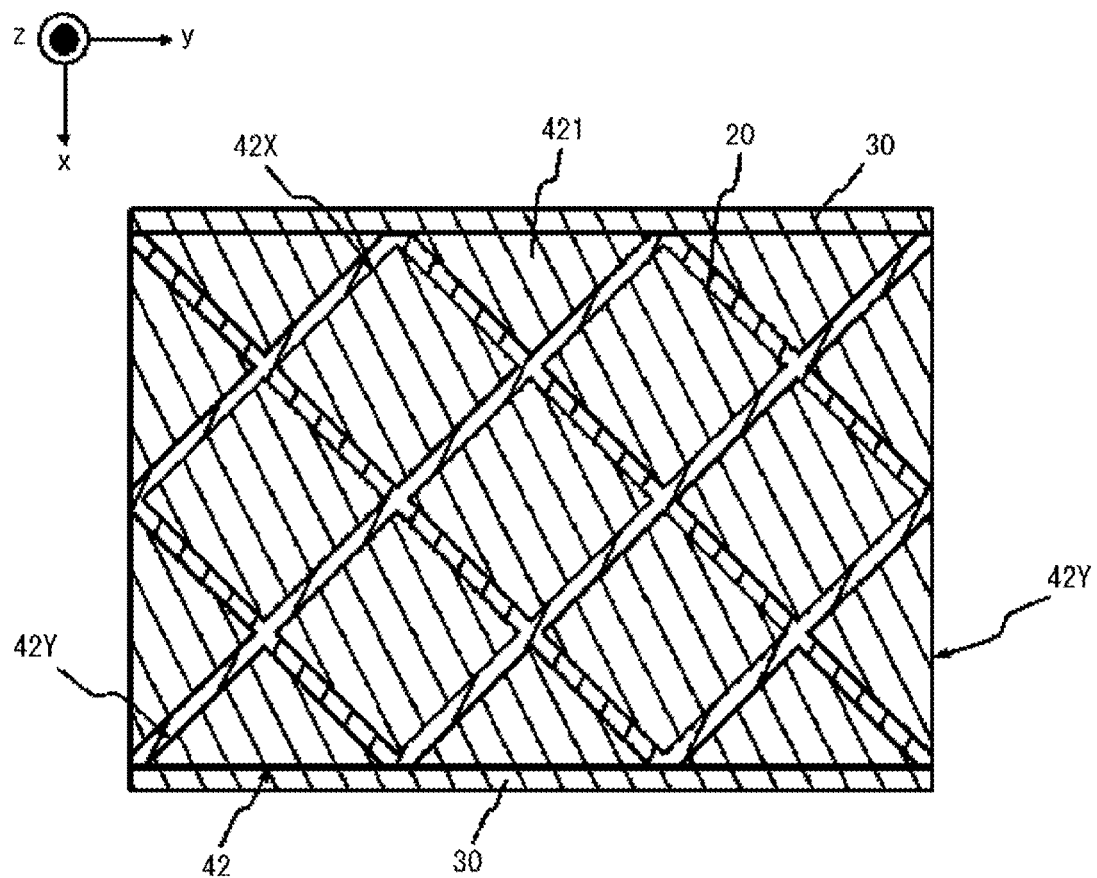
FIG. 17 is a cross-sectional view of the resonator illustrated in FIG. 14.

FIGS. 14 to 17 are views illustrating a resonator 10, which is an example of a plurality of embodiments. FIG. 14 is a schematic view of the resonator 10. FIG. 15 is a plan view of the xy plane from the z direction. FIG. 16A is a cross-sectional view taken along line XVIa-XVIa illustrated in FIG. 15. FIG. 16B is a cross-sectional view taken along line XVIb-XVIb illustrated in FIG. 15. FIG. 17 is a cross-sectional view taken along line XVII-XVII illustrated in FIGS. 16A and 16B.

In the resonator 10 illustrated in FIGS. 14 to 17, the first conductive layer 41 includes a slot-type resonator as the first unit resonator 41X. The second conductive layer 42 includes a patch-type resonator as a second unit resonator 42X. The unit resonator 40X includes one first unit resonator 41X and four second divisional resonators 42Y. The unit structure 10X includes the unit resonator 40X as well as a part of the base 20 and a part of the fourth conductor 50 overlapping the unit resonator 40X as viewed in the z direction.

Figure 18:
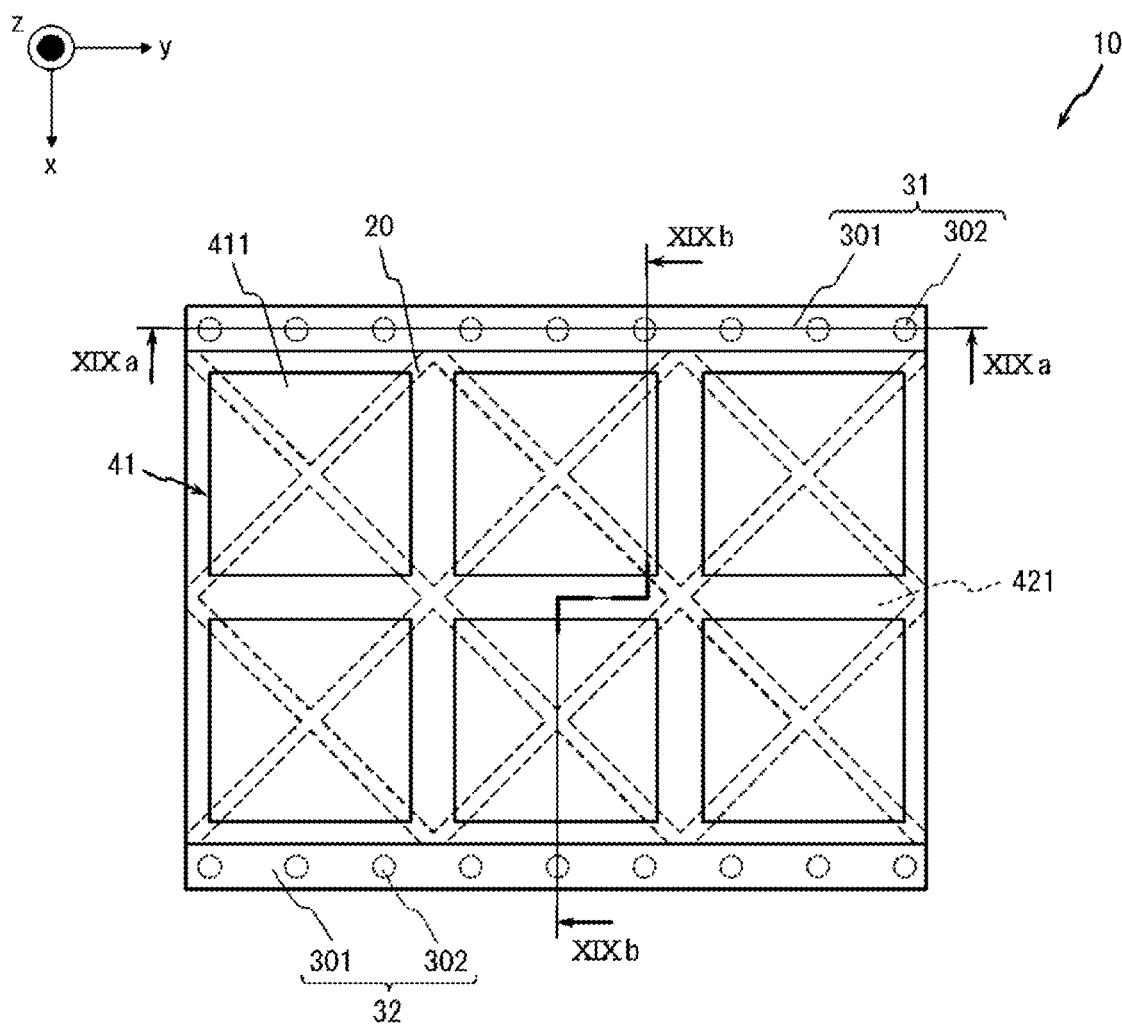
FIG. 18 is a plan view illustrating one embodiment of a resonator.
Figure 19A:
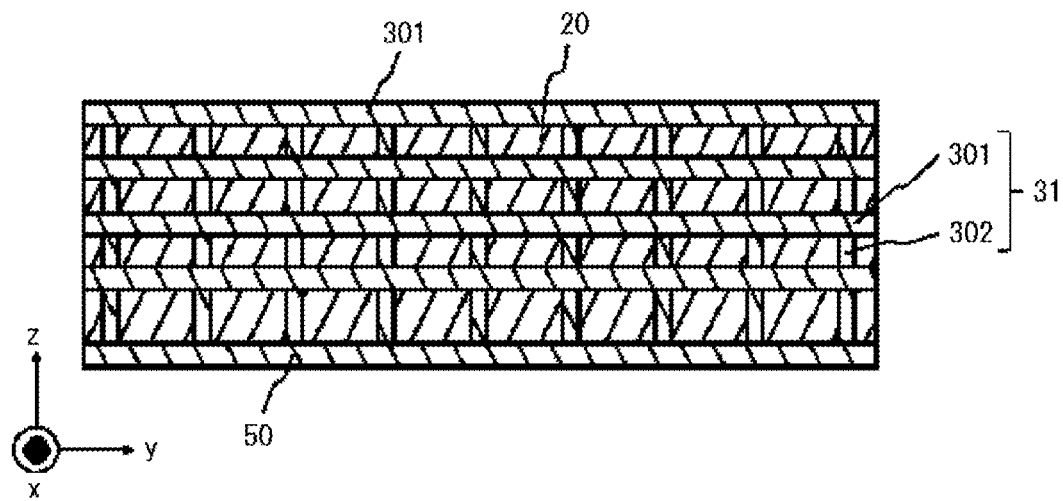
FIG. 19A is a cross-sectional view of the resonator illustrated in FIG. 18.
Figure 19B:
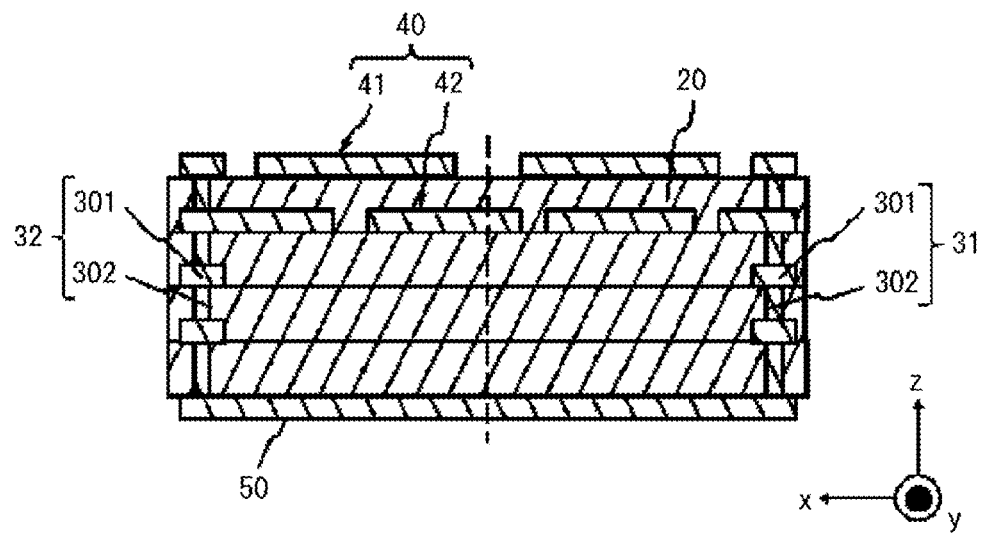
FIG. 19B is a cross-sectional view of the resonator illustrated in FIG. 18.

The resonator 10 illustrated in FIGS. 1 to 17 is an example. The configuration of the resonator 10 is not limited to the structure illustrated in FIGS. 1 to 17. FIG. 18 is a view illustrating a resonator 10 including pair conductors 30 having another configuration. FIG. 19A is a cross-sectional view taken along line XIXa-XIXa illustrated in FIG. 18. FIG. 19B is a cross-sectional view taken along line XIXb-XIXb illustrated in FIG. 18.

Figure 20:
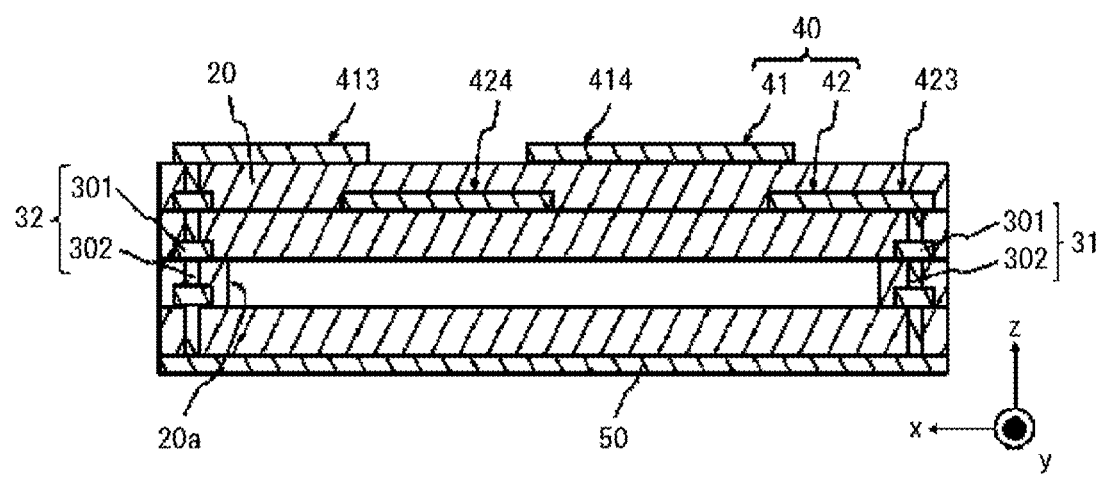
FIG. 20 is a cross-sectional view illustrating one embodiment of a resonator.

The base 20 illustrated in FIGS. 1 to 19 is an example. The configuration of the base 20 is not limited to the configuration illustrated in FIGS. 1 to 19. The base 20 may include a cavity 20a therein, as illustrated in FIG. 20. The cavity 20a is located between the third conductor 40 and the fourth conductor 50 in the z direction. A dielectric constant of the cavity 20a is lower than that of the base 20. When the base 20 has the cavity 20a, an electromagnetic distance between the third conductor 40 and the fourth conductor 50 can be shortened.

Figure 21:
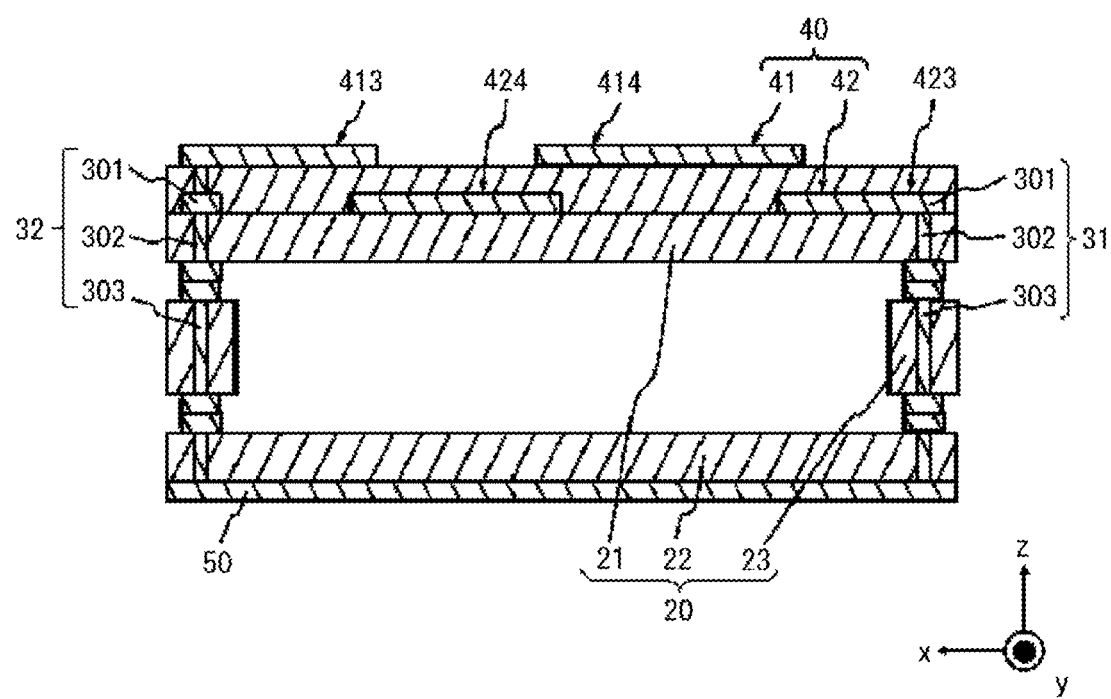
FIG. 21 is a plan view of one embodiment of the resonator.

The base 20 may include a plurality of members, as illustrated in FIG. 21. The base 20 may include a first base 21, a second base 22, and a connector 23. The first base 21 and the second base 22 may be mechanically connected via the connector 23. The connector 23 may include a sixth conductor 303 therein. The sixth conductor 303 is electrically connected to the fifth conductive layer 301 or the fifth conductor 302. The sixth conductor 303 is combined with the fifth conductive layer 301 and the fifth conductor 302 into the first conductor 31 or the second conductor 32.

Figure 22A:
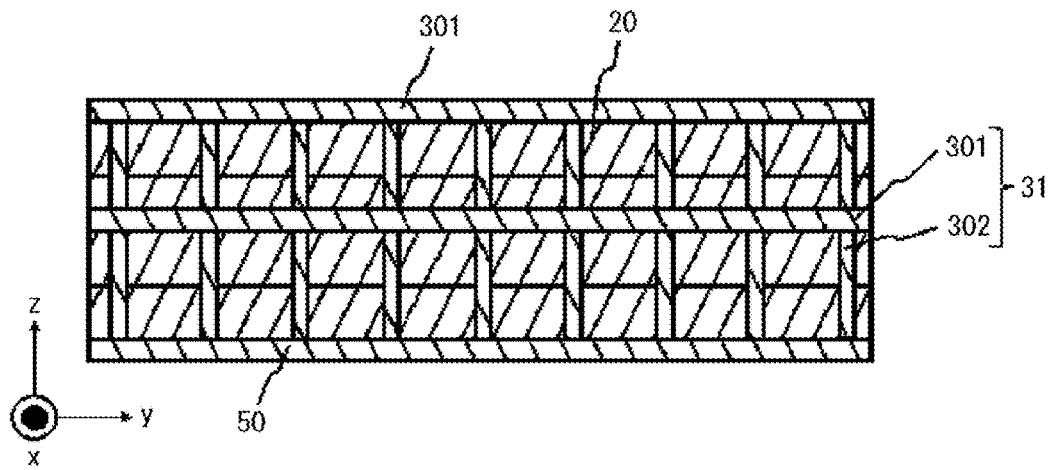
FIG. 22A is a cross-sectional view illustrating one embodiment of the resonator.
Figure 22B:
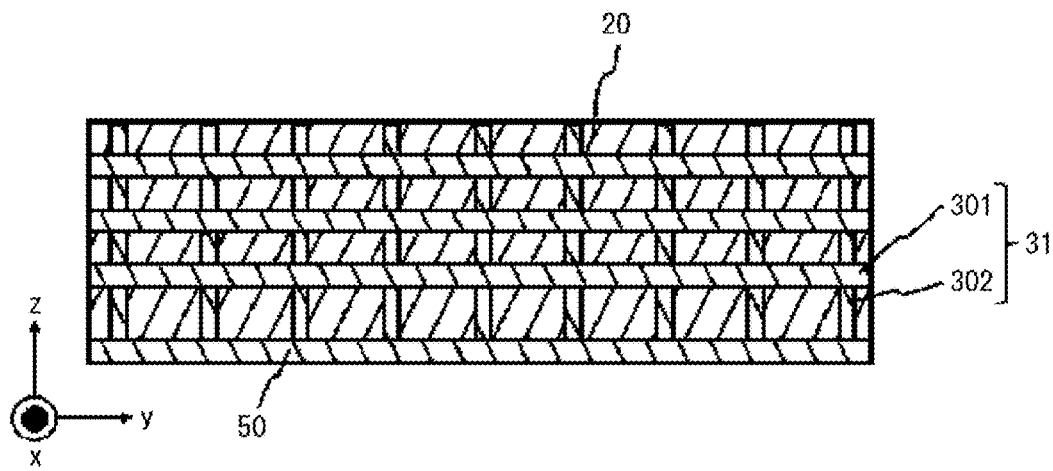
FIG. 22B is a cross-sectional view illustrating one embodiment of the resonator.
Figure 22C:
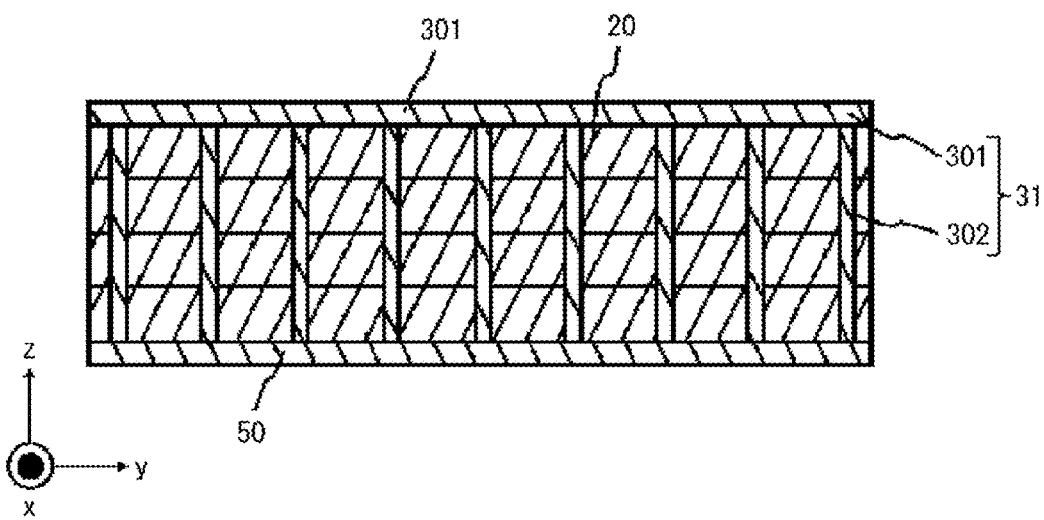
FIG. 22C is a cross-sectional view illustrating one embodiment of the resonator.

The pair conductors 30 illustrated in FIGS. 1 to 21 are an example. The configuration of the pair conductors 30 is not limited to the configuration illustrated in FIGS. 1 to 21. FIGS. 22 to 28 are views illustrating a resonator 10 including the pair conductors 30 having another configuration. FIGS. 22A to 22C are cross-sectional views corresponding to FIG. 19A. As illustrated in FIG. 22A, the number of fifth conductive layers 301 may be changed as appropriate. As illustrated in FIG. 22B, the fifth conductive layer 301 may not be located on the base 20. As illustrated in FIG. 22C, the fifth conductive layer 301 may not be located inside the base 20.

Figure 23:
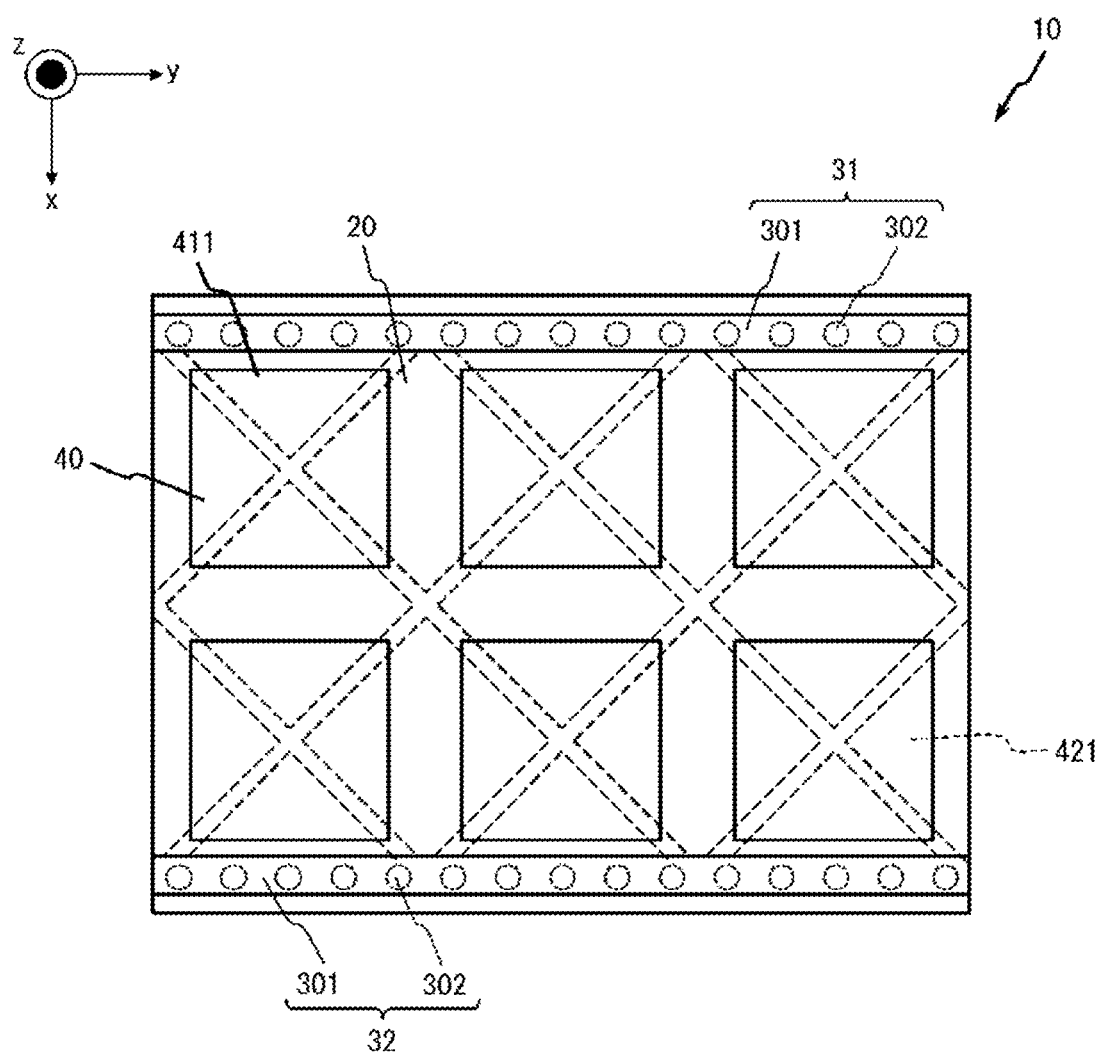
FIG. 23 is a plan view of one embodiment of the resonator.
Figure 24:
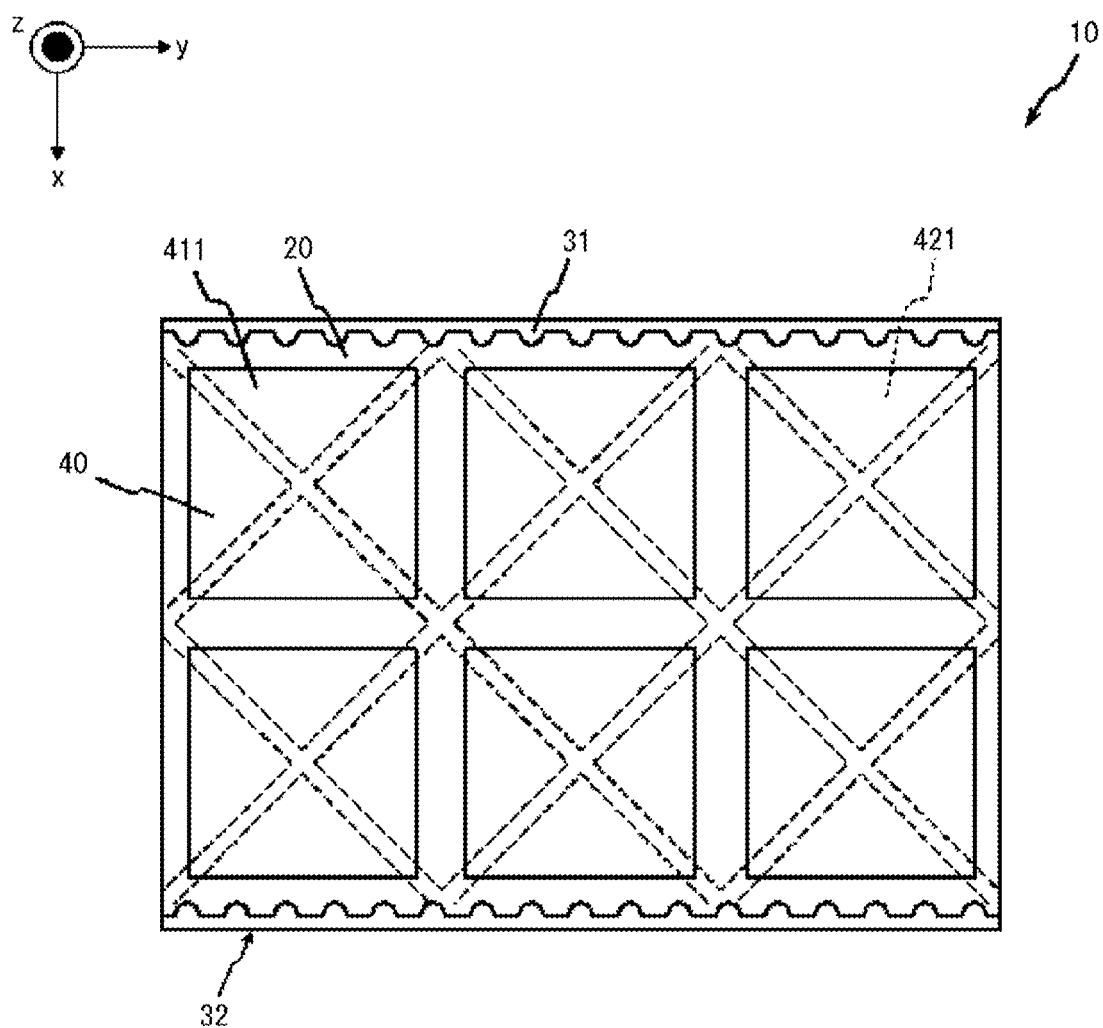
FIG. 24 is a plan view of one embodiment of the resonator.

FIG. 23 is a plan view corresponding to FIG. 18. As illustrated in FIG. 23, the resonator 10 may separate the fifth conductor 302 from a boundary of the unit resonator 40X. FIG. 24 is a plan view corresponding to FIG. 18. As illustrated in FIG. 24, two pair conductors 30 may have convex portions protruding toward the other pair conductor 30 forming a pair. Such a resonator 10 may be formed, for example, by applying metal paste to the base 20 having a concave portion and curing the metal paste.

Figure 25:
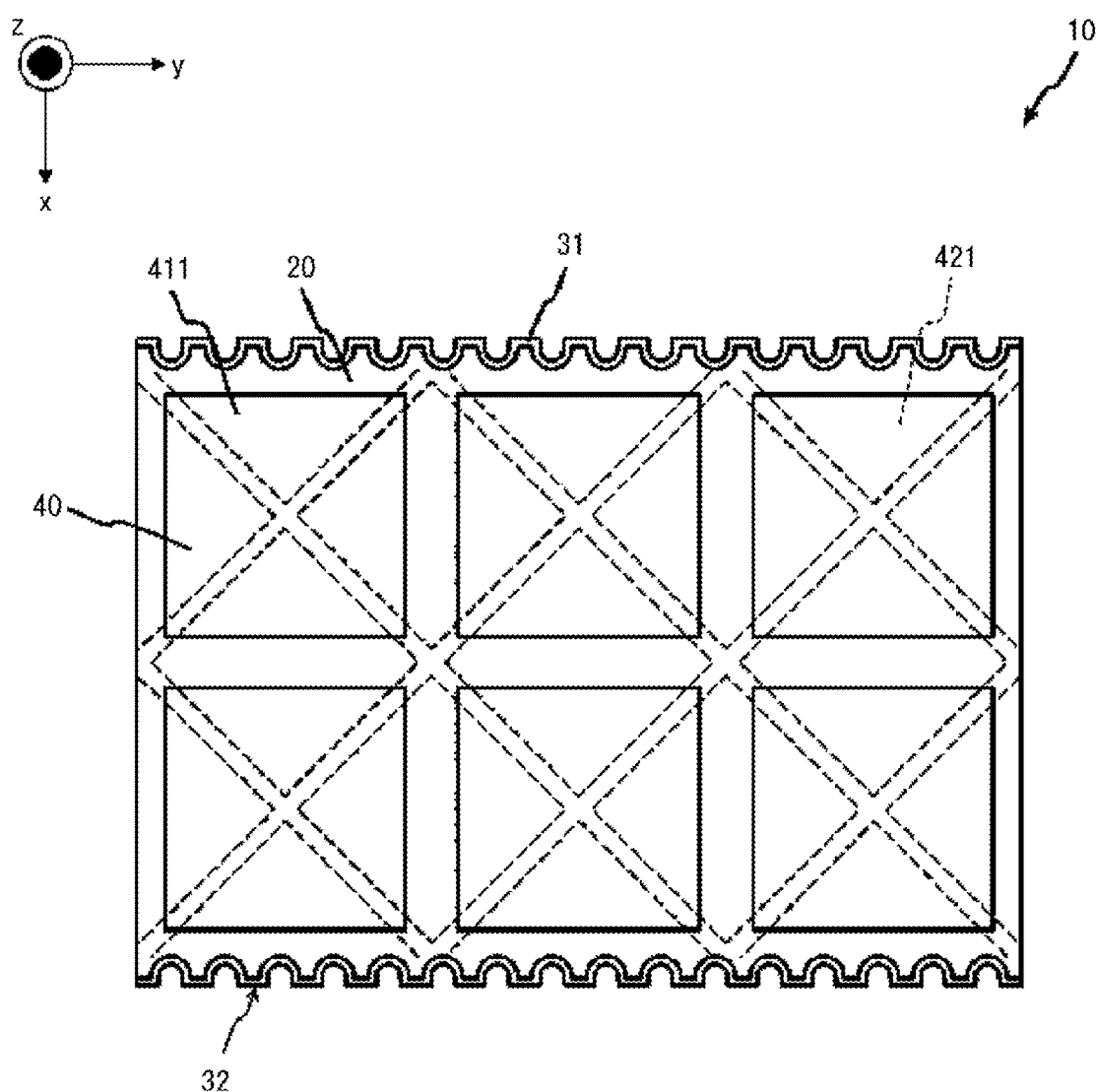
FIG. 25 is a plan view of one embodiment of the resonator.

FIG. 25 is a plan view corresponding to FIG. 18. As illustrated in FIG. 25, the base 20 may have a concave portion. As illustrated in FIG. 25, the pair conductors 30 have the concave portion that is recessed inward from an outer surface in the x direction. As illustrated in FIG. 25, the pair conductors 30 extends along a surface of the base 20. Such a resonator 10 may be formed, for example, by spraying a fine metal material on the base 20 having the concave portion.

Figure 26:
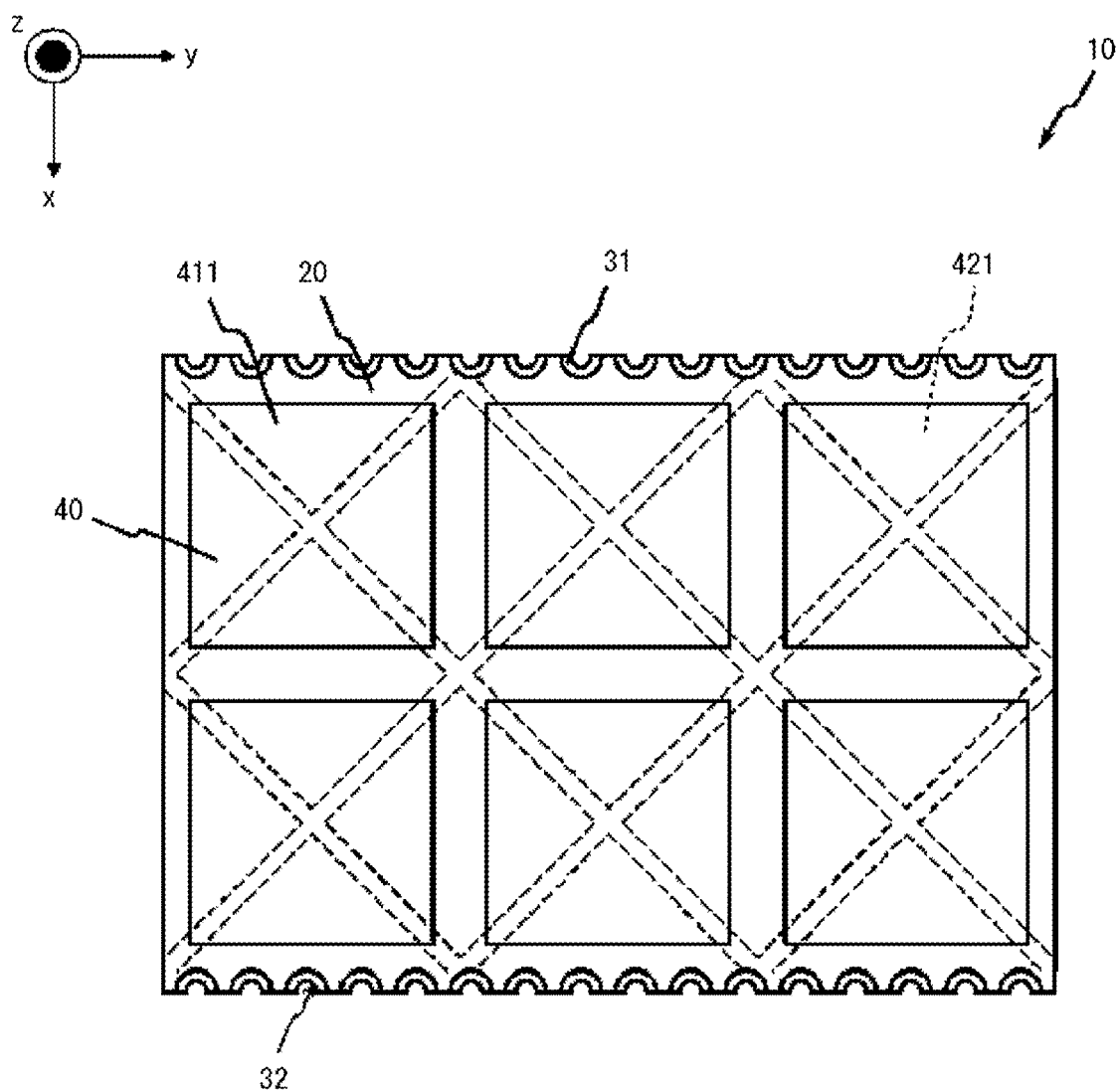
FIG. 26 is a plan view of one embodiment of the resonator.

FIG. 26 is a plan view corresponding to FIG. 18. As illustrated in FIG. 26, the base 20 may have a concave portion. As illustrated in FIG. 26, the pair conductors 30 have the concave portion that is recessed inward from an outer surface in the x direction. As illustrated in FIG. 26, the pair conductors 30 extend along the concave portion of the base 20. Such a resonator 10 may be manufactured, for example, by dividing a motherboard along an array of through-hole conductors. Such pair conductors 30 may be referred to as an end face through hole or the like.

Figure 27:
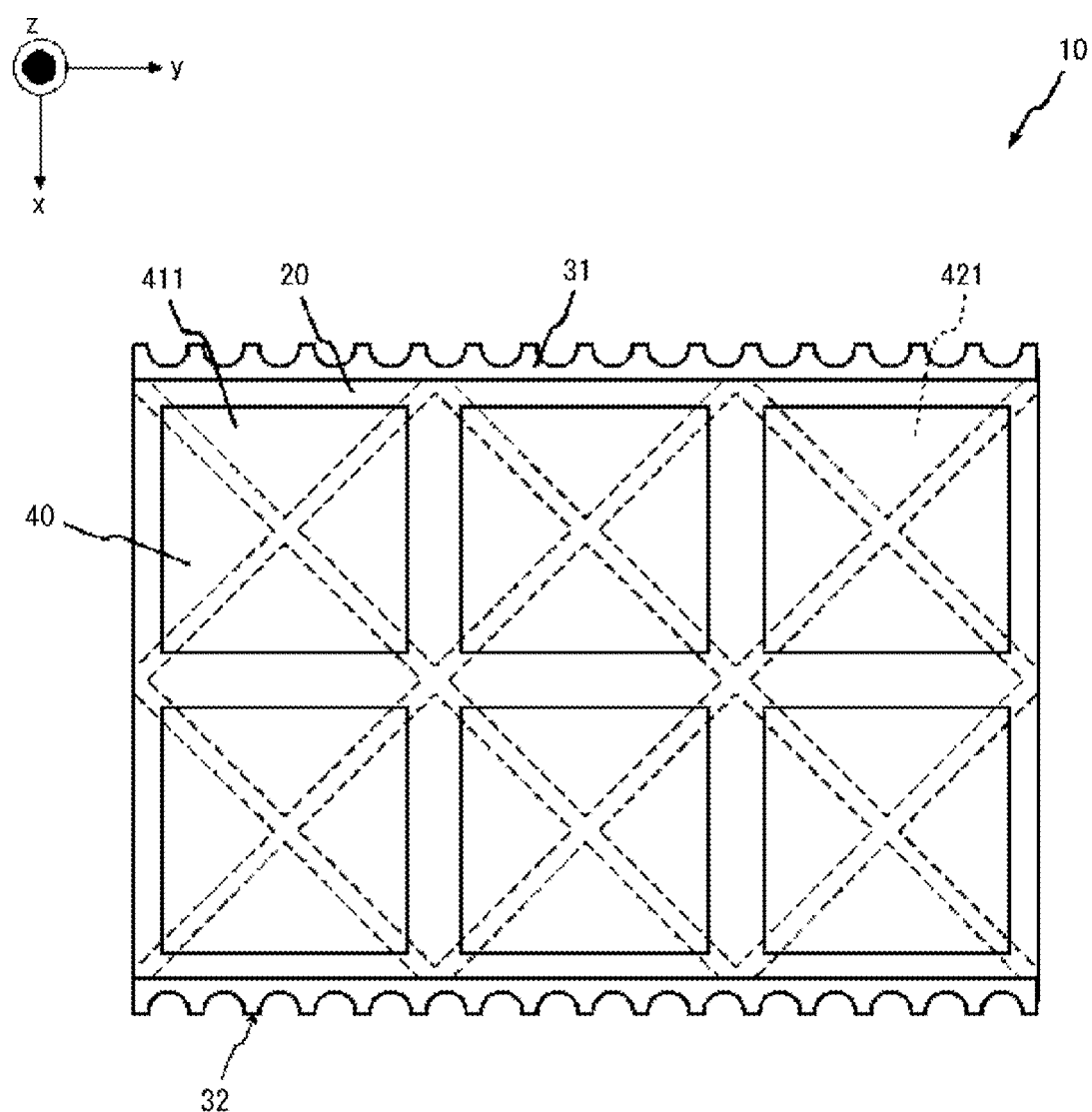
FIG. 27 is a plan view of one embodiment of the resonator.

FIG. 27 is a plan view corresponding to FIG. 18. As illustrated in FIG. 27, the base 20 may have a concave portion. As illustrated in FIG. 27, the pair conductors 30 have the concave portion that is recessed inward from an outer surface in the x direction. Such a resonator 10 may be manufactured, for example, by dividing a motherboard along an array of through-hole conductors. Such pair conductors 30 may be referred to as an end face through hole or the like.

Figure 28:
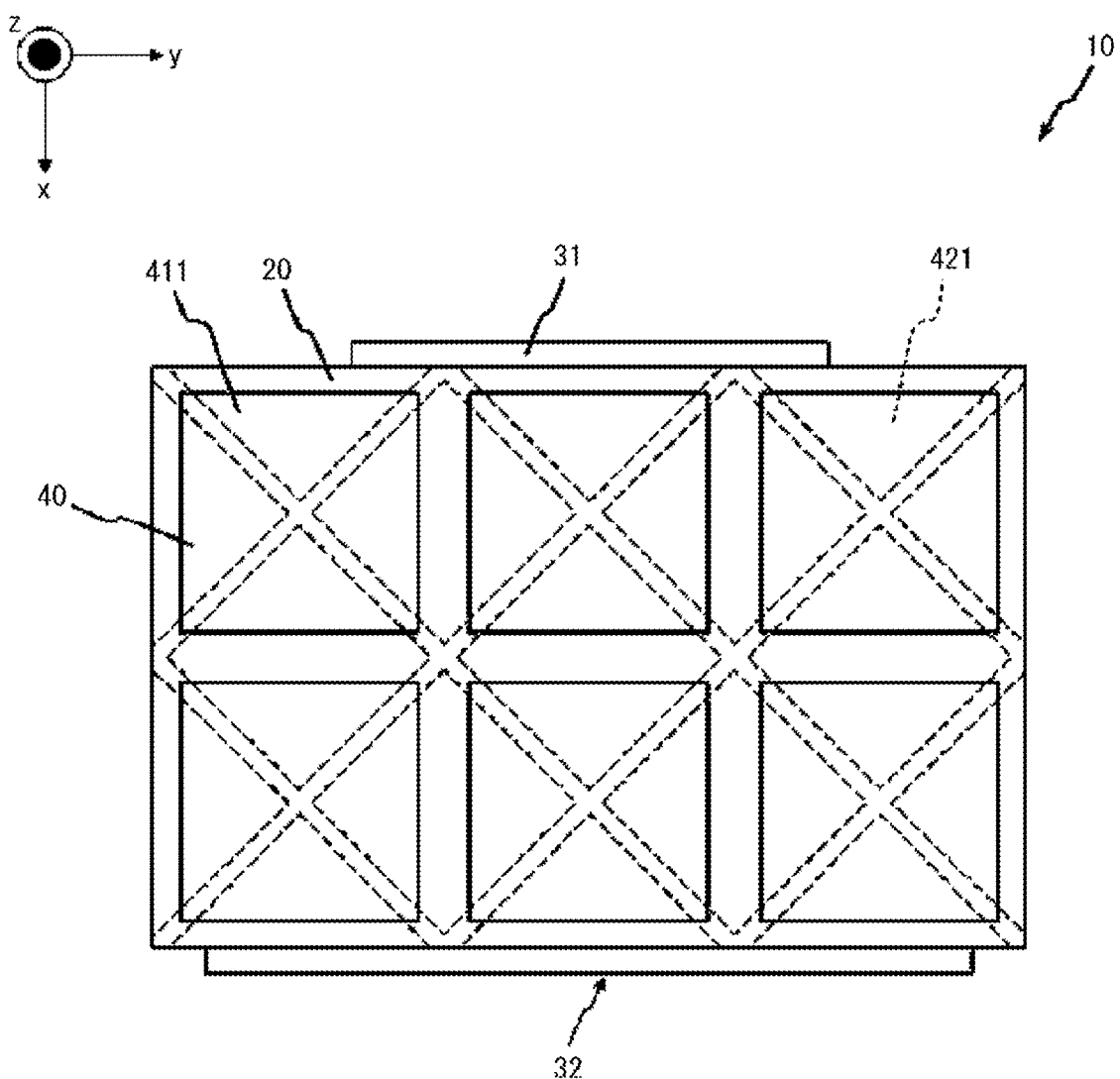
FIG. 28 is a plan view of one embodiment of the resonator.

FIG. 28 is a plan view corresponding to FIG. 18. As illustrated in FIG. 28, the pair conductors 30 may have a shorter length in the x direction than the base 20. The configuration of the pair conductors 30 is not limited thereto. The two pair conductors 30 may have different configurations from each other. For example, one pair conductor 30 may include the fifth conductive layer 301 and the fifth conductor 302, and the other pair conductors 30 may be an end face through hole.

Figure 29A:
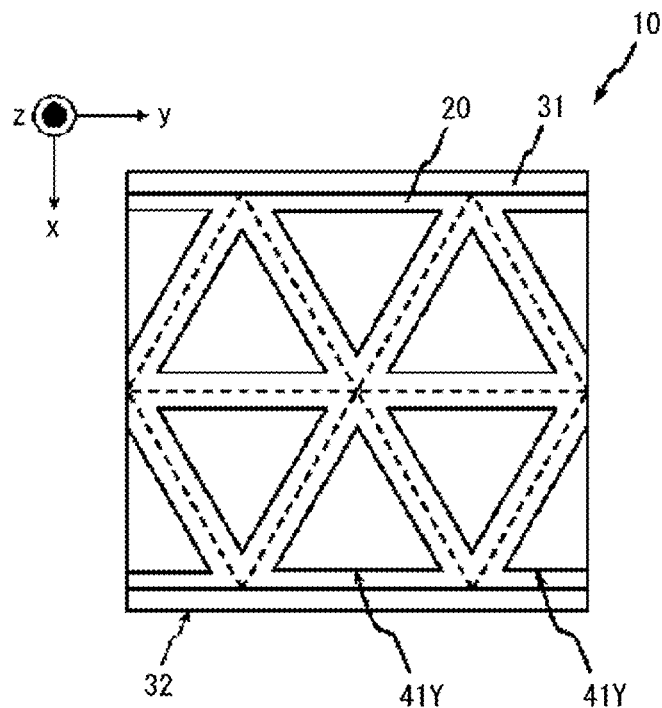
FIG. 29A is a plan view of one embodiment of the resonator.
Figure 29B:
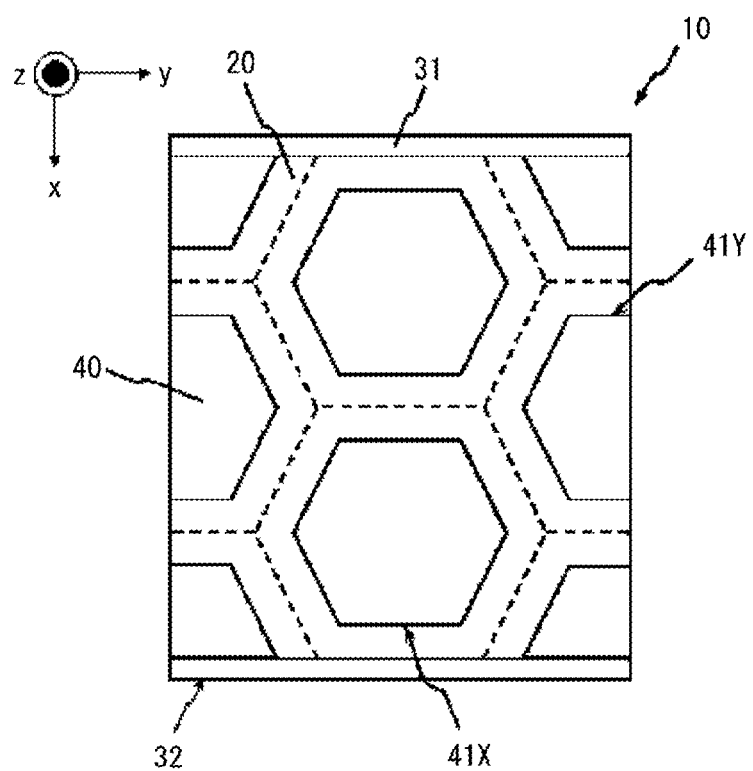
FIG. 29B is a plan view of one embodiment of the resonator.
Figure 30:
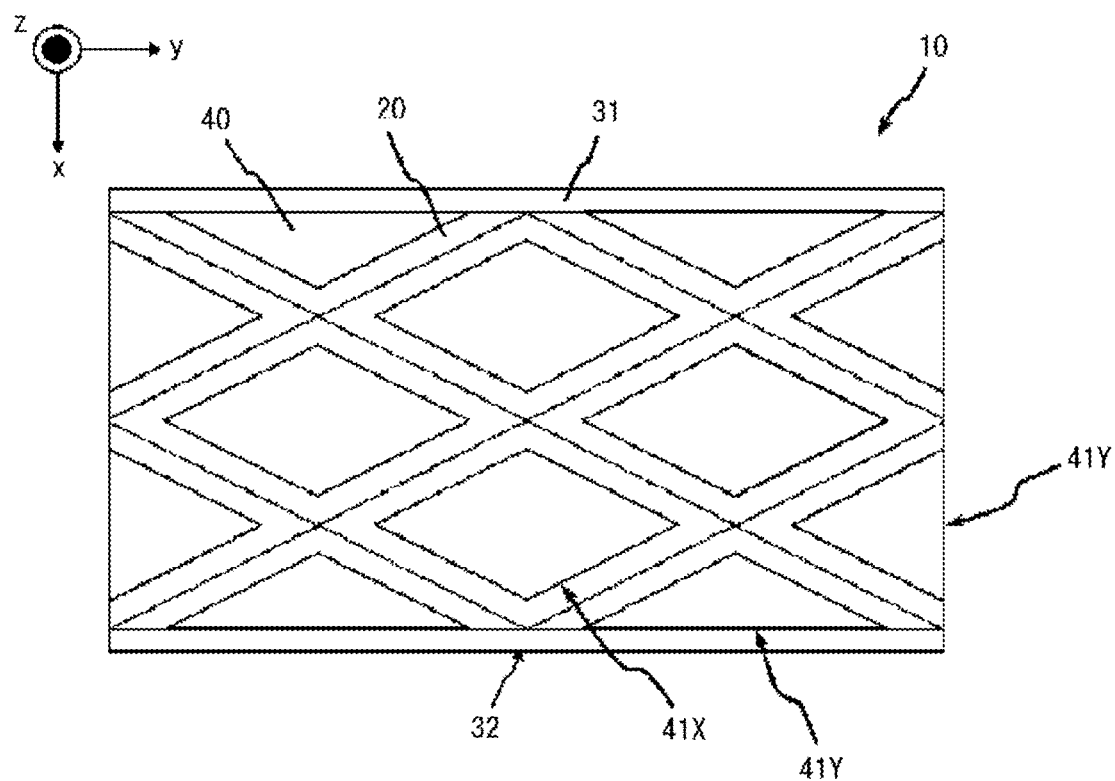
FIG. 30 is a plan view of one embodiment of the resonator.

The third conductor 40 illustrated in FIGS. 1 to 28 is an example. The configuration of the third conductor 40 is not limited to the configuration illustrated in FIGS. 1 to 28. The unit resonator 40X, the first unit resonator 41X, and the second unit resonator 42X are not limited to a rectangular shape. The unit resonator 40X, the first unit resonator 41X, and the second unit resonator 42X may be referred to as the unit resonator 40X and the like. For example, the unit resonators 40X and the like may be triangular as illustrated in FIG. 29A or may be hexagonal as illustrated in FIG. 29B. As illustrated in FIG. 30, each side of the unit resonator 40X and the like may extend in a direction different from the x direction and the y direction. In the third conductor 40, the second conductive layer 42 may be located on the base 20 and the first conductive layer 41 may be located in the base 20. In the third conductor 40, the second conductive layer 42 may be located farther from the fourth conductor 50 than the first conductive layer 41 is.

Figure 31A:
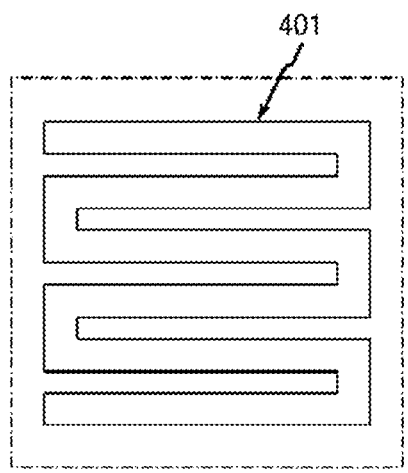
FIG. 31A is a schematic view illustrating an example of a resonator.
Figure 31B:
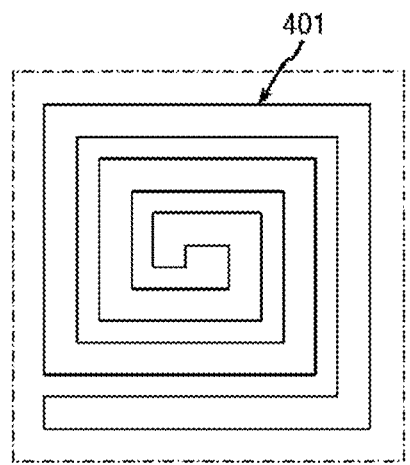
FIG. 31B is a schematic view illustrating an example of the resonator.
Figure 31C:
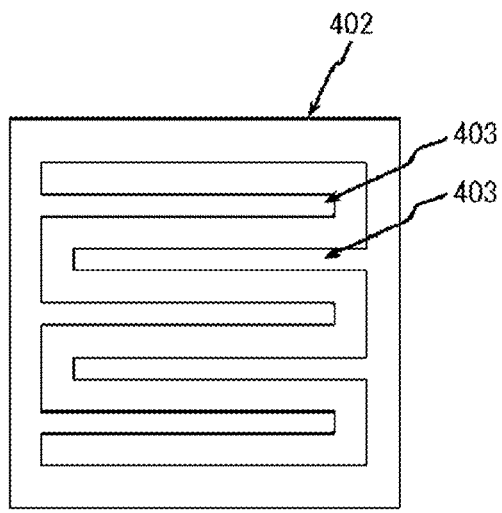
FIG. 31C is a schematic view illustrating an example of the resonator.
Figure 31D:
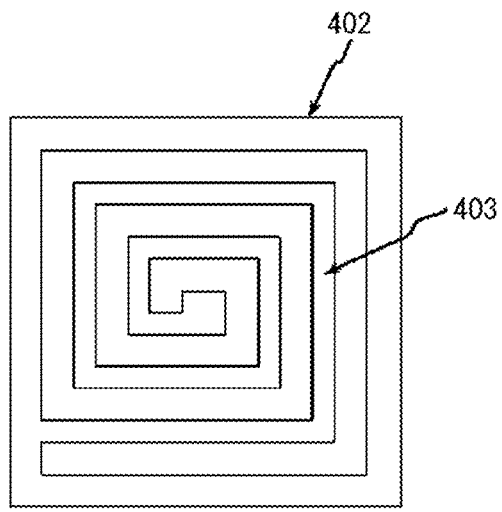
FIG. 31D is a schematic view illustrating an example of the resonator.
Figure 32A:
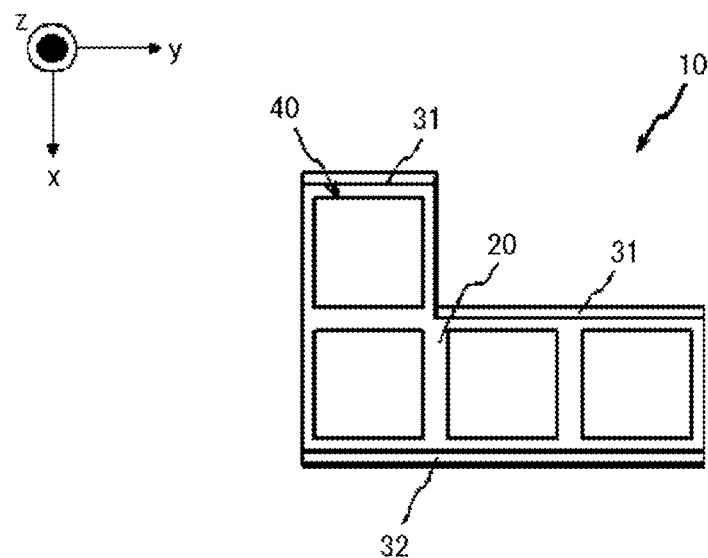
FIG. 32A is a plan view of one embodiment of a resonator.
Figure 32B:
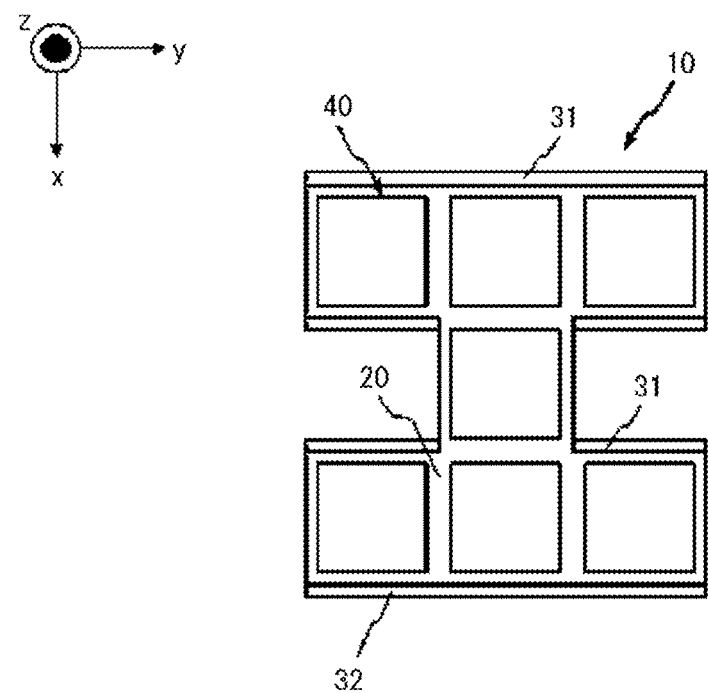
FIG. 32B is a plan view of one embodiment of the resonator.
Figure 32C:
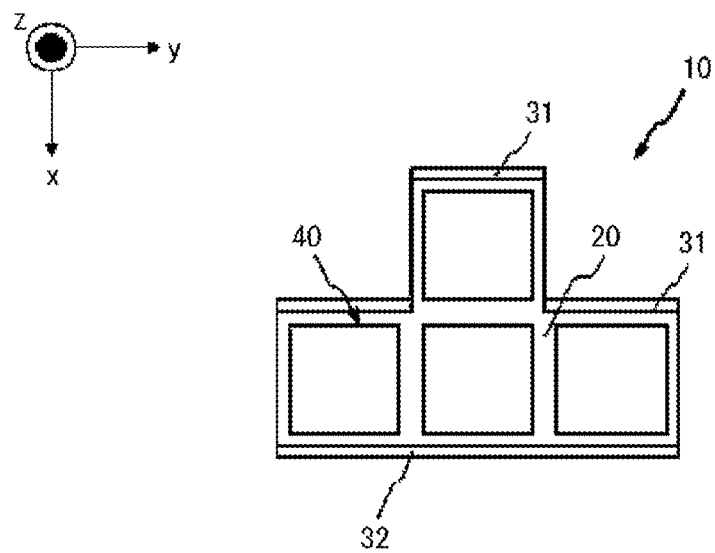
FIG. 32C is a plan view of one embodiment of the resonator.
Figure 32D:
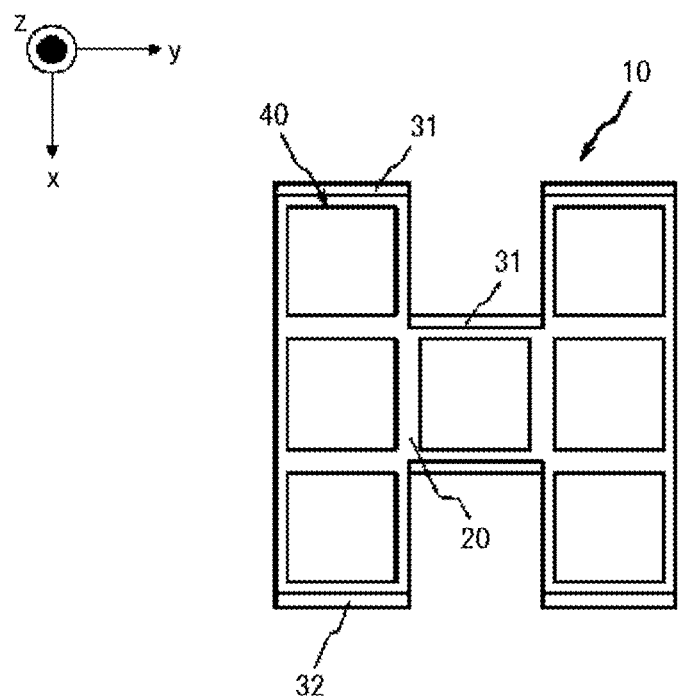
FIG. 32D is a plan view of one embodiment of the resonator.
Figure 33A:
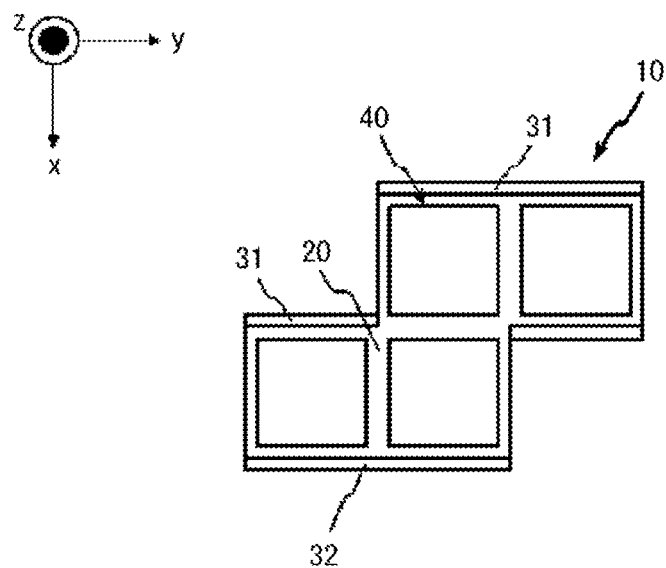
FIG. 33A is a plan view of one embodiment of a resonator.
Figure 33B:
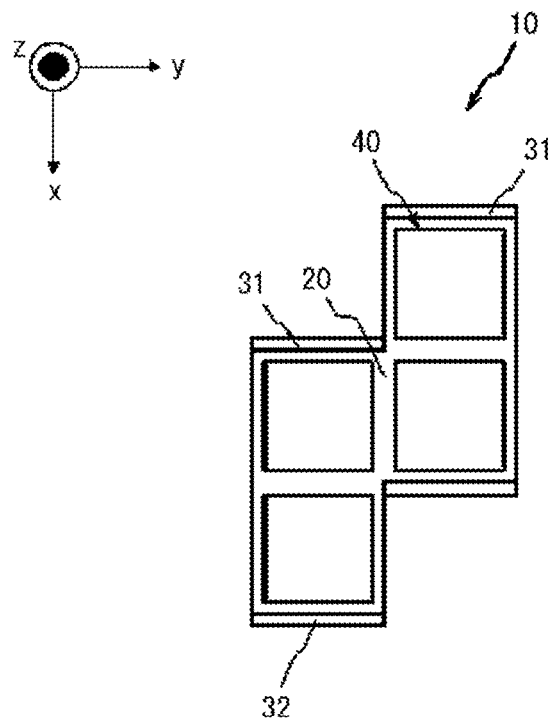
FIG. 33B is a plan view of one embodiment of the resonator.
Figure 33C:
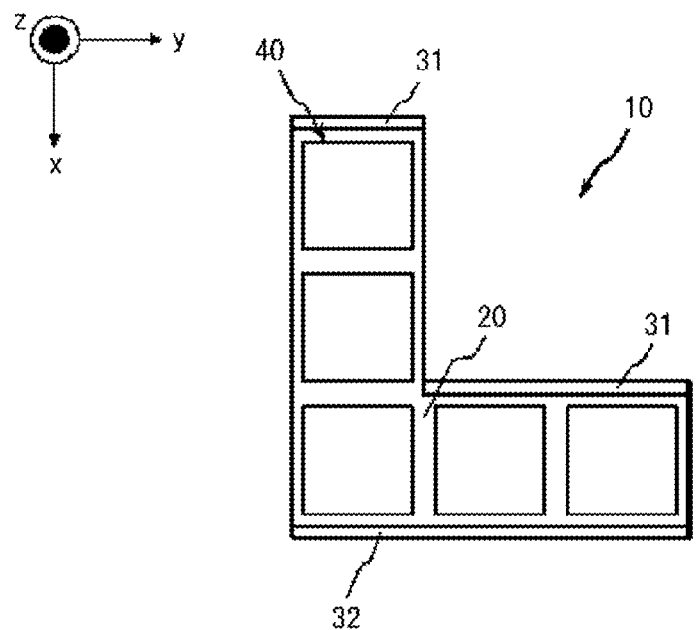
FIG. 33C is a plan view of one embodiment of the resonator.
Figure 33D:
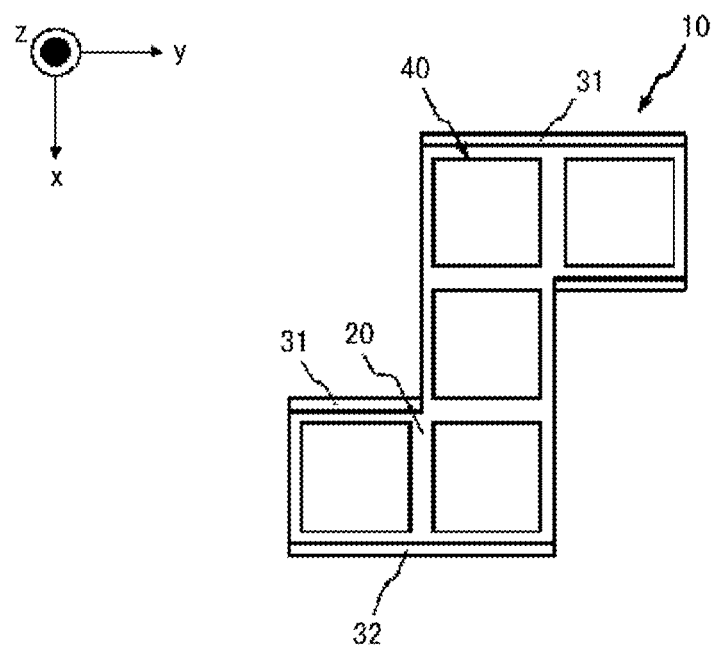
FIG. 33D is a plan view of one embodiment of the resonator.
Figure 34A:
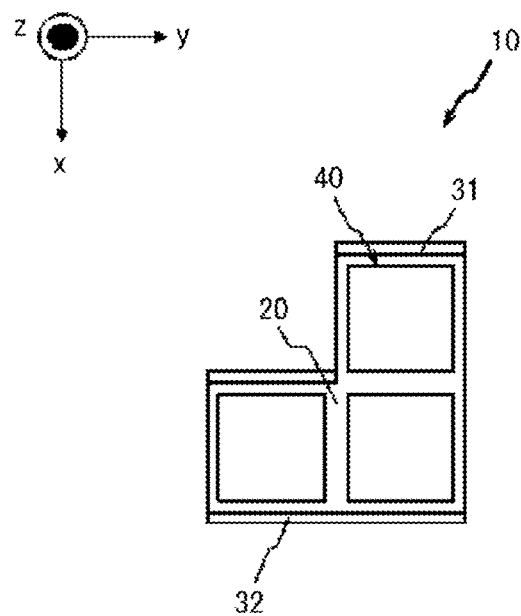
FIG. 34A is a plan view of one embodiment of a resonator.
Figure 34B:
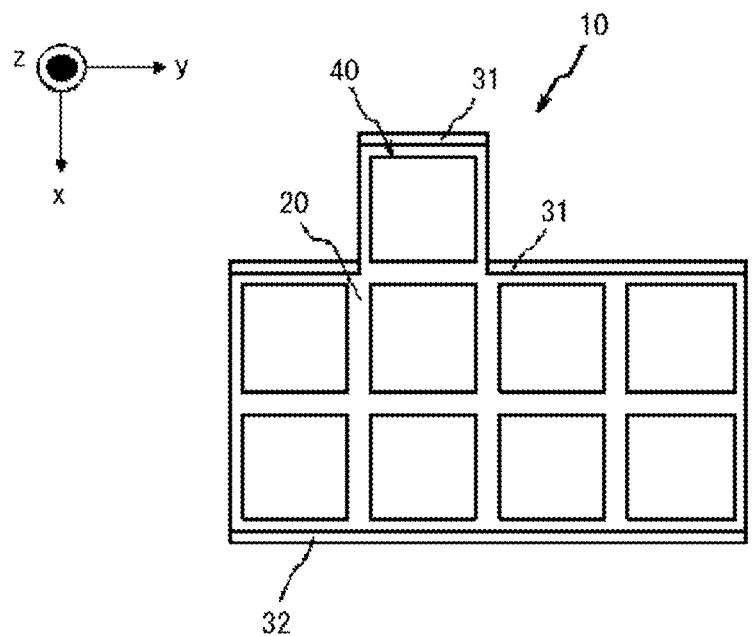
FIG. 34B is a plan view of one embodiment of the resonator.
Figure 34C:
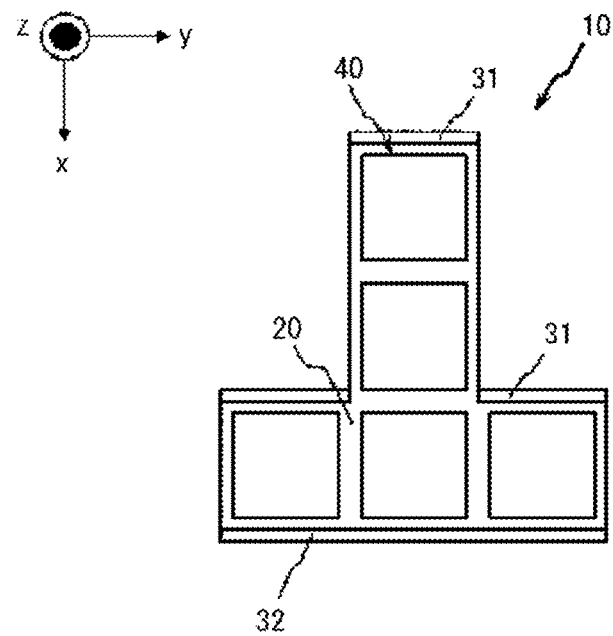
FIG. 34C is a plan view of one embodiment of the resonator.
Figure 34D:
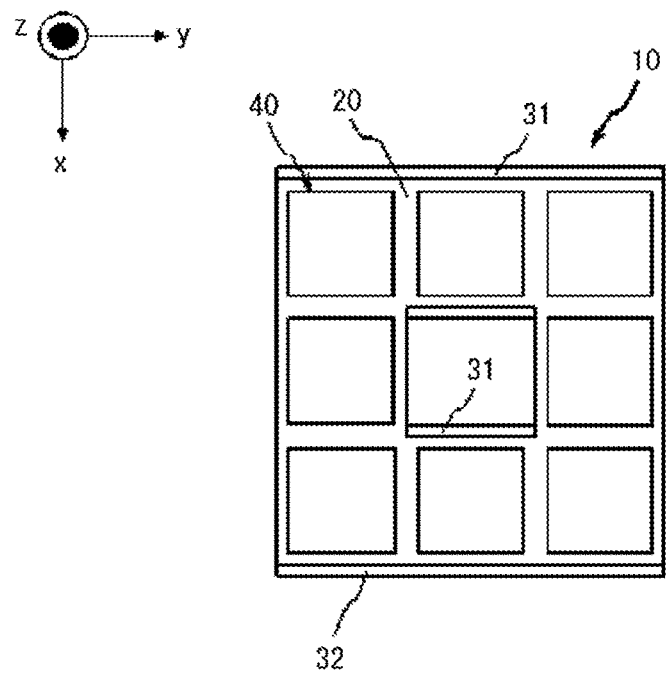
FIG. 34D is a plan view of one embodiment of the resonator.

The third conductor 40 illustrated in FIGS. 1 to 30 is an example. The configuration of the third conductor 40 is not limited to the configurations illustrated in FIGS. 1 to 30. The resonator including the third conductor 40 may be a line-type resonator 40I. FIG. 31A illustrates a meander line-type resonator 401. FIG. 31B illustrates a spiral-type resonator 401. The resonator included in the third conductor 40 may be a slot-type resonator 402. The slot-type resonator 402 may have one or more seventh conductors 403 in an opening. The seventh conductor 403 in the opening has one end opened and the other end electrically connected to a conductor defining the opening. In a unit slot illustrated in FIG. 31C, five seventh conductors 403 are located in the opening. The unit slot has a shape corresponding to a meander line with the seventh conductor 403. In a unit slot illustrated in FIG. 31D, one seventh conductor 403 is located in the opening. The unit slot has a shape corresponding to a spiral with the seventh conductor 403.

The configuration of the resonator 10 illustrated in FIGS. 1 to 31 is an example. The configuration of the resonator 10 is not limited to the configurations illustrated in FIGS. 1 to 31. For example, the pair conductors 30 of the resonator 10 may include three or more. For example, one pair conductor 30 may face two pair conductors 30 in the x direction. The two pair conductors 30 are different in distance from the pair conductors 30. For example, the resonator 10 may include two pairs of pair conductors 30. The two pairs of pair conductors 30 may differ in distance of each pair and length of each pair. The resonator 10 may include five or more first conductors. The unit structure 10X of the resonator 10 may be aligned with another unit structure 10X in the y direction. The unit structure 10X of the resonator 10 may be aligned with another unit structure 10X in the x direction without interposing the pair conductors 30. FIGS. 32 to 34 are views illustrating an example of the resonator 10. In the resonator 10 illustrated in FIGS. 32 to 34, the unit resonator 40X of the unit structure 10X is illustrated as a square, but is not limited thereto.

Figure 35:
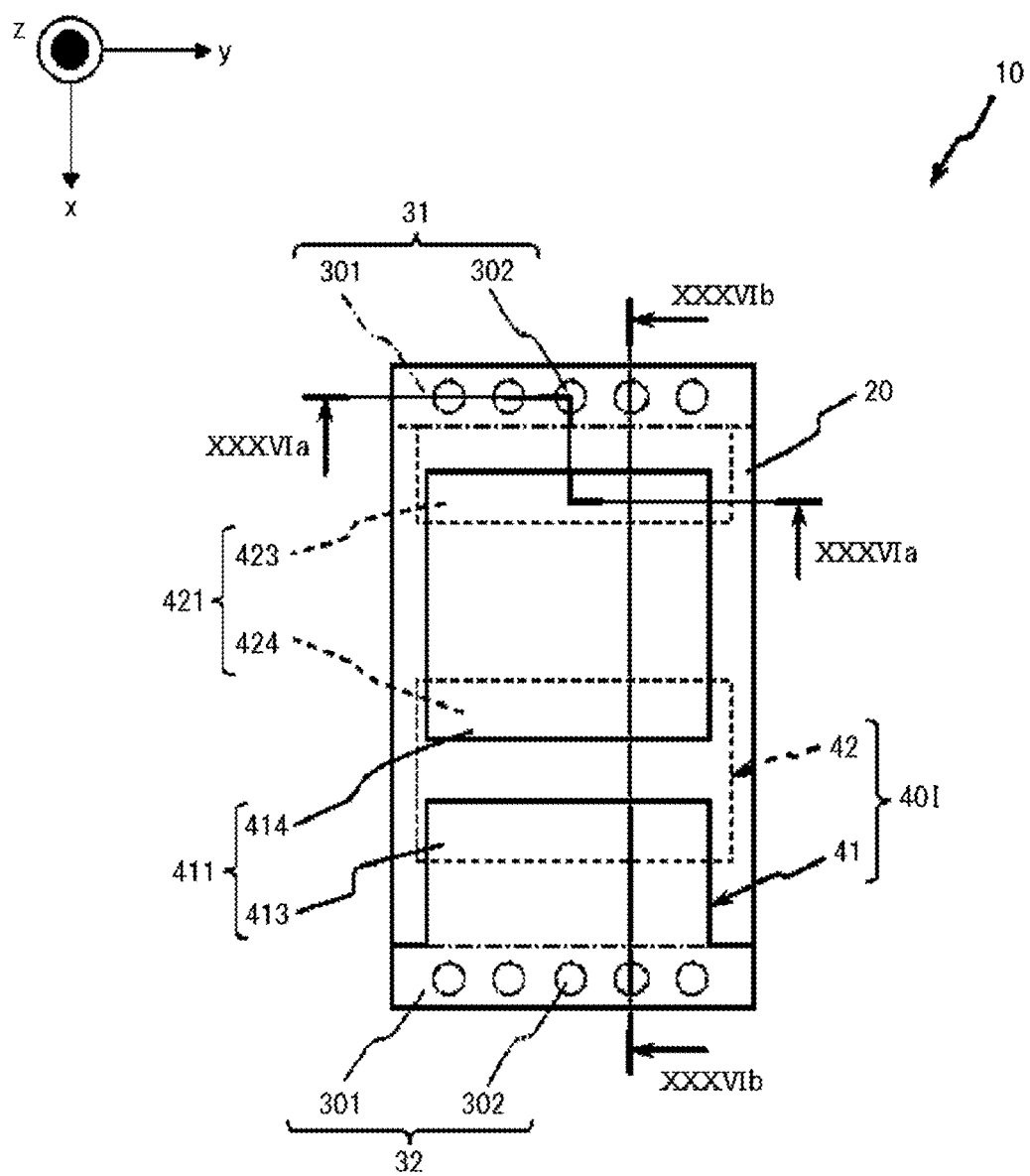
FIG. 35 is a plan view of one embodiment of a resonator.
Figure 36A:
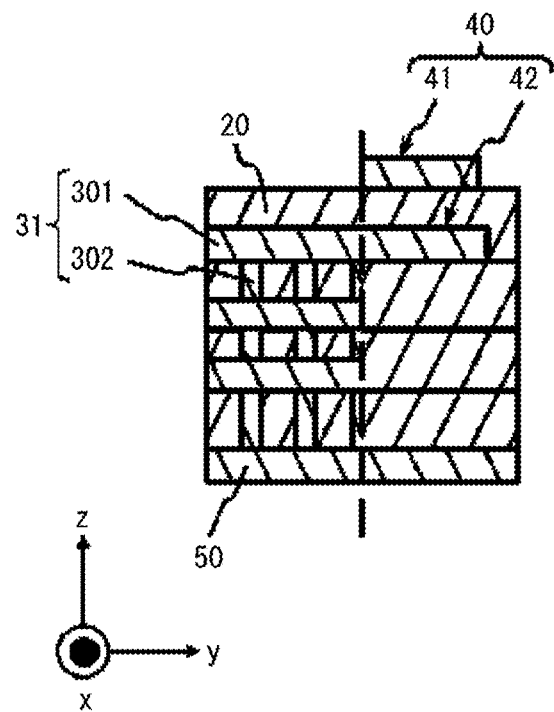
FIG. 36A is a cross-sectional view illustrating one embodiment of a resonator.
Figure 36B:
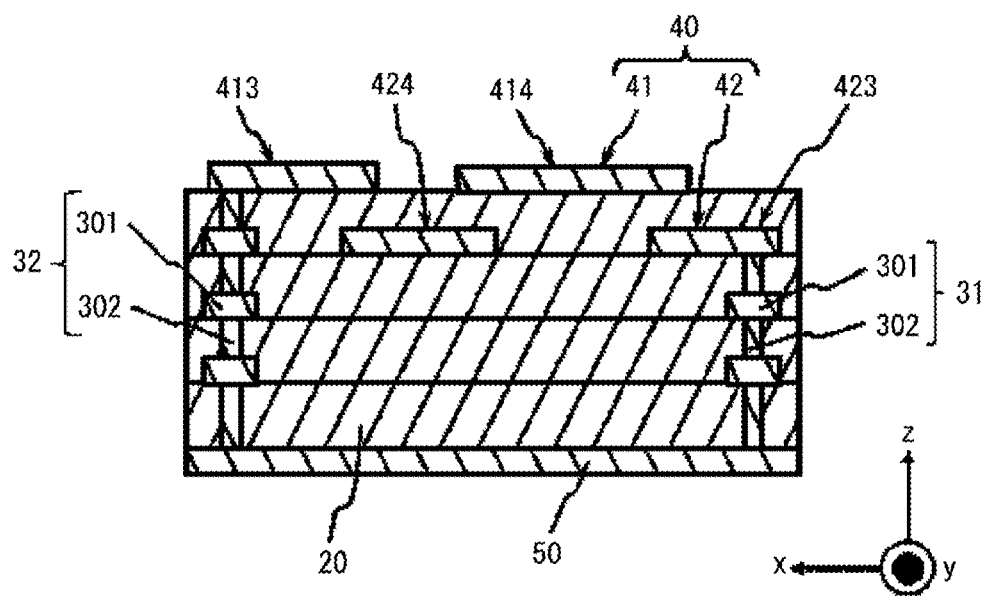
FIG. 36B is a cross-sectional view illustrating one embodiment of the resonator.

The configuration of the resonator 10 illustrated in FIGS. 1 to 34 is an example. The configuration of the resonator 10 is not limited to the configurations illustrated in FIGS. 1 to 34. FIG. 35 is a plan view of the xy plane from the z direction. FIG. 36A is a cross-sectional view taken along line XXXVIa-XXXVIa illustrated in FIG. 35. FIG. 36B is a cross-sectional view taken along line XXXVIb-XXXVIb illustrated in FIG. 35.

In the resonator 10 illustrated in FIGS. 35 and 36, the first conductive layer 41 includes half of a patch-type resonator as the first unit resonator 41X. The second conductive layer 42 includes half of the patch-type resonator as the second unit resonator 42X. The unit resonator 40X includes one first divisional resonator 41Y and one second divisional resonator 42Y. The unit structure 10X includes a unit resonator 40X as well as a part of the base 20 and a part of the fourth conductor 50 overlapping the unit resonator 40X as viewed in the Z direction. In the resonator 10 illustrated in FIG. 35, three unit resonators 40X are arranged in the x direction. The first unit conductor 411 and the second unit conductor 421 included in the three unit resonators 40X form one current path 40I.

Figure 37:
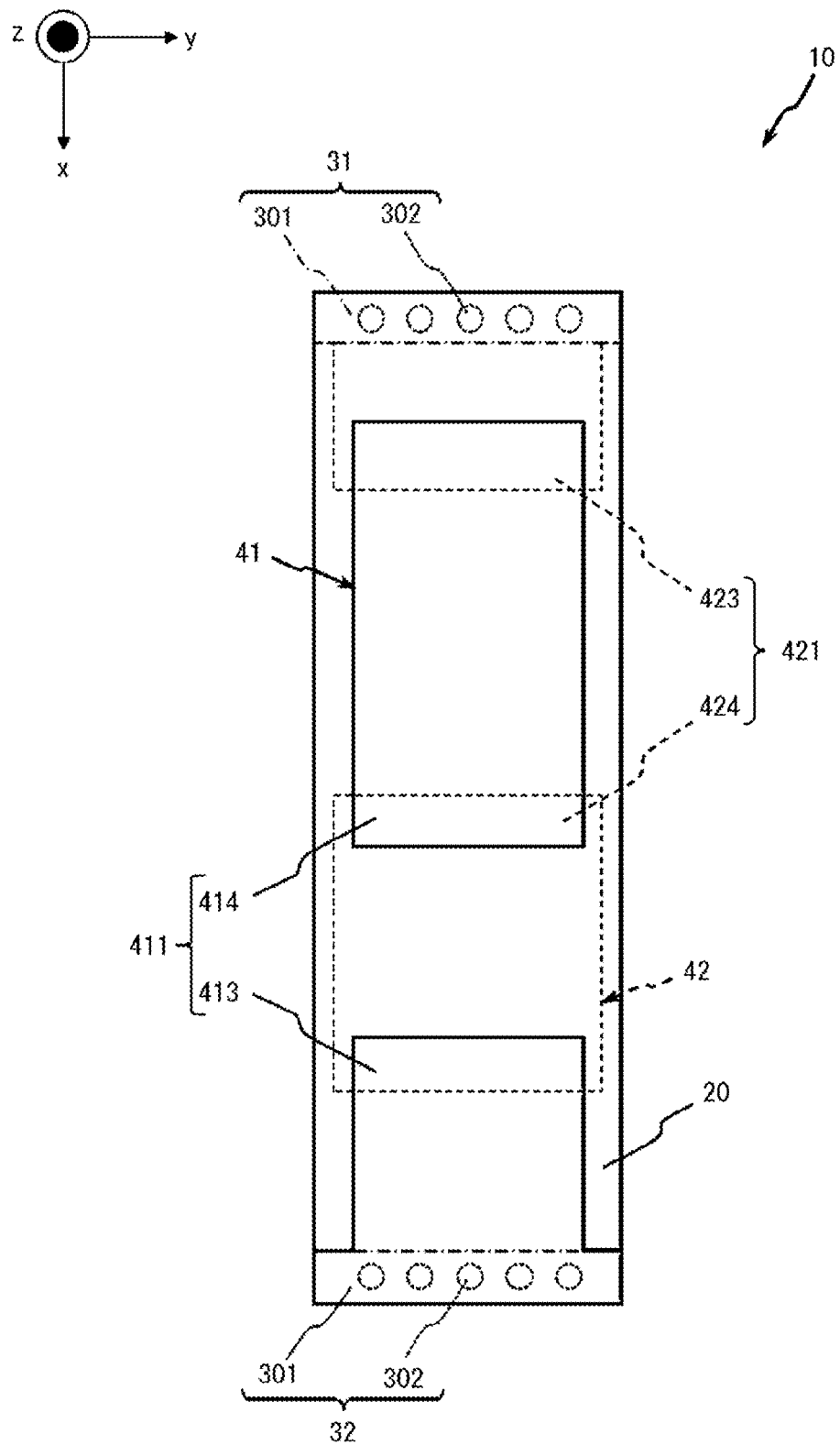
FIG. 37 is a plan view of one embodiment of a resonator.
Figure 38:
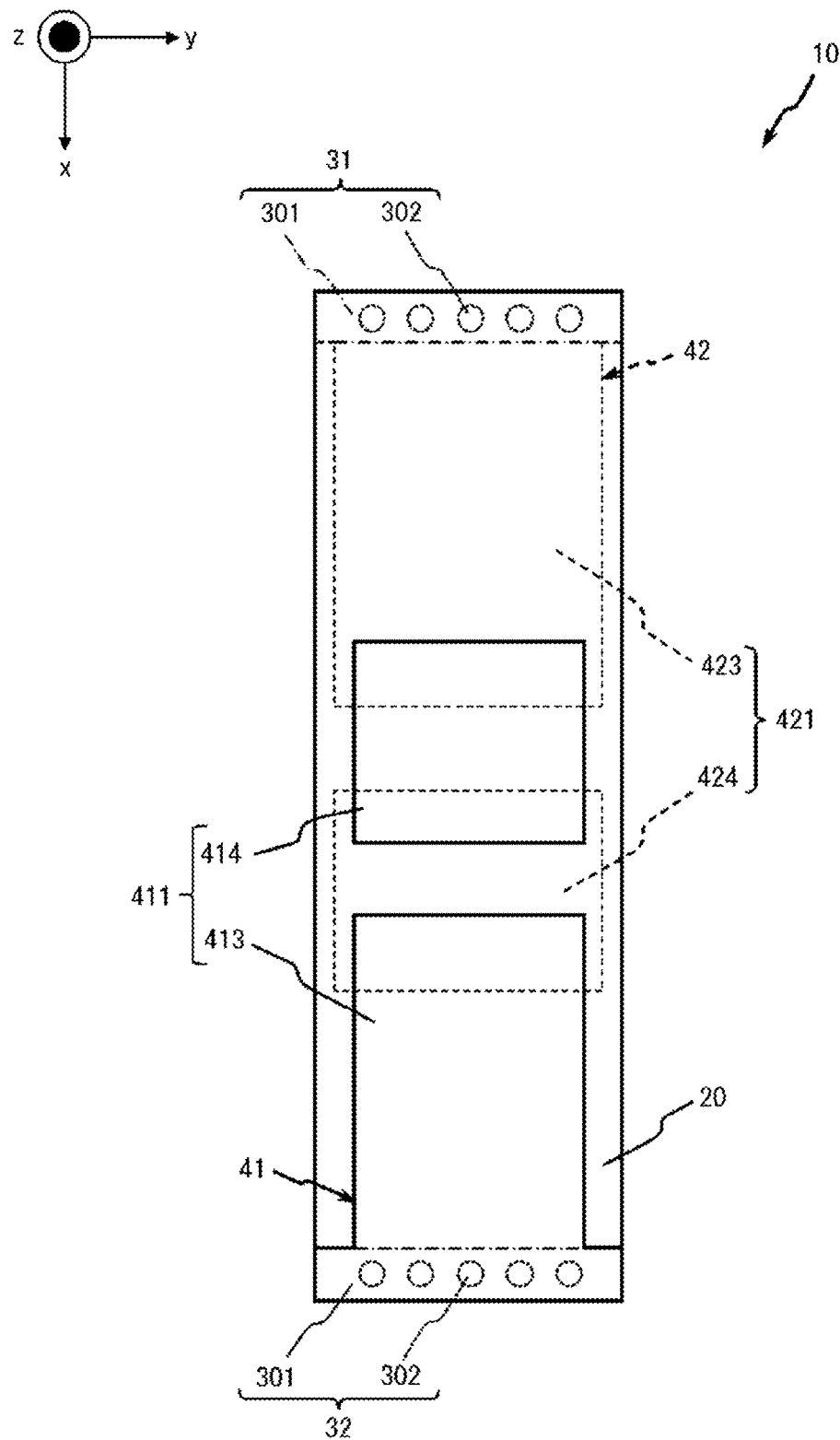
FIG. 38 is a plan view of one embodiment of the resonator.

FIG. 37 illustrates another example of the resonator 10 illustrated in FIG. 35. The resonator 10 illustrated in FIG. 37 is longer in the x direction than the resonator 10 illustrated in FIG. 35. A size of the resonator 10 is not limited to the resonator 10 illustrated in FIG. 37 and may be changed as appropriate. In the resonator 10 of FIG. 37, the length of the first connecting conductor 413 in the x direction is different from that of the first floating conductor 414. In the resonator 10 of FIG. 37, the length of the first connecting conductor 413 in the x direction is shorter than that of the first floating conductor 414. FIG. 38 illustrates another example of the resonator 10 illustrated in FIG. 35. In the resonator 10 illustrated in FIG. 38, the length of the third conductor 40 in the x direction is different. In the resonator 10 of FIG. 38, the first connecting conductor 413 is longer in the x direction than the first floating conductor 414.

Figure 39:
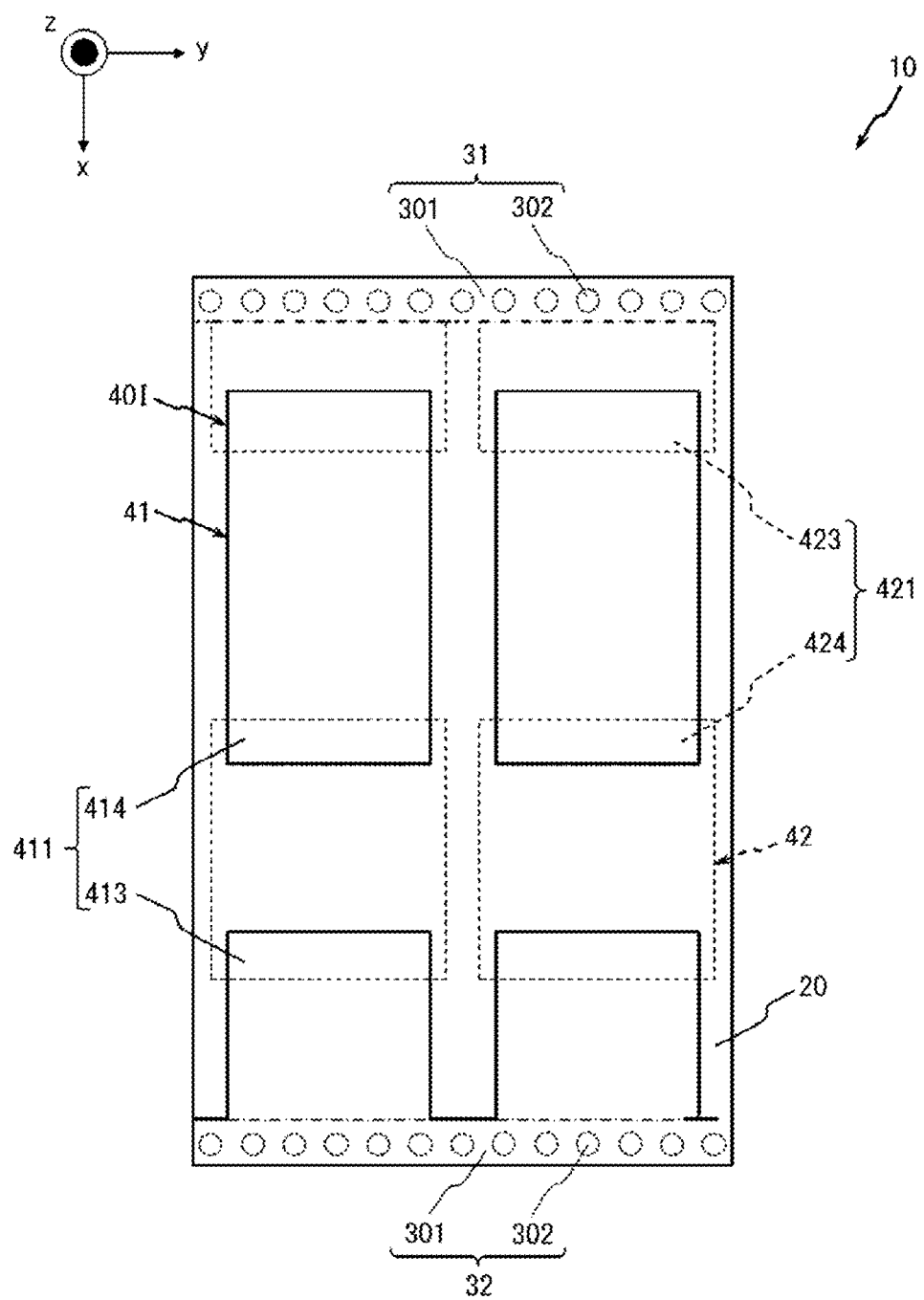
FIG. 39 is a plan view of one embodiment of the resonator.

FIG. 39 illustrates another example of the resonator 10. FIG. 39 illustrates another example of the resonator 10 illustrated in FIG. 37. In a plurality of embodiments, in the resonator 10, a plurality of first unit conductors 411 and second unit conductors 421 arranged in the x direction are capacitively coupled. In the resonator 10, two current paths 40I may be arranged in the y direction in which no current flows from one side to the other side.

Figure 40:
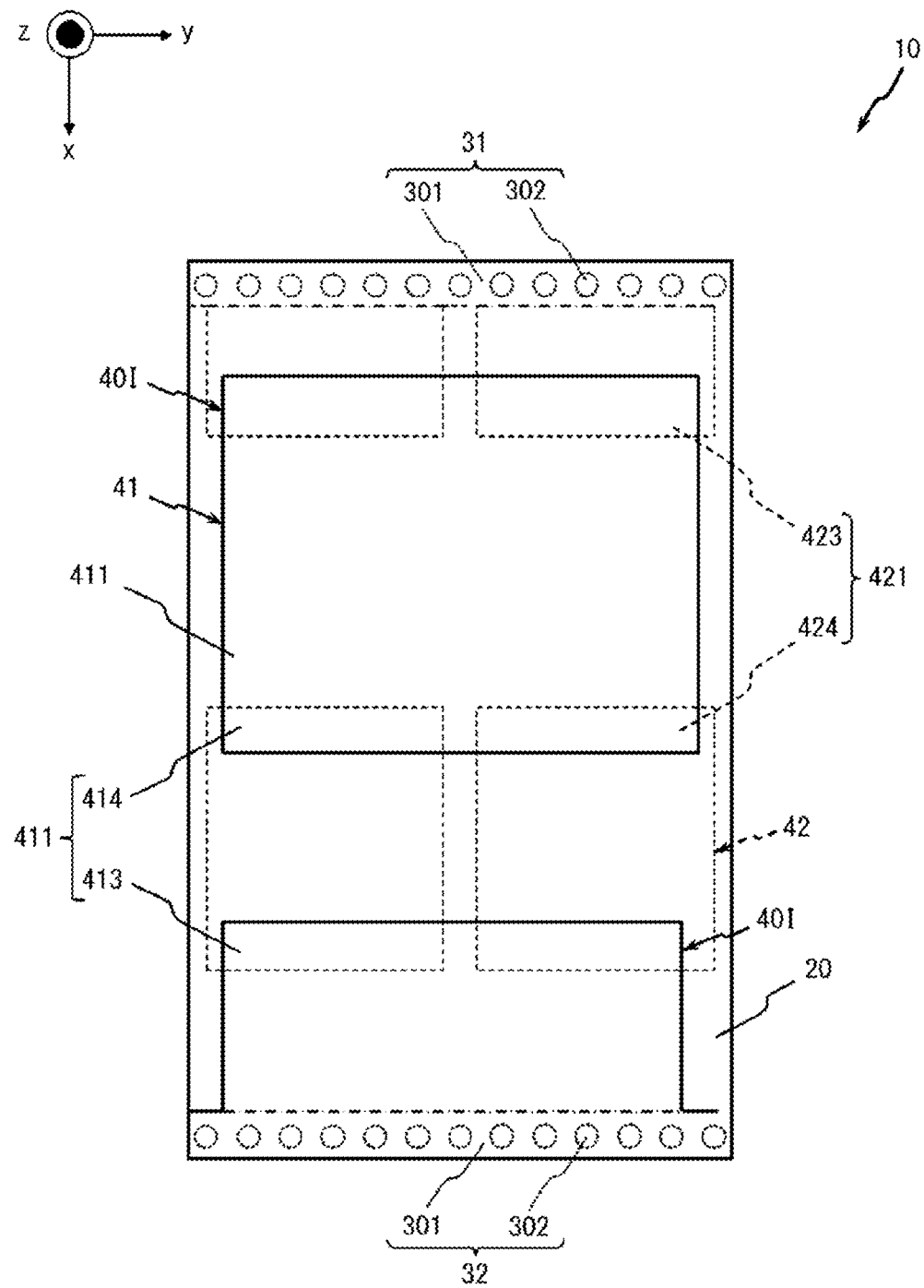
FIG. 40 is a plan view of one embodiment of the resonator.

FIG. 40 illustrates another example of the resonator 10. FIG. 40 illustrates another example of the resonator 10 illustrated in FIG. 39. In a plurality of embodiments, in the resonator 10, the number of conductors connected to the first conductor 31 may differ from the number of conductors connected to the second conductor 32. In the resonator 10 of FIG. 40, one first connecting conductor 413 is capacitively coupled to two second floating conductors 424. In the resonator 10 of FIG. 40, two second connecting conductors 423 are capacitively coupled to one first floating conductor 414. In a plurality of embodiments, the number of first unit conductors 411 may be different from the number of second unit conductors 421 that are capacitively coupled to the first unit conductor 411.

Figure 41:
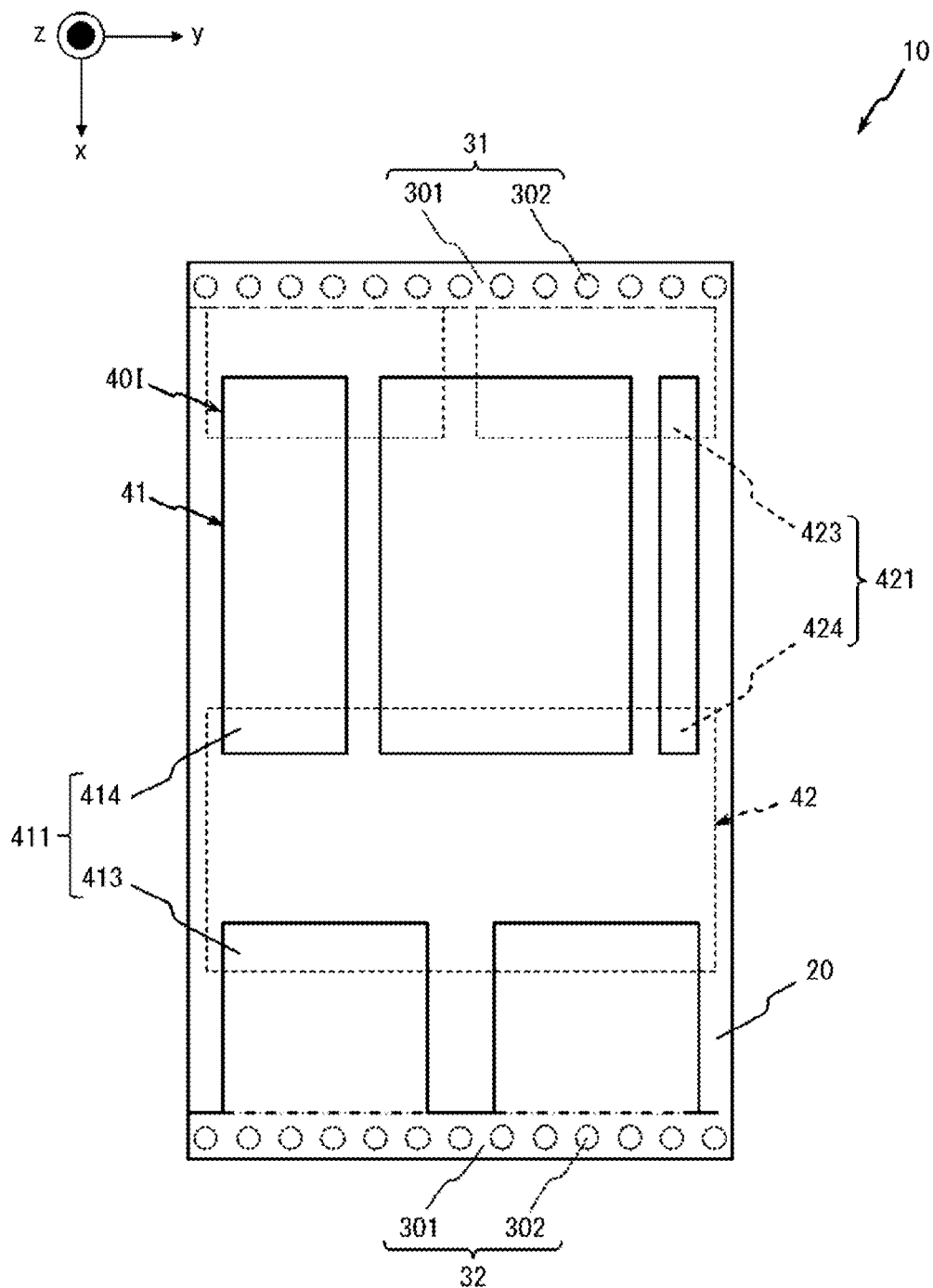
FIG. 41 is a plan view of one embodiment of the resonator.

FIG. 41 illustrates another example of the resonator 10 illustrated in FIG. 39. In a plurality of embodiments, in the first unit conductor 411, the number of second unit conductors 421 capacitively coupled at a first end in the x direction may be different from the number of second unit conductors 421 capacitively coupled at a second end in the x direction. In the resonator 10 of FIG. 41, one second floating conductor 424 has two first connecting conductors 413 capacitively coupled to the first end in the x direction and three first floating conductors 414 capacitively coupled to the second end. In a plurality of embodiments, a plurality of conductors arranged in the y direction may have different lengths in the y direction. In the resonator 10 of FIG. 41, three first floating conductors 414 arranged in the y direction have different lengths in the y direction.

Figure 42:
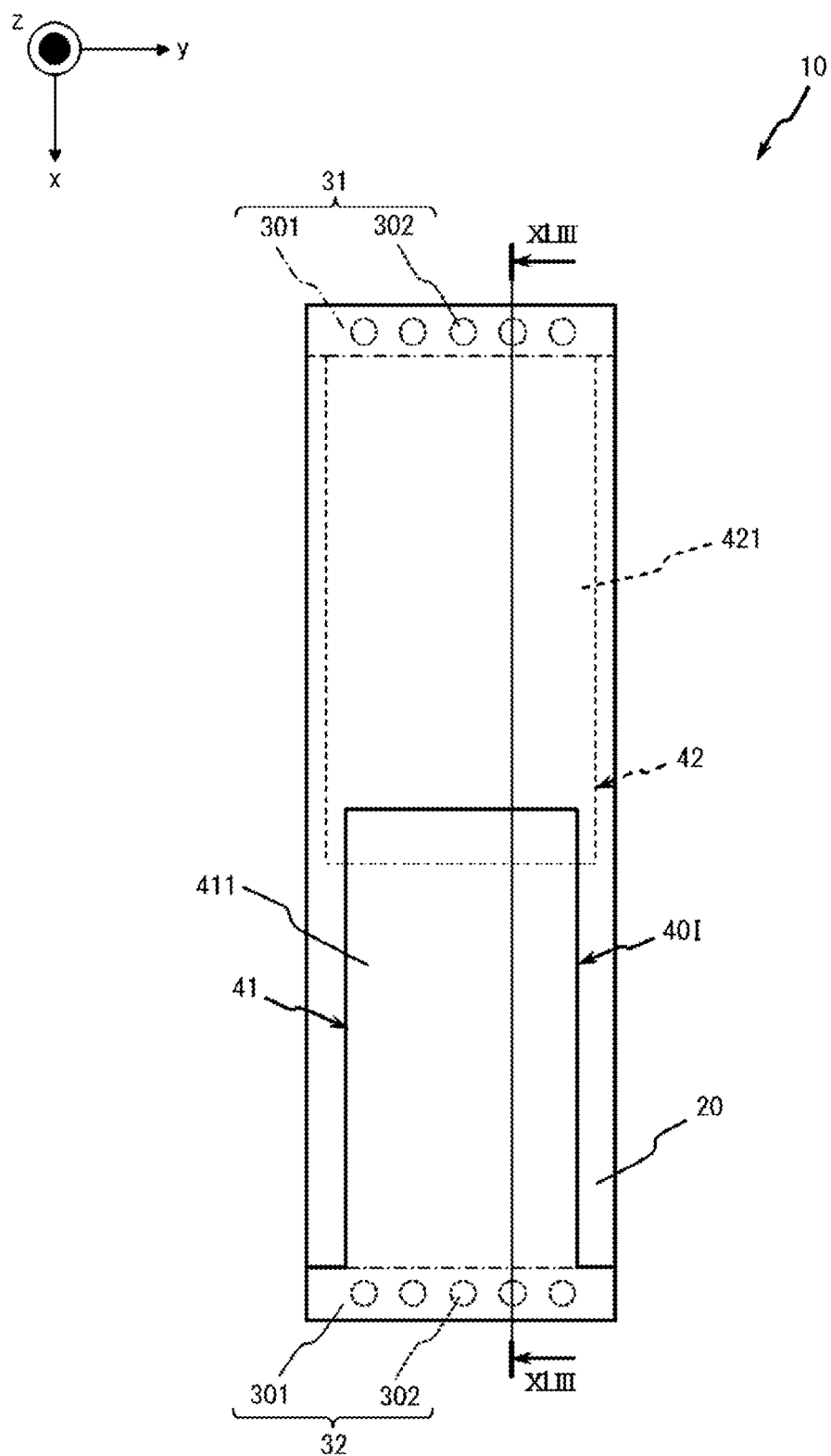
FIG. 42 is a plan view of one embodiment of the resonator.
Figure 43:
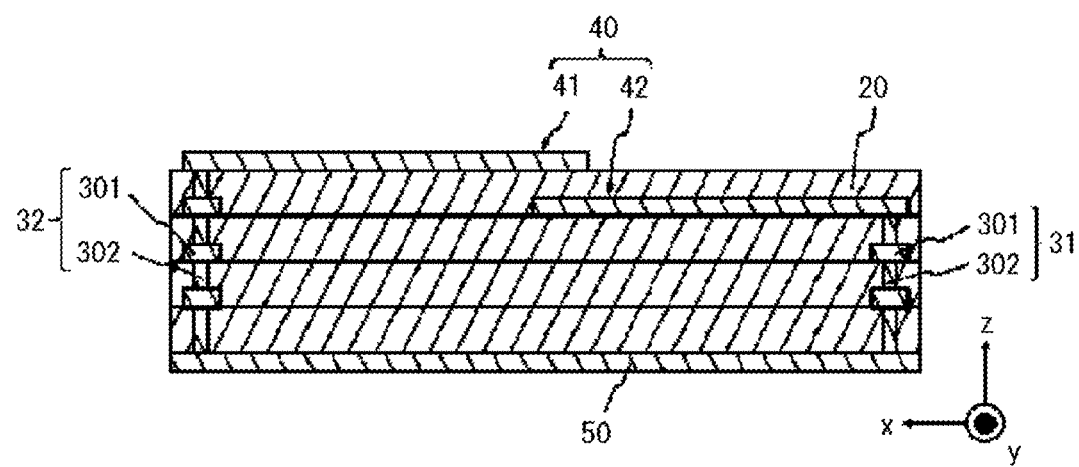
FIG. 43 is a cross-sectional view illustrating one embodiment of a resonator.

FIG. 42 illustrates another example of the resonator 10. FIG. 43 is a cross-sectional view taken along line XLIII-XLIII illustrated in FIG. 42. In the resonator 10 illustrated in FIGS. 42 and 43, the first conductive layer 41 includes half of a patch-type resonator as the first unit resonator 41X. The second conductive layer 42 includes half of the patch-type resonator as the second unit resonator 42X. The unit resonator 40X includes one first divisional resonator 41Y and one second divisional resonator 42Y. The unit structure 10X includes the unit resonator 40X as well as a part of the base 20 and a part of the fourth conductor 50 overlapping the unit resonator 40X as viewed in the z direction. In the resonator 10 illustrated in FIG. 42, one unit resonator 40X extends in the x direction.

Figure 44:
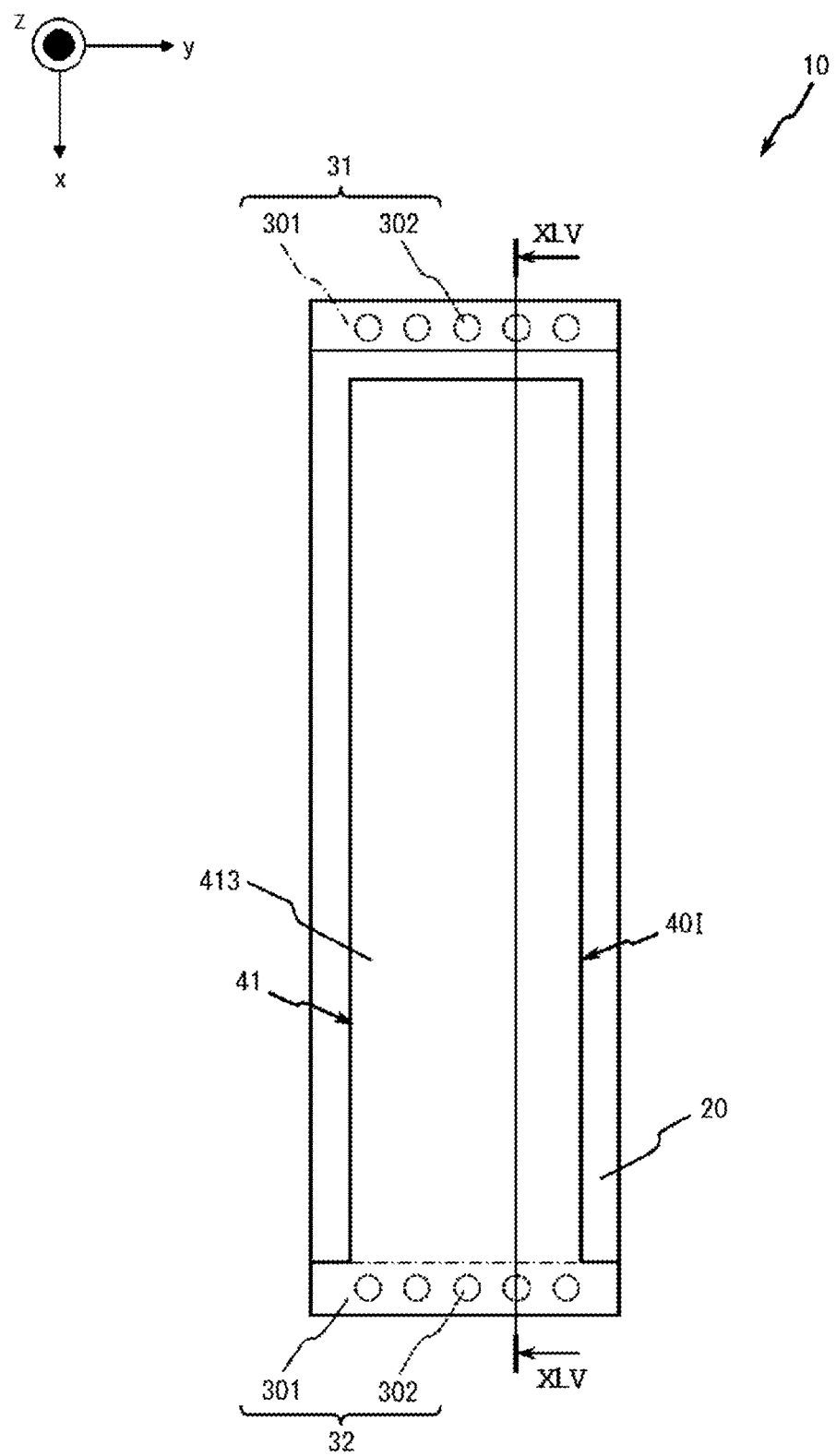
FIG. 44 is a plan view of one embodiment of the resonator.
Figure 45:
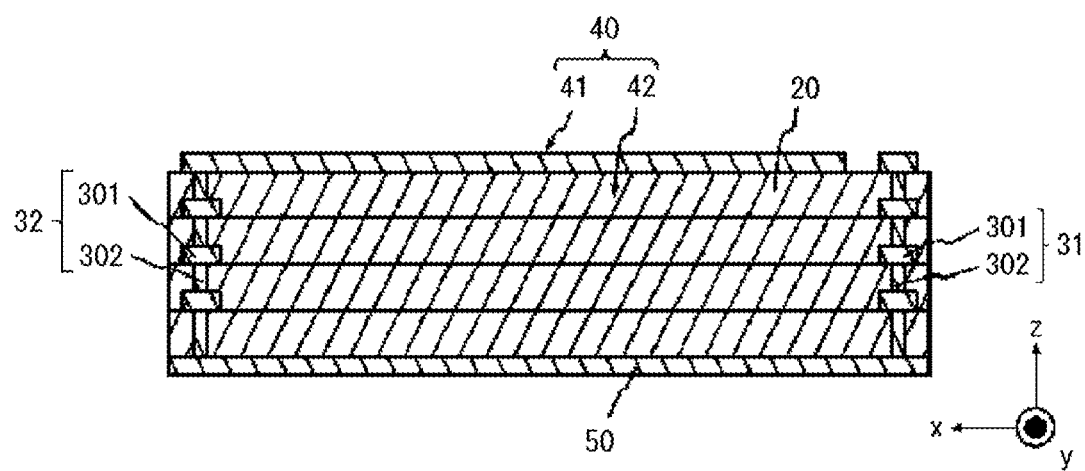
FIG. 45 is a cross-sectional view illustrating one embodiment of the resonator.

FIG. 44 illustrates another example of the resonator 10. FIG. 45 is a cross-sectional view taken along line XLV-XLV illustrated in FIG. 44. In the resonator 10 illustrated in FIGS. 44 and 45, the third conductor 40 includes only the first connecting conductor 413. The first connecting conductor 413 faces the first conductor 31 on the xy plane. The first connecting conductor 413 is capacitively coupled to the first conductor 31.

Figure 46:
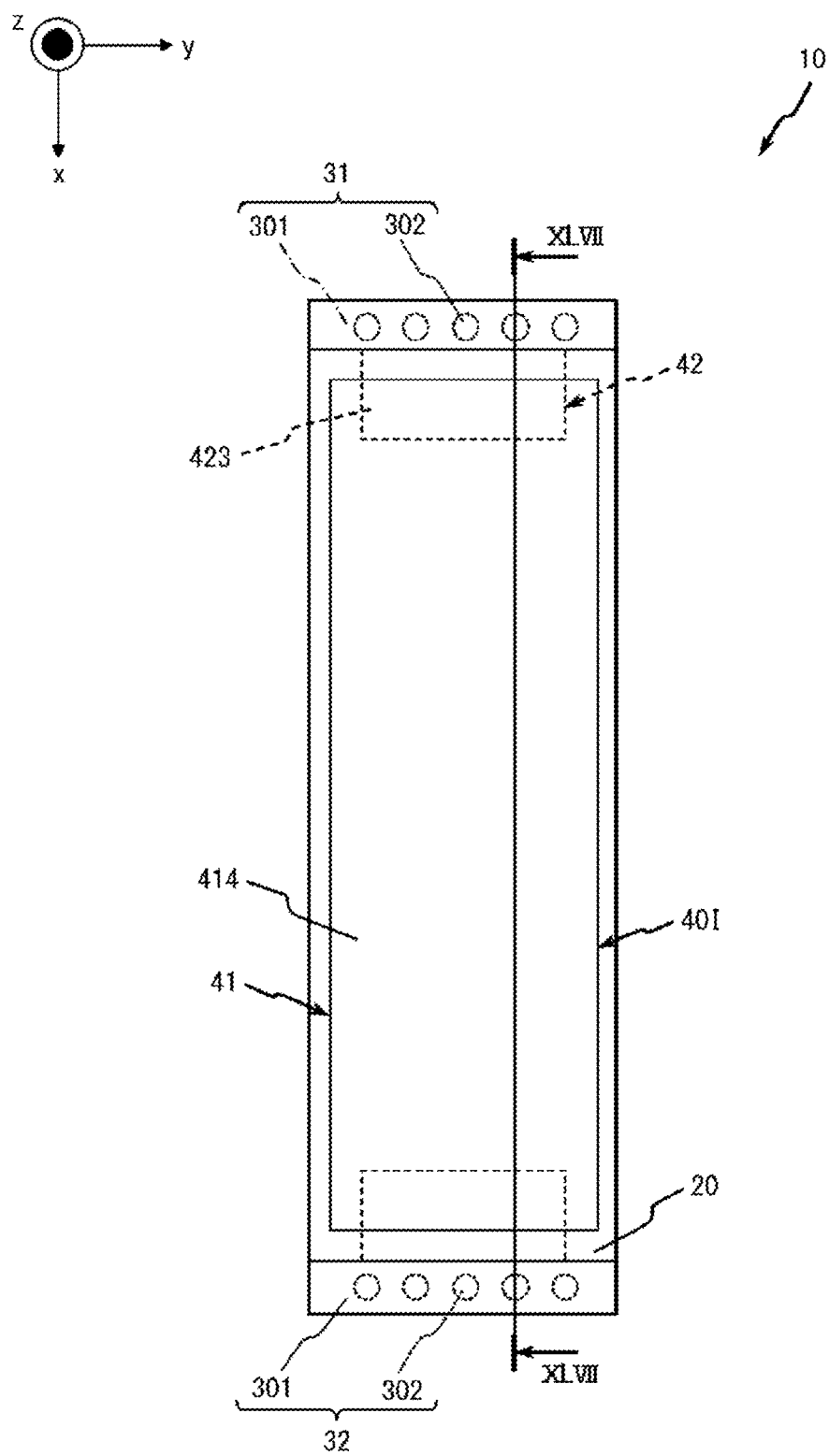
FIG. 46 is a plan view of one embodiment of the resonator.
Figure 47:
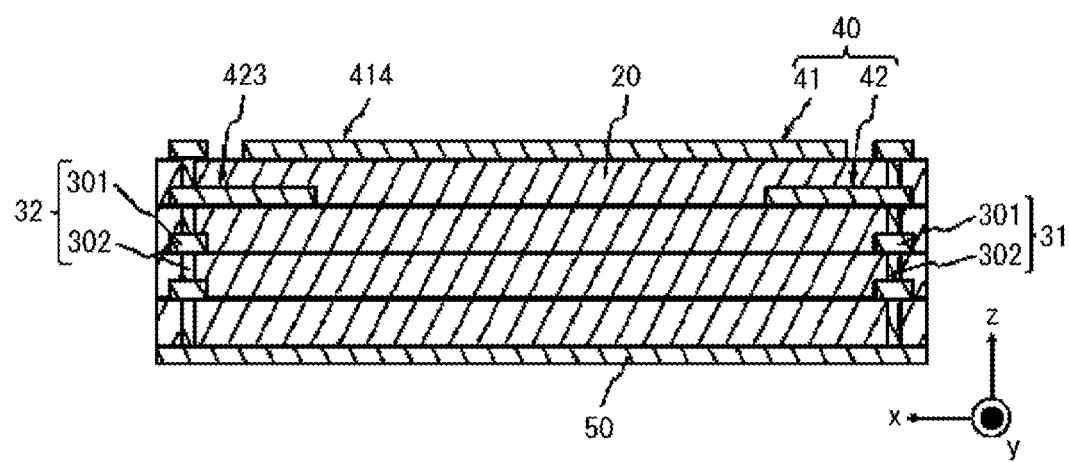
FIG. 47 is a cross-sectional view illustrating one embodiment of the resonator.

FIG. 46 illustrates another example of the resonator 10. FIG. 47 is a cross-sectional view taken along line XLVII-XLVII illustrated in FIG. 46. In the resonator 10 illustrated in FIGS. 46 and 47, the third conductor 40 has a first conductive layer 41 and a second conductive layer 42. The first conductive layer 41 has one first floating conductor 414. The second conductive layer 42 has two second connecting conductors 423. The first conductive layer 41 faces the pair conductors 30 on the xy plane. The two second connecting conductors 423 overlap one first floating conductor 414 as viewed in the z direction. One first floating conductor 414 is capacitively coupled to two second connecting conductors 423.

Figure 48:
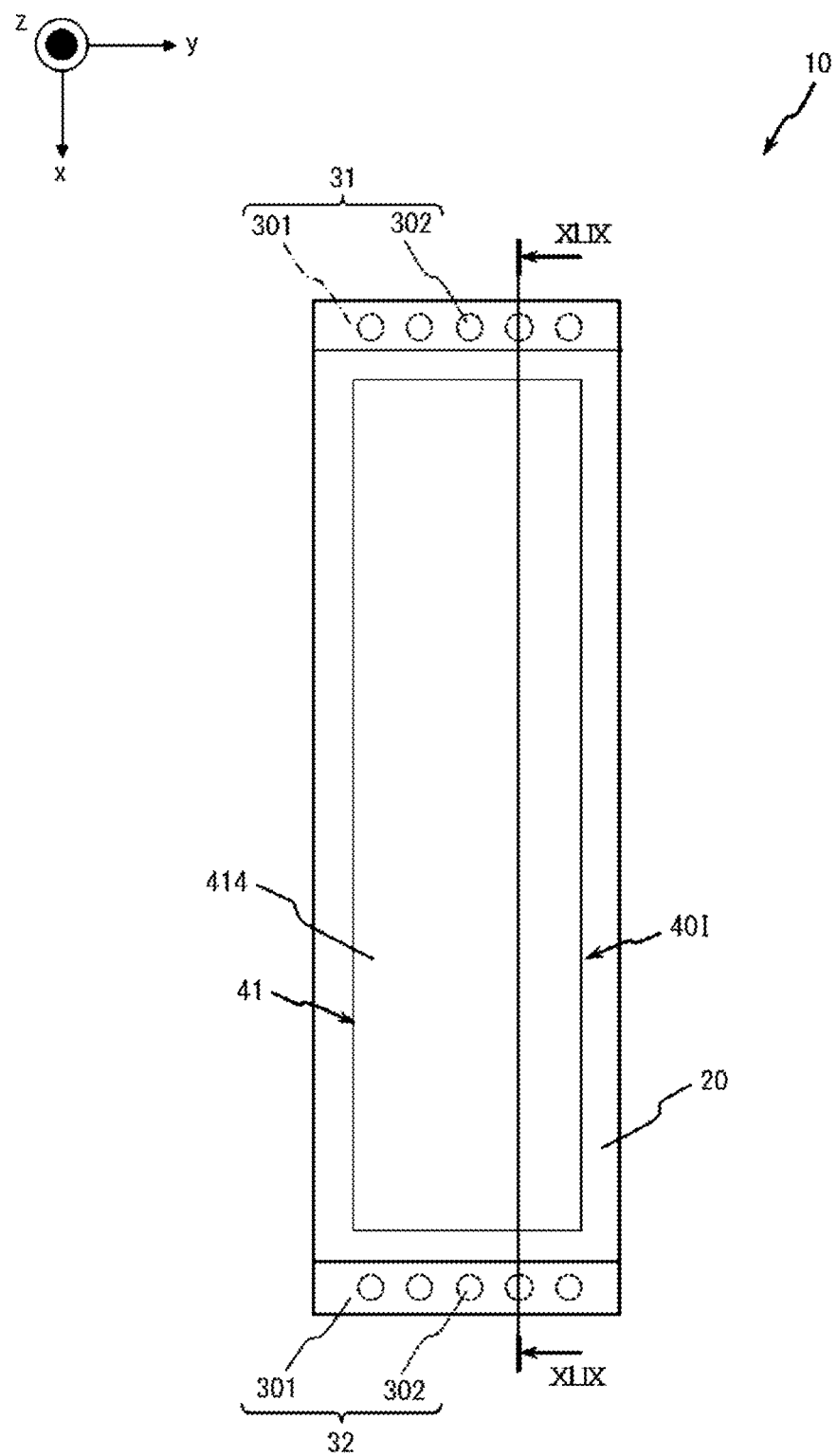
FIG. 48 is a plan view of one embodiment of the resonator.
Figure 49:
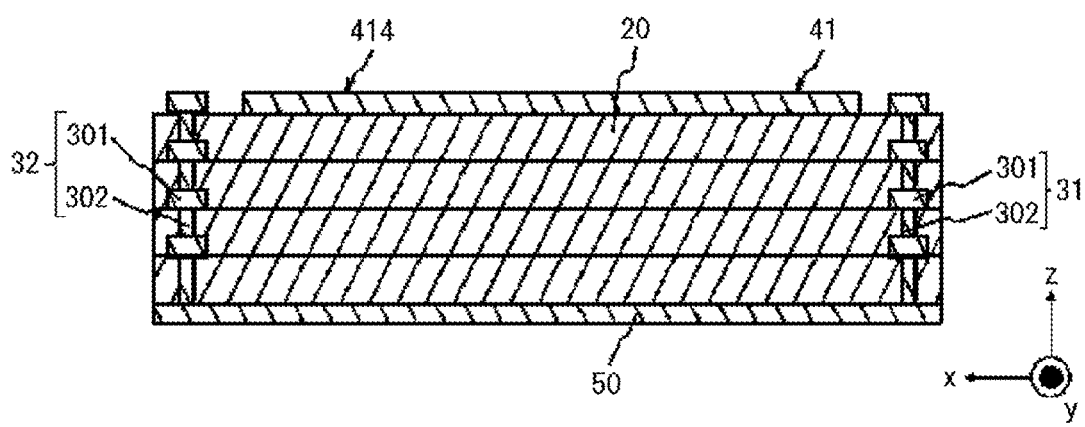
FIG. 49 is a cross-sectional view illustrating one embodiment of the resonator.

FIG. 48 illustrates another example of the resonator 10. FIG. 49 is a cross-sectional view taken along line XLIX-XLIX illustrated in FIG. 48. In the resonator 10 illustrated in FIGS. 48 and 49, the third conductor 40 includes only the first floating conductor 414. The first floating conductor 414 faces the pair conductors 30 on the xy plane. The first connecting conductor 413 is capacitively coupled to the pair conductors 30.

Figure 50:
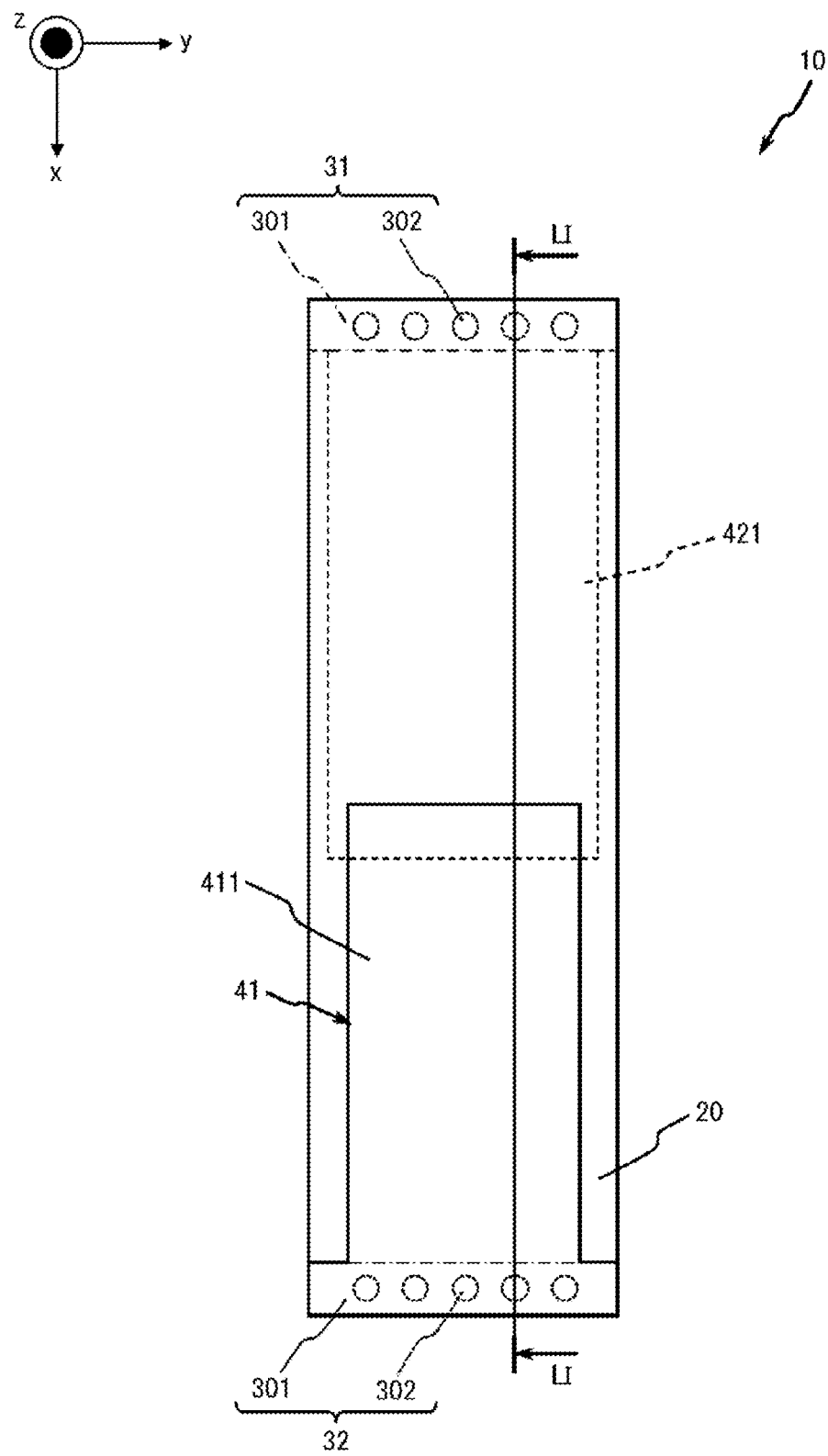
FIG. 50 is a plan view of one embodiment of the resonator.
Figure 51:
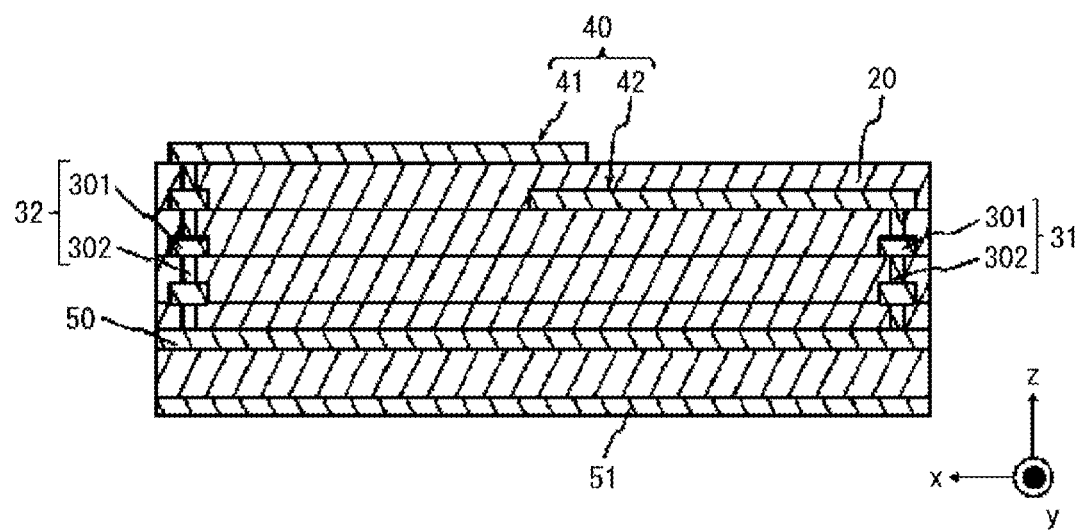
FIG. 51 is a cross-sectional view illustrating one embodiment of the resonator.

FIG. 50 illustrates another example of the resonator 10. FIG. 51 is a cross-sectional view taken along line LI-LI illustrated in FIG. 50. The resonator 10 illustrated in FIGS. 50 and 51 differs from the resonator 10 illustrated in FIGS. 42 and 43 in the configuration of the fourth conductor 50. The resonator 10 illustrated in FIGS. 50 and 51 includes a fourth conductor 50 and a reference potential layer 51. The reference potential layer 51 is electrically connected to the ground of the device including the resonator 10. The reference potential layer 51 faces the third conductor 40 via the fourth conductor 50. The fourth conductor 50 is located between the third conductor 40 and the reference potential layer 51. The spacing between the reference potential layer 51 and the fourth conductor 50 is narrower than the spacing between the third conductor 40 and the fourth conductor 50.

Figure 52:
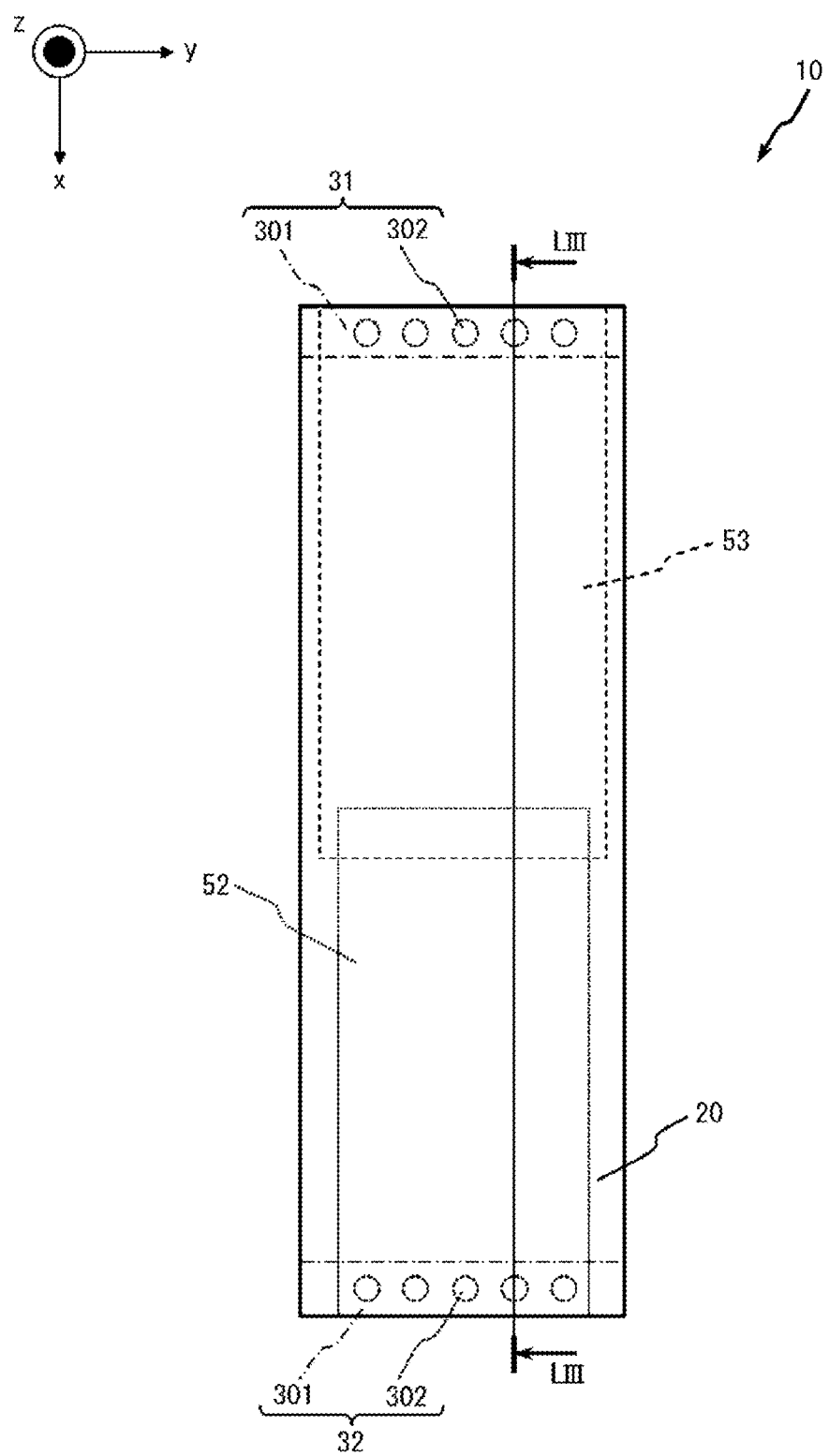
FIG. 52 is a plan view of one embodiment of the resonator.
Figure 53:
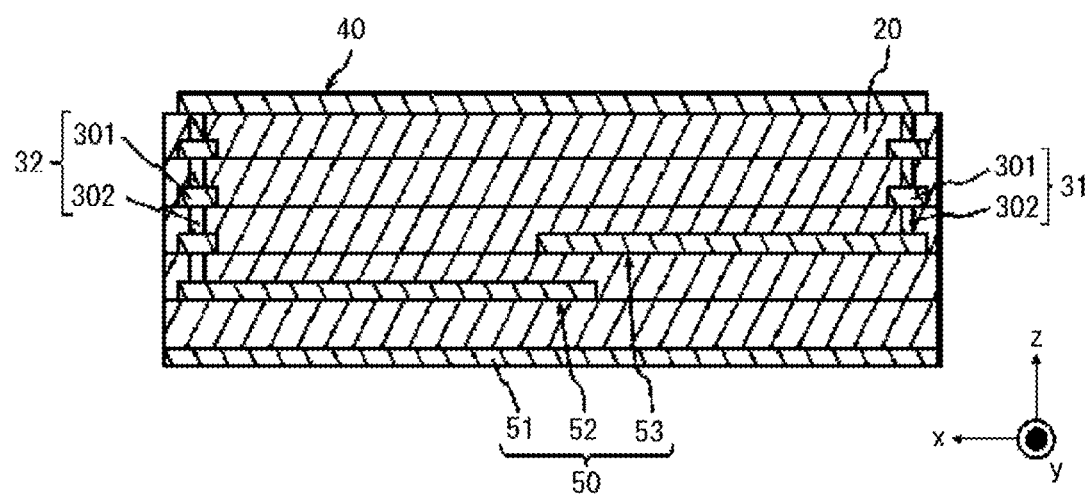
FIG. 53 is a cross-sectional view illustrating one embodiment of the resonator.

FIG. 52 illustrates another example of the resonator 10. FIG. 53 is a cross-sectional view taken along line LIII-LIII illustrated in FIG. 52. The resonator 10 includes a fourth conductor 50 and a reference potential layer 51. The reference potential layer 51 is electrically connected to the ground of the device including the resonator 10. The fourth conductor 50 includes a resonator. The fourth conductor 50 includes a third conductive layer 52 and a fourth conductive layer 53. The third conductive layer 52 and the fourth conductive layer 53 are capacitively coupled. The third conductive layer 52 and the fourth conductive layer 53 face each other in the z direction. The distance between the third conductive layer 52 and the fourth conductive layer 53 is shorter than the distance between the fourth conductive layer 53 and the reference potential layer 51. The distance between the third conductive layer 52 and the fourth conductive layer 53 is shorter than the distance between the fourth conductor 50 and the reference potential layer 51. The third conductor 40 is formed of one conductive layer.

Figure 54:
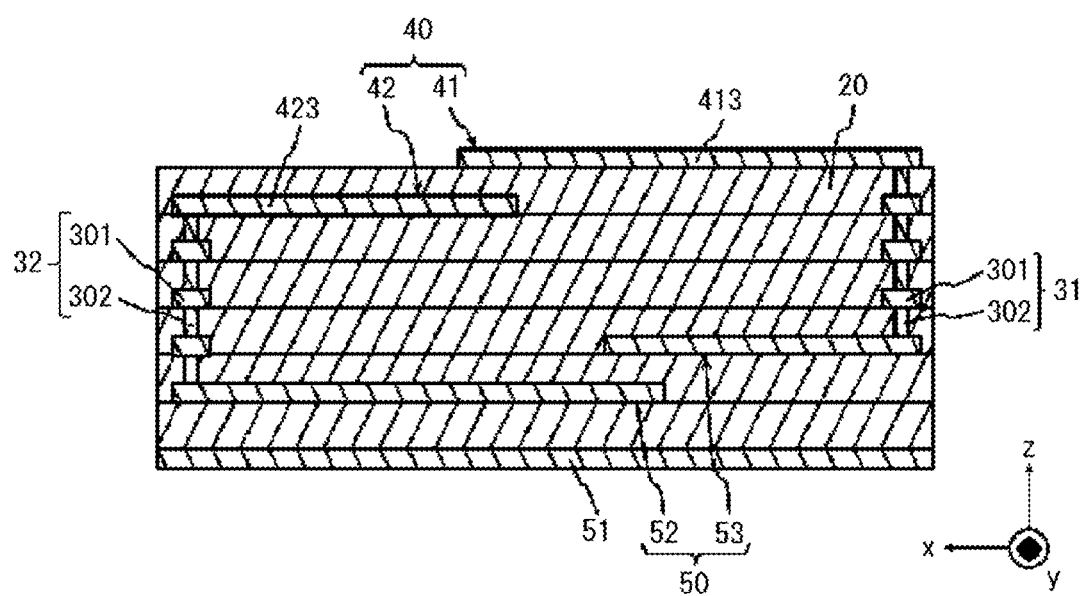
FIG. 54 is a cross-sectional view illustrating one embodiment of the resonator.

FIG. 54 illustrates another example of the resonator 10 illustrated in FIG. 53. The resonator 10 includes a third conductor 40, a fourth conductor 50, and a reference potential layer 51. The third conductor 40 includes a first conductive layer 41 and a second conductive layer 42. The first conductive layer 41 includes a first connecting conductor 413. The second conductive layer 42 includes a second connecting conductor 423. The first connecting conductor 413 is capacitively coupled to the second connecting conductor 423. The reference potential layer 51 is electrically connected to the ground of the device including the resonator 10. The fourth conductor 50 includes a third conductive layer 52 and a fourth conductive layer 53. The third conductive layer 52 and the fourth conductive layer 53 are capacitively coupled. The third conductive layer 52 and the fourth conductive layer 53 face each other in the z direction. The distance between the third conductive layer 52 and the fourth conductive layer 53 is shorter than the distance between the fourth conductive layer 53 and the reference potential layer 51. The distance between the third conductive layer 52 and the fourth conductive layer 53 is shorter than the distance between the fourth conductor 50 and the reference potential layer 51.

Figure 55:
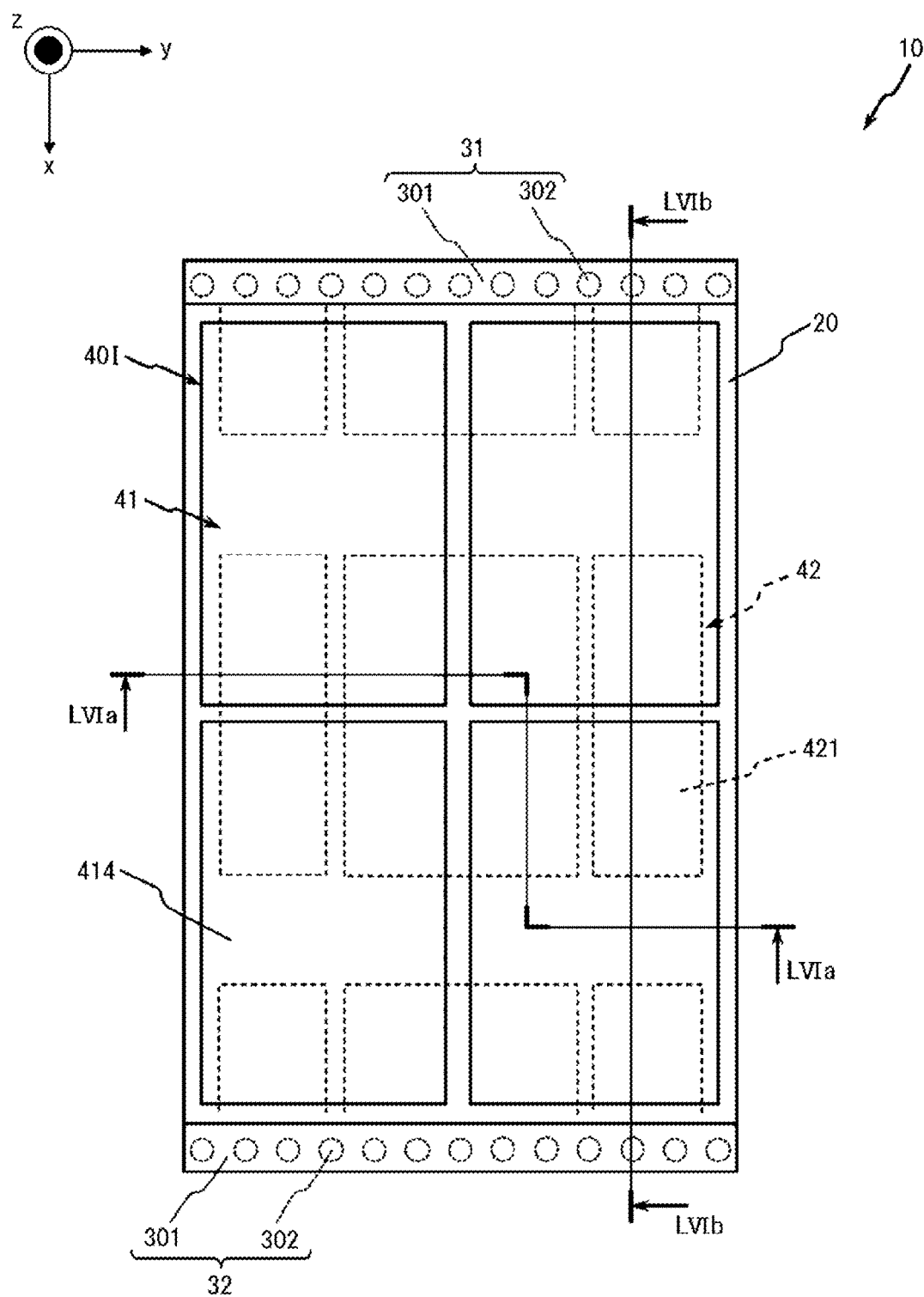
FIG. 55 is a plan view of one embodiment of the resonator.
Figure 56A:
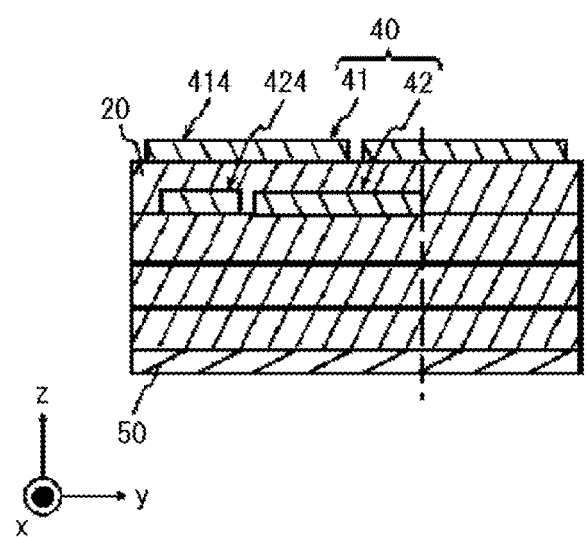
FIG. 56A is a cross-sectional view illustrating one embodiment of the resonator.
Figure 56B:
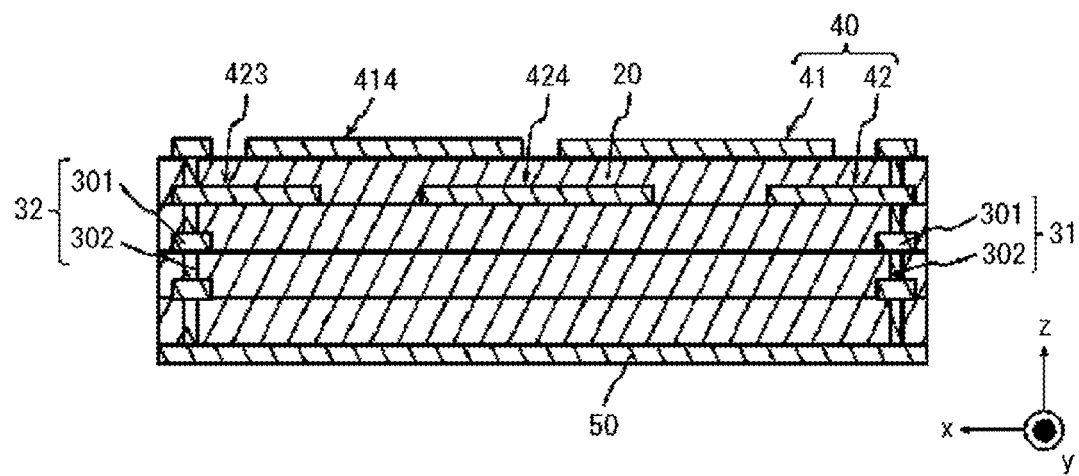
FIG. 56B is a cross-sectional view illustrating one embodiment of the resonator.

FIG. 55 illustrates another example of the resonator 10. FIG. 56A is a cross-sectional view taken along line LVIa-LVIa illustrated in FIG. 55. FIG. 56B is a cross-sectional view taken along line LVIb-LVIb illustrated in FIG. 55. In the resonator 10 illustrated in FIG. 55, the first conductive layer 41 has four first floating conductors 414. The first conductive layer 41 illustrated in FIG. 55 does not have the first connecting conductor 413. In the resonator 10 illustrated in FIG. 55, the second conductive layer 42 has six second connecting conductors 423 and three second floating conductors 424. Two second connecting conductors 423 are capacitively coupled to two first floating conductors 414. One second floating conductor 424 is capacitively coupled to four first floating conductors 414. Two second floating conductors 424 are capacitively coupled to two first floating conductors 414.

Figure 57:
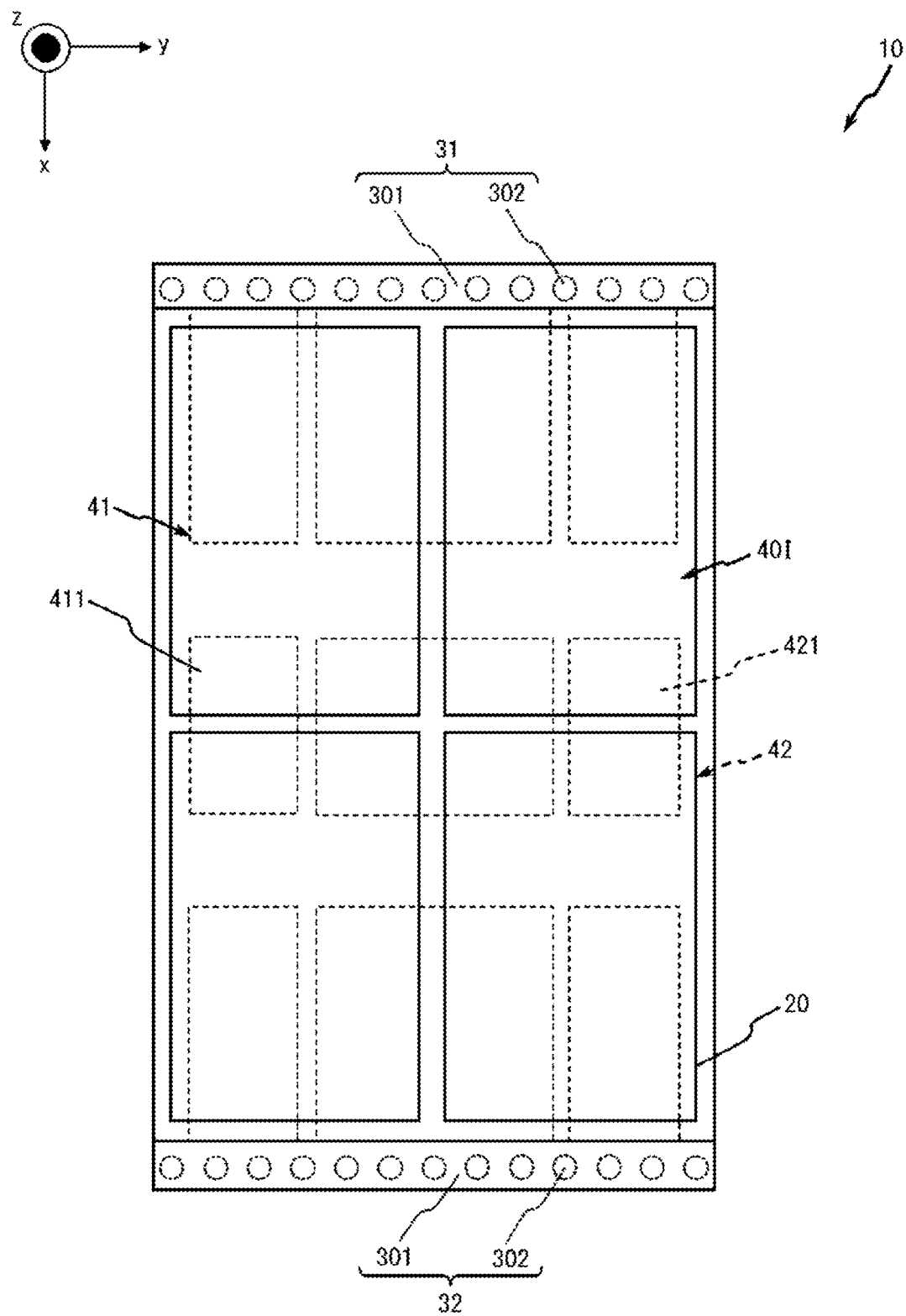
FIG. 57 is a plan view of one embodiment of the resonator.

FIG. 57 is a view illustrating another example of the resonator illustrated in FIG. 55. The resonator 10 of FIG. 57 differs from the resonator 10 illustrated in FIG. 55 in a size of the second conductive layer 42. In the resonator 10 illustrated in FIG. 57, the length of the second floating conductor 424 in the x direction is shorter than the length of the second connecting conductor 423 in the x direction.

Figure 58:
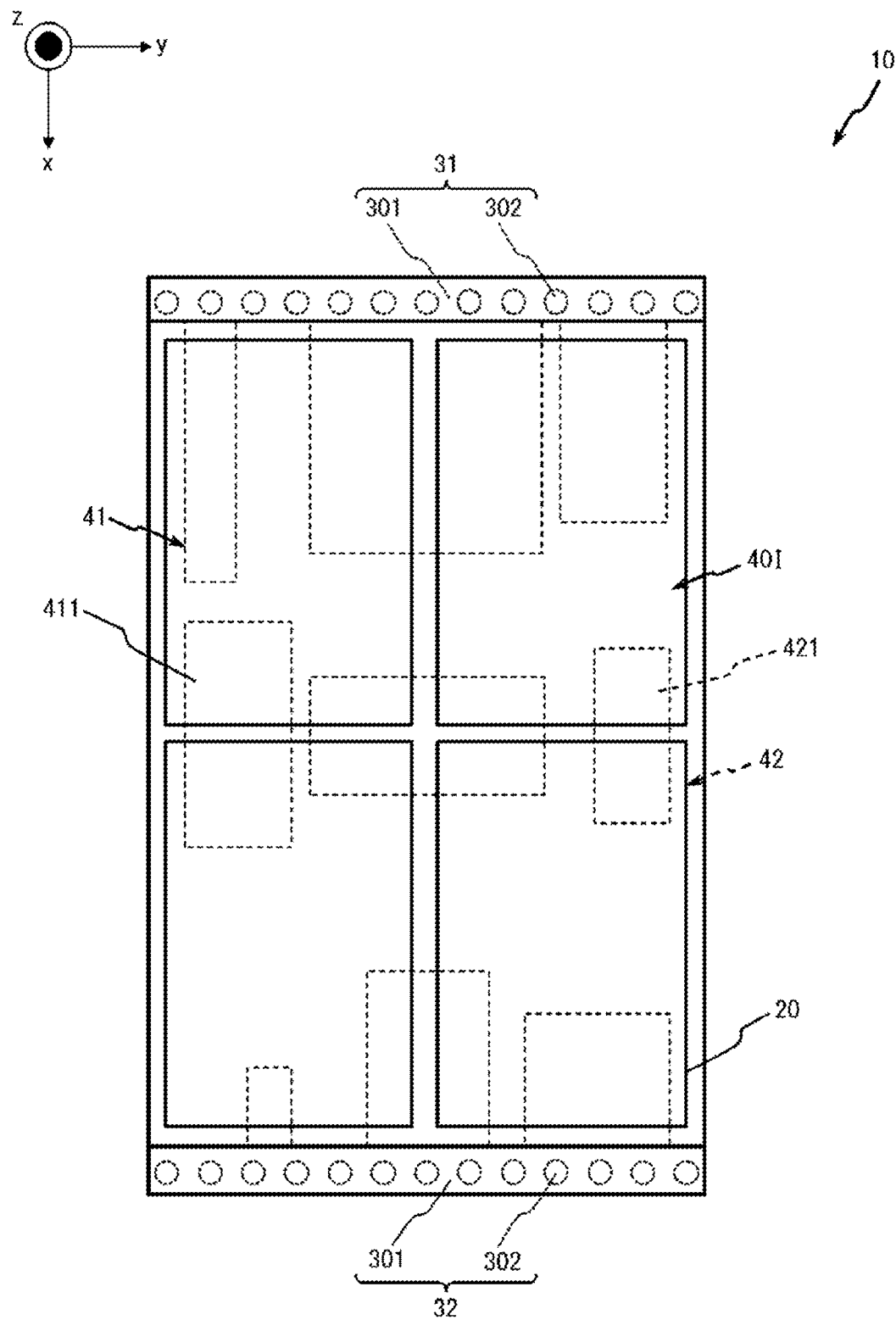
FIG. 58 is a plan view of one embodiment of the resonator.

FIG. 58 is a view illustrating another example of the resonator illustrated in FIG. 55. The resonator 10 of FIG. 58 differs from the resonator 10 illustrated in FIG. 55 in the size of the second conductive layer 42. In the resonator 10 illustrated in FIG. 58, each of the plurality of second unit conductors 421 has a different first surface integral. In the resonator 10 illustrated in FIG. 58, each of the plurality of second unit conductors 421 has a different length in the x direction. In the resonator 10 illustrated in FIG. 58, each of the plurality of second unit conductors 421 has a different length in the y direction. In FIG. 58, the plurality of second unit conductors 421 differ from each other in first surface integral, length, and width, but are not limited thereto. In FIG. 58, the plurality of second unit conductors 421 may differ from each other in some of first surface integral, length, and width. The plurality of second unit conductors 421 may be equal to each other in some or all of first surface integral, length, and width. The plurality of second unit conductors 421 may differ from each other in some or all first surface integral, length, and width. The plurality of second unit conductors 421 may be equal to each other in some or all of first surface integral, length, and width. Some of the plurality of second unit conductors 421 may be equal to each other in some or all of first surface integral, length, and width.

In the resonator 10 illustrated in FIG. 58, a plurality of second connecting conductors 423 arranged in the y direction have different first surface integrals from each other. In the resonator 10 illustrated in FIG. 58, the plurality of second connecting conductors 423 arranged in the y direction have different lengths in the x direction from each other. In the resonator 10 illustrated in FIG. 58, the plurality of second connecting conductors 423 arranged in the y direction have different lengths in the y direction from each other. In FIG. 58, the plurality of second connecting conductors 423 differ from each other in first surface integral, length, and width, but are not limited thereto. In FIG. 58, the plurality of second connecting conductors 423 may differ from each other in some of first surface integral, length, and width. The plurality of second connecting conductors 423 may be equal to each other in some or all of first surface integral, length, and width. The plurality of second connecting conductors 423 may differ from each other in some or all first surface integral, length, and width. The plurality of second connecting conductors 423 may be equal to each other in some or all of first surface integral, length, and width. Some of the plurality of second connecting conductors 423 may be equal to each other in some or all of first surface integral, length, and width.

In the resonator 10 illustrated in FIG. 58, the plurality of second floating conductors 424 arranged in the y direction have different first surface integrals from each other. In the resonator 10 illustrated in FIG. 58, the plurality of second floating conductors 424 arranged in the y direction have different lengths in the x direction from each other. In the resonator 10 illustrated in FIG. 58, the plurality of second floating conductors 424 arranged in the y direction have different lengths in the y direction from each other. In FIG. 58, the plurality of second floating conductors 424 differ from each other in first surface integral, length, and width, but are not limited thereto. In FIG. 58, the plurality of second floating conductors 424 may differ from each other in some of first surface integral, length, and width. The plurality of second floating conductors 424 may be equal to each other in some or all of first surface integral, length, and width. The plurality of second floating conductors 424 may differ from each other in some or all first surface integral, length, and width. The plurality of second floating conductors 424 may be equal to each other in some or all of first surface integral, length, and width. Some of the plurality of second floating conductors 424 may be equal to each other in some or all of first surface integral, length, and width.

Figure 59:
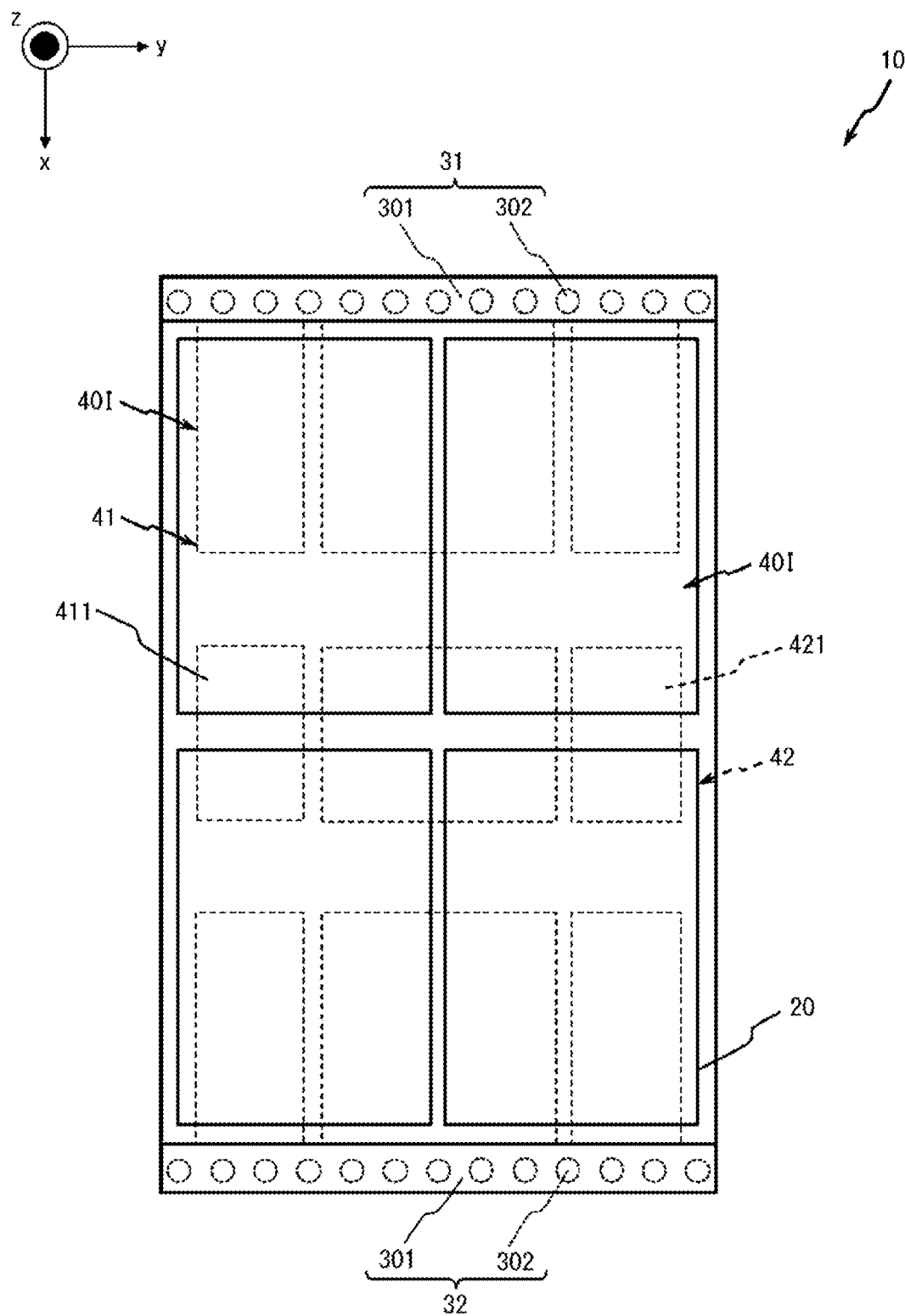
FIG. 59 is a plan view of one embodiment of the resonator.

FIG. 59 is a diagram illustrating another example of the resonator 10 illustrated in FIG. 57. The resonator 10 of FIG. 59 differs from the resonator 10 illustrated in FIG. 57 in a spacing between the first unit conductors 411 in the y direction. In the resonator 10 of FIG. 59, the spacing between the first unit conductors 411 in the y direction is smaller than the spacing between the first unit conductors 411 in the x direction. In the resonator 10, since the pair conductors 30 can function as an electric conductor, current flows in the x direction. In the resonator 10, the current flowing through the third conductor 40 in the y direction can be ignored. The spacing between the first unit conductors 411 in the y direction may be shorter than the spacing between the first unit conductors 411 in the x direction. The surface integral of the first unit conductors 411 may be increased by shortening the spacing between the first unit conductors 411 in the y direction.

Figure 60:
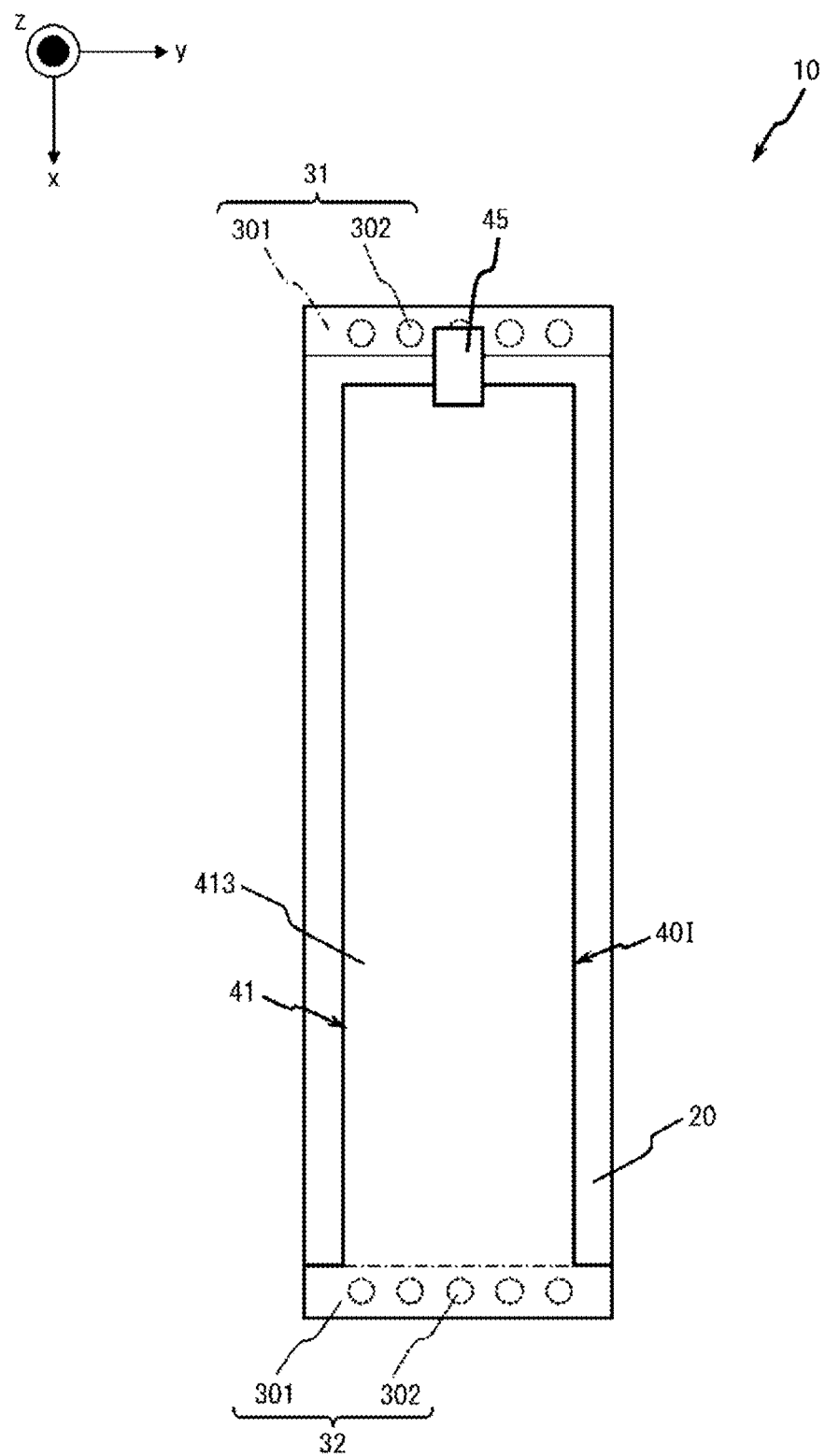
FIG. 60 is a plan view of one embodiment of the resonator.
Figure 61:
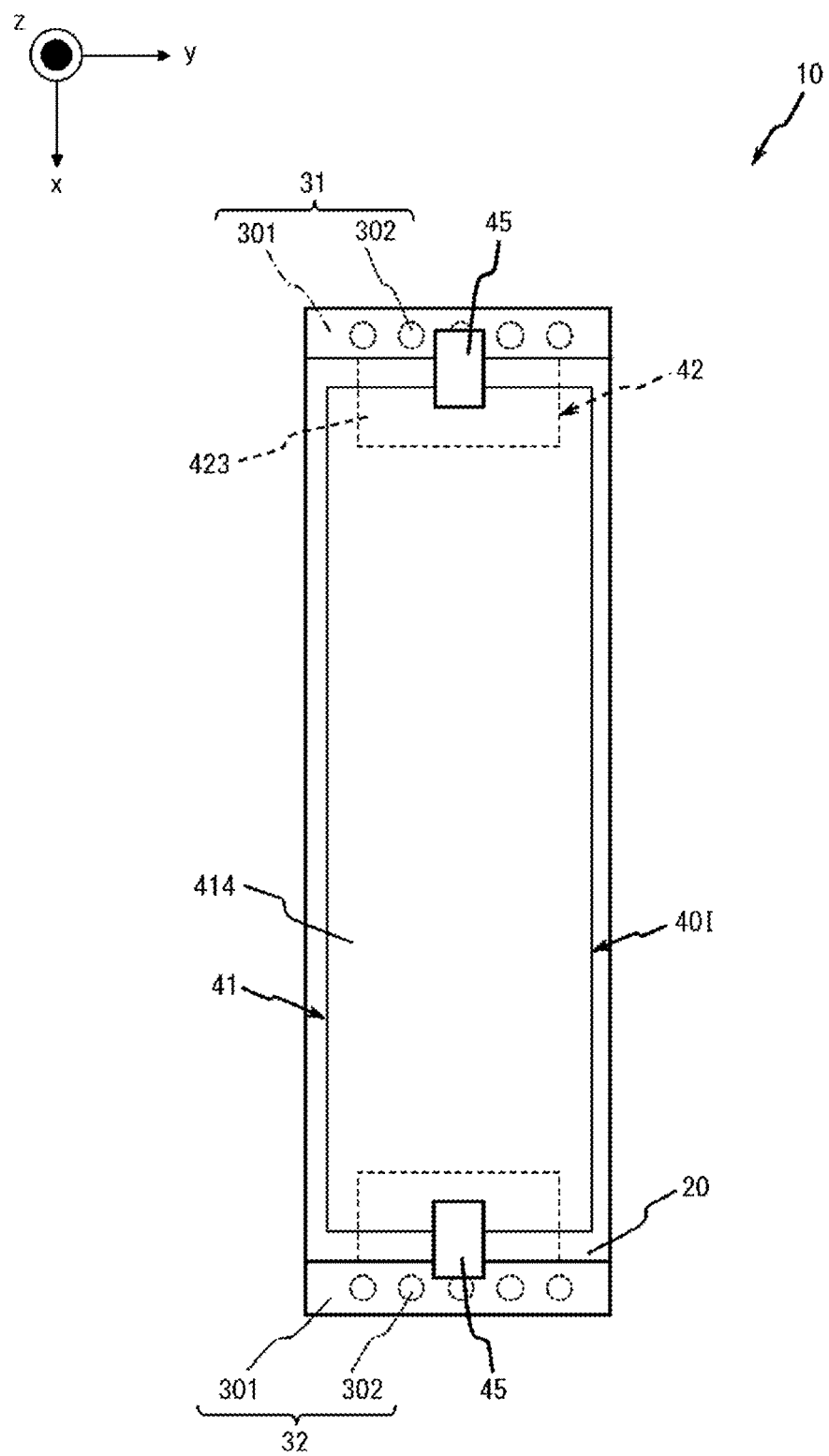
FIG. 61 is a plan view of one embodiment of the resonator.
Figure 62:
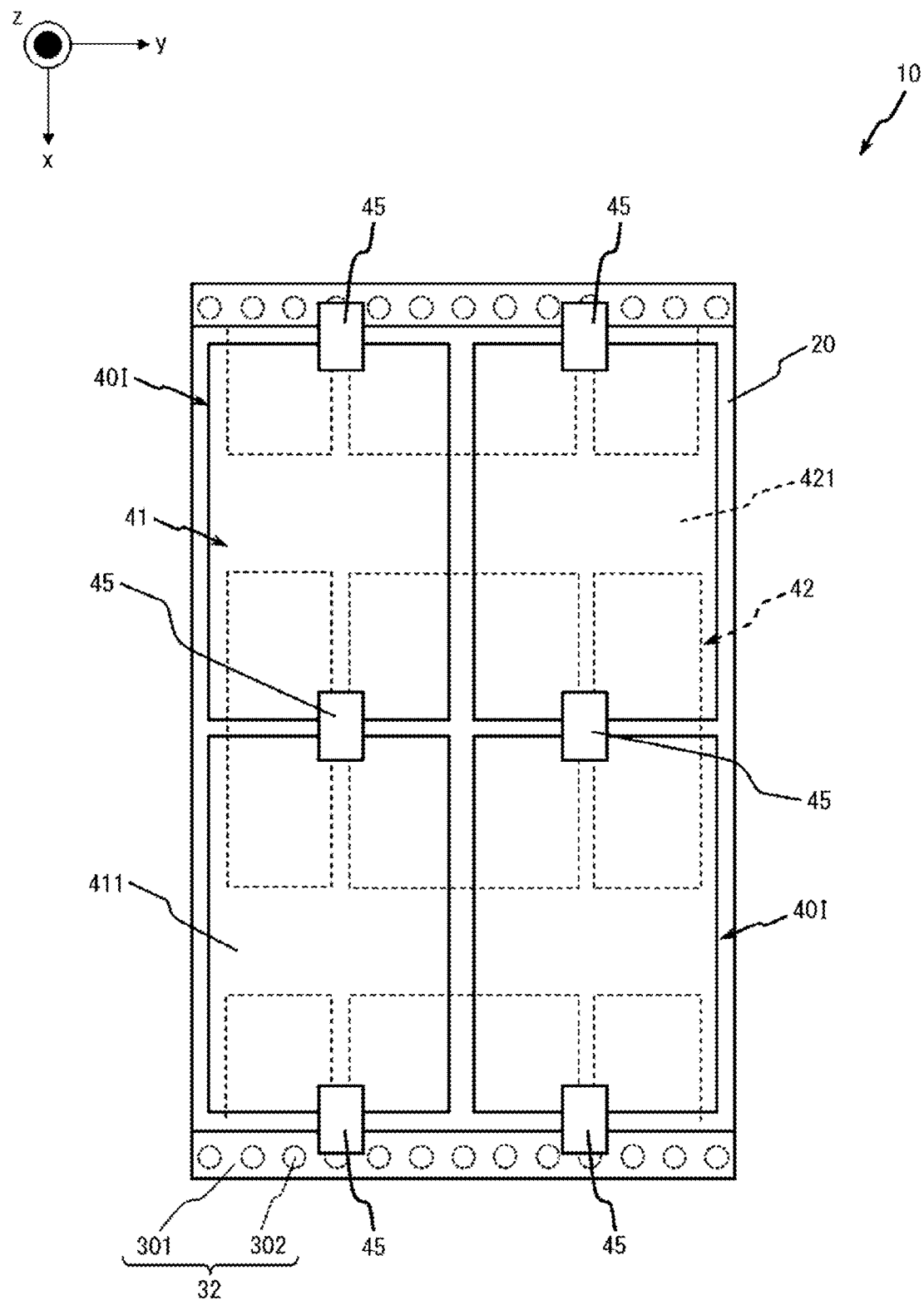
FIG. 62 is a plan view of one embodiment of the resonator.

FIGS. 60 to 62 are views illustrating another example of the resonator 10. These resonators 10 have an impedance element 45. The unit conductor to which the impedance element 45 is connected is not limited to the examples illustrated in FIGS. 60 to 62. The impedance element 45 illustrated in FIGS. 60 to 62 can be partially omitted. The impedance element 45 may have a capacitance characteristic. The impedance element 45 may have an inductance characteristic. The impedance element 45 may be a mechanical or electrical variable element. The impedance element 45 may connect two different conductors in one layer.

The antenna has at least one of a function of radiating an electromagnetic wave and a function of receiving an electromagnetic wave. The antenna of the present disclosure includes, but is not limited to, a first antenna 60 and a second antenna 70.

The first antenna 60 includes a base 20, pair conductors 30, a third conductor 40, a fourth conductor 50, and a first feeding line 61. In one example, the first antenna 60 has a third base 24 on the base 20. The third base 24 may have a different composition than the base 20. The third base 24 may be located on the third conductor 40. FIGS. 63 to 76 are views illustrating the first antenna 60, which is an example of a plurality of embodiments.

The first feeding line 61 feeds power to at least one of the resonators arranged periodically as an artificial magnetic conductor. When feeding power to a plurality of resonators, the first antenna 60 may have a plurality of first feeding lines. The first feeding line 61 may be electromagnetically connected to any of the resonators arranged periodically as the artificial magnetic conductor. The first feeding line 61 may be electromagnetically connected to any one of a pair of conductors that can be seen as an electric conductor from the resonators that are periodically arranged as the artificial magnetic conductor.

The first feeding line 61 feeds power to at least one of the first conductor 31, the second conductor 32, and the third conductor 40. When feeding power to a plurality of portions of the first conductor 31, the second conductor 32, and the third conductor 40, the first antenna 60 may have a plurality of first feeding lines. The first feeding line 61 may be electromagnetically connected to any of the first conductor 31, the second conductor 32, and the third conductor 40. When the first antenna 60 includes the reference potential layer 51 in addition to the fourth conductor 50, the first feeding line 61 may be electromagnetically connected to any one of the first conductor 31, the second conductor 32, the third conductor 40, and the fourth conductor 50. The first feeding line 61 is electrically connected to either the fifth conductive layer 301 or the fifth conductor 302 of the pair conductors 30. A part of the first feeding line 61 may be integrated with the fifth conductive layer 301.

The first feeding line 61 may be electromagnetically connected to the third conductor 40. For example, the first feeding line 61 is electromagnetically connected to one of the first unit resonators 41X. For example, the first feeding line 61 is electromagnetically connected to one of the second unit resonators 42X. The first feeding line 61 is electromagnetically connected to the unit conductor of the third conductor 40 at a point different from the center in the x direction. In one embodiment, the first feeding line 61 feeds power to at least one resonator included in the third conductor 40. In one embodiment, the first feeding line 61 feeds power from the at least one resonator included in the third conductor 40 to the outside. At least a part of the first feeding line 61 may be located in the base 20. The first feeding line 61 may be exposed to the outside from any of two zx planes, two yz planes, and two xy planes of the base 20.

The first feeding line 61 may be in contact with the third conductor 40 from a forward direction and a reverse direction of the z direction. The fourth conductor 50 may be omitted around the first feeding line 61. The first feeding line 61 may be electromagnetically connected to the third conductor 40 through the opening of the fourth conductor 50. The first conductive layer 41 may be omitted around the first feeding line 61. The first feeding line 61 may be connected to the second conductive layer 42 through the opening of the first conductive layer 41. The first feeding line 61 may be in contact with the third conductor 40 along the xy plane. The pair conductors 30 may be omitted around the first feeding line 61. The first feeding line 61 may be connected to the third conductor 40 through the openings of the pair conductors 30. The first feeding line 61 is connected to the unit conductor of the third conductor 40, apart from a center portion of the unit conductor.

Figure 63:
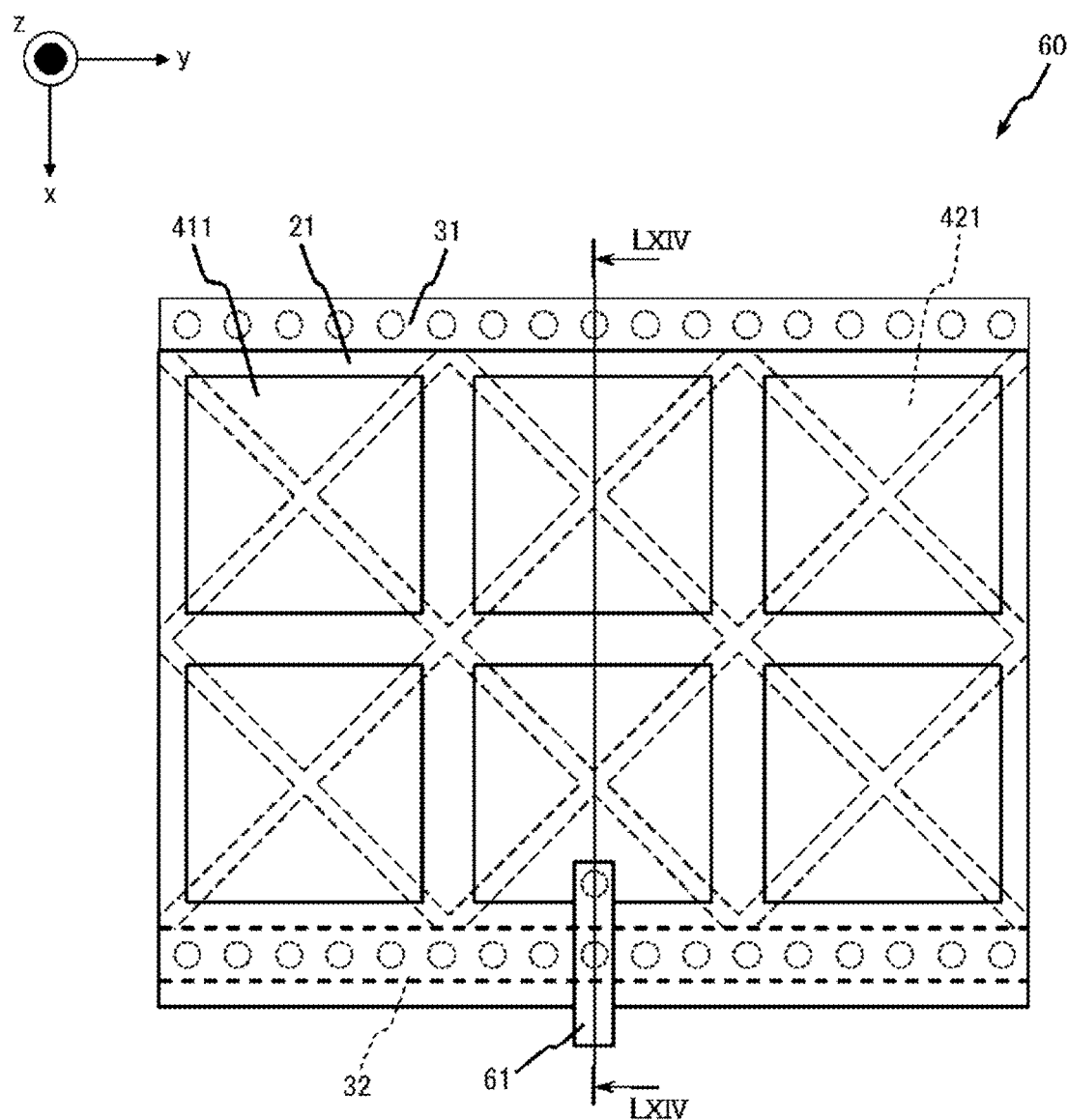
FIG. 63 is a plan view of one embodiment of an antenna.
Figure 64:
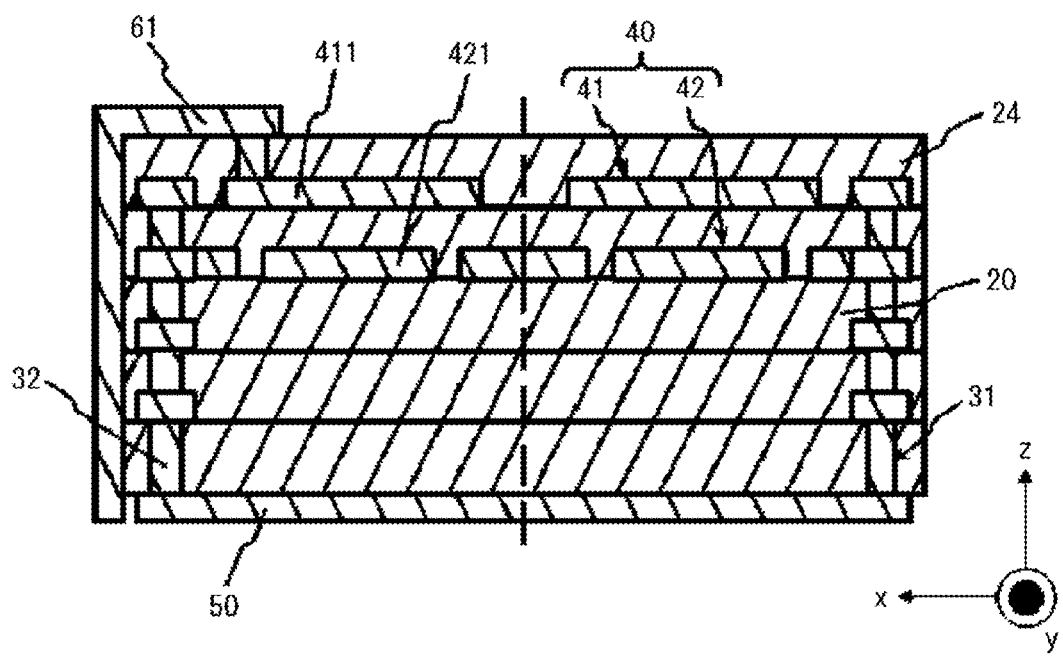
FIG. 64 is a cross-sectional view illustrating one embodiment of the antenna.

FIG. 63 is a plan view of the first antenna 60 when the xy plane is viewed in the z direction. FIG. 64 is a cross-sectional view taken along line LXIV-LXIV illustrated in FIG. 63. The first antenna 60 illustrated in FIGS. 63 and 64 has a third base 24 on the third conductor 40. The third base 24 has an opening on the first conductive layer 41. The first feeding line 61 is electrically connected to the first conductive layer 41 via the opening of the third base 24.

Figure 65:
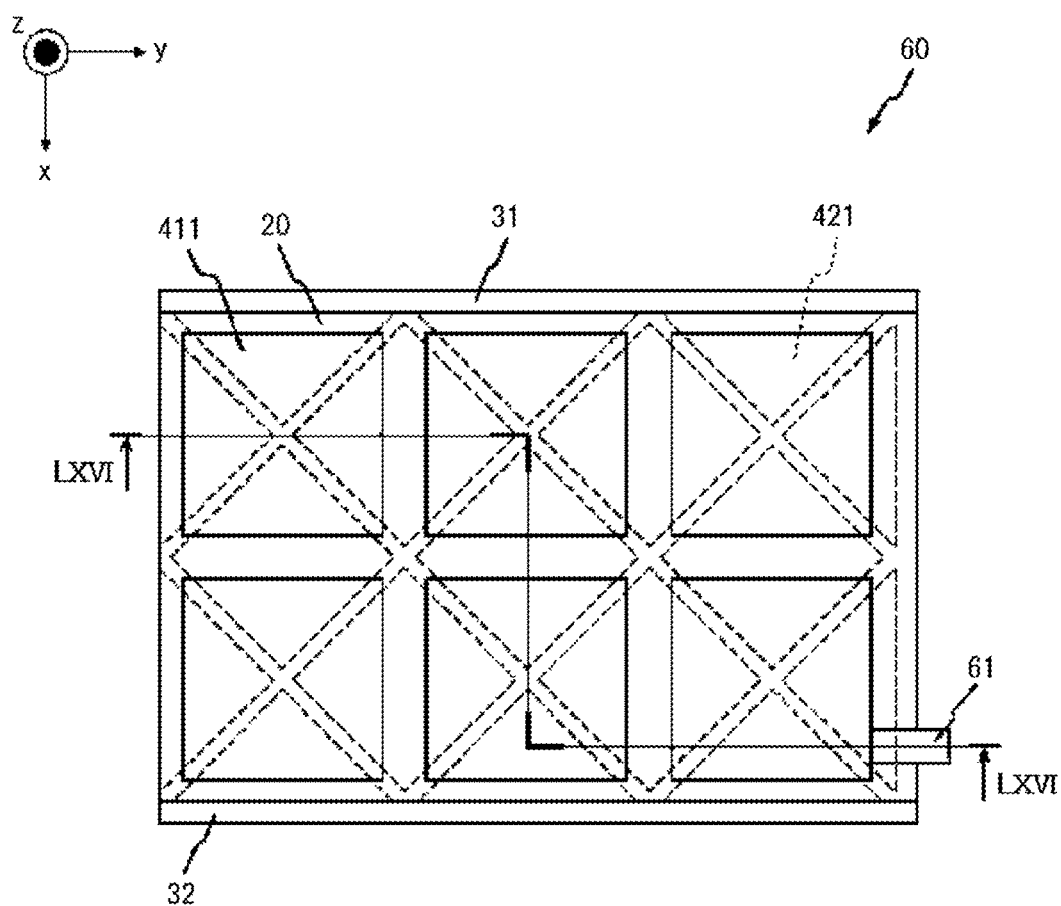
FIG. 65 is a plan view of one embodiment of the antenna.
Figure 66:
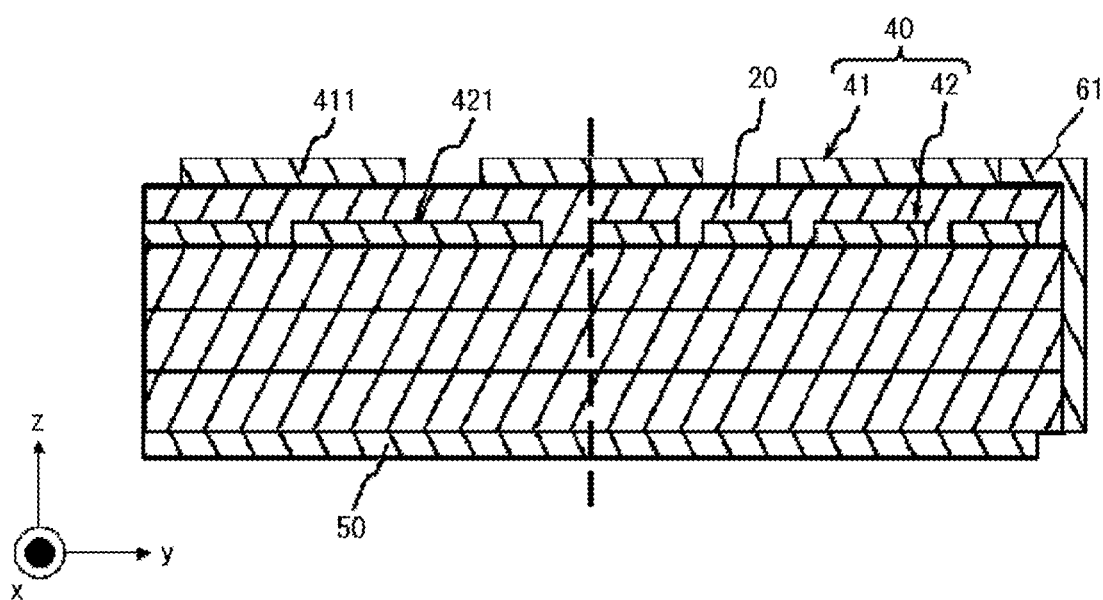
FIG. 66 is a cross-sectional view illustrating one embodiment of the antenna.

FIG. 65 is a plan view of the first antenna 60 when the xy plane is viewed in the z direction. FIG. 66 is a cross-sectional view taken along line LXVI-LXVI illustrated in FIG. 65. In the first antenna 60 illustrated in FIGS. 65 and 66, a part of the first feeding line 61 is located on the base 20. The first feeding line 61 may be connected to the third conductor 40 on the xy plane. The first feeding line 61 may be connected to the first conductive layer 41 on the xy plane. In one embodiment, the first feeding line 61 may be connected to the second conductive layer 42 on the xy plane.

Figure 67:
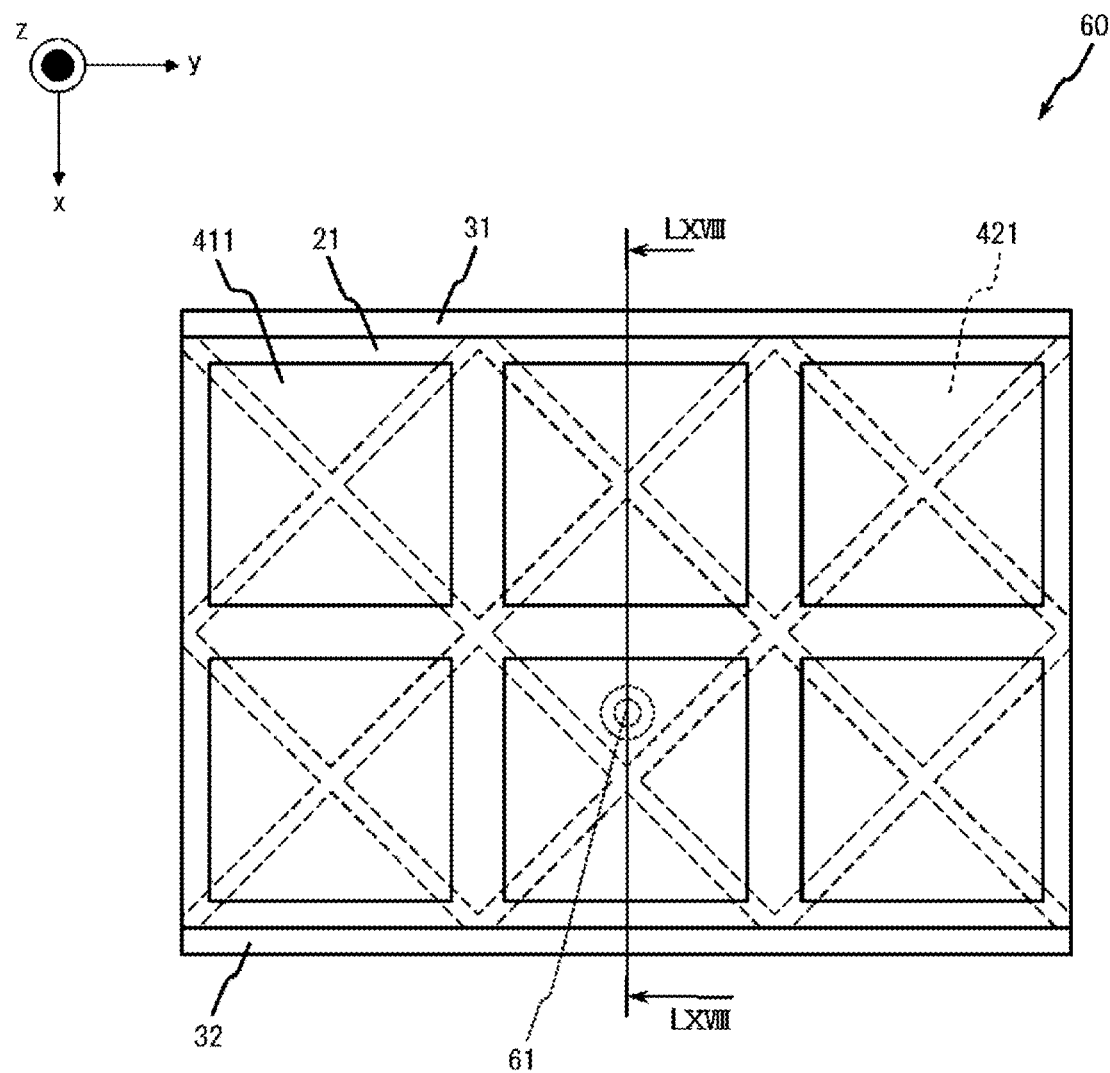
FIG. 67 is a plan view of one embodiment of the antenna.
Figure 68:
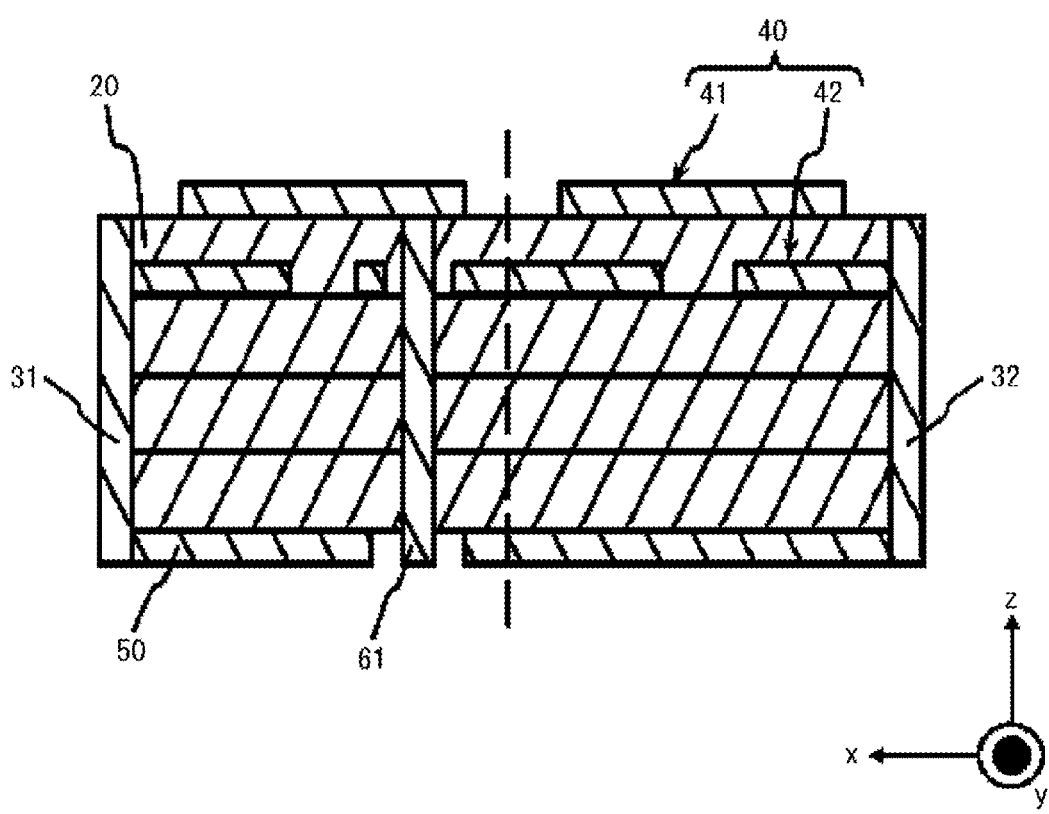
FIG. 68 is a cross-sectional view illustrating one embodiment of the antenna.

FIG. 67 is a plan view of the first antenna 60 when the xy plane is viewed in the z direction. FIG. 68 is a cross-sectional view taken along line LXVIII-LXVIII illustrated in FIG. 67. In the first antenna 60 illustrated in FIGS. 67 and 68, the first feeding line 61 is located inside the base 20. The first feeding line 61 may be connected to the third conductor 40 from a reverse direction to the z direction. The fourth conductor 50 may have an opening. The fourth conductor 50 may have the opening at a position overlapping the third conductor 40 in the z direction. The first feeding line 61 may be exposed to the outside of the base 20 through the opening.

Figure 69:
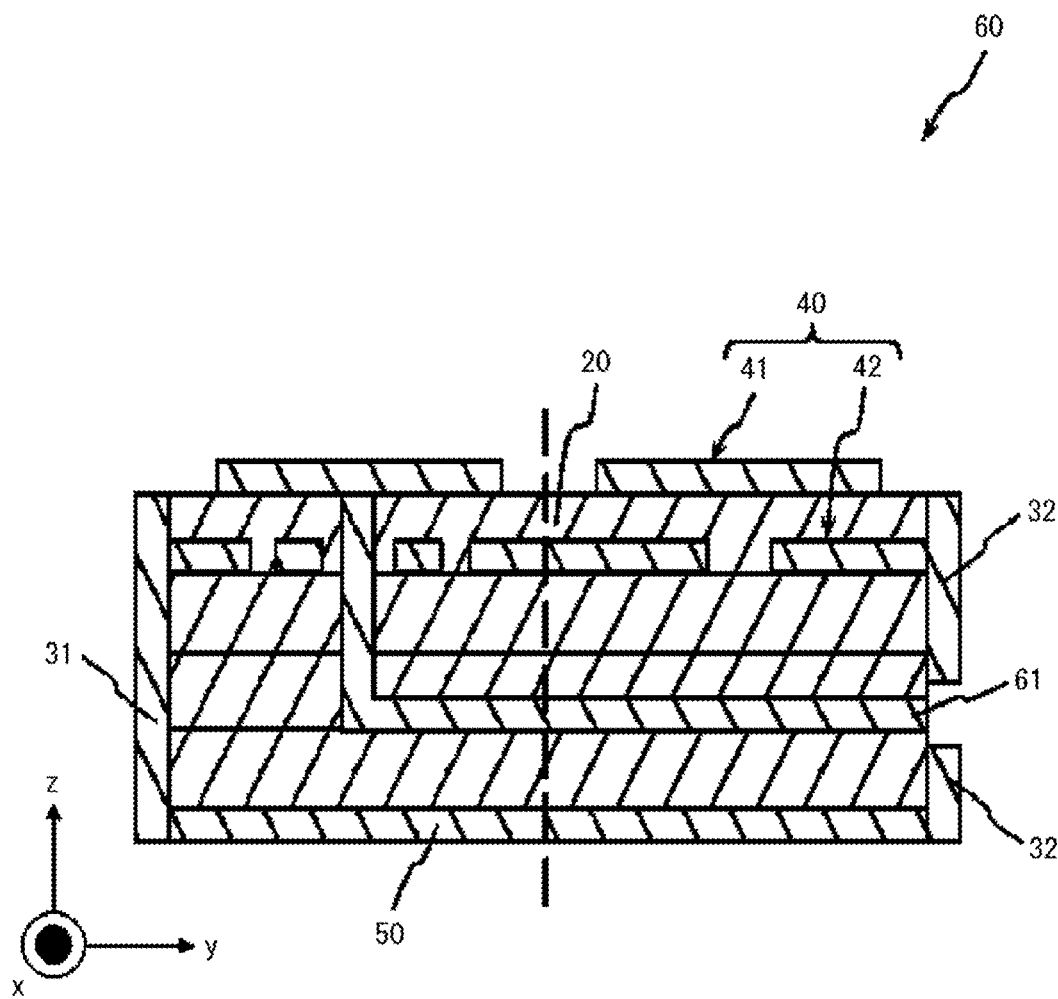
FIG. 69 is a cross-sectional view illustrating one embodiment of the antenna.

FIG. 69 is a cross-sectional view of the first antenna 60 when the yz plane is viewed in the x direction. The pair conductors 30 may have openings. The first feeding line 61 may be exposed to the outside of the base 20 through the opening.

The electromagnetic wave radiated by the first antenna 60 has a polarization component in the x direction larger than that in the y direction on the first plane. The polarization component in the x direction has smaller attenuation than a horizontal polarization component when a metal plate approaches the fourth conductor 50 from the z direction. The first antenna 60 may maintain a radiation efficiency when the metal plate approaches from the outside.

Figure 70:
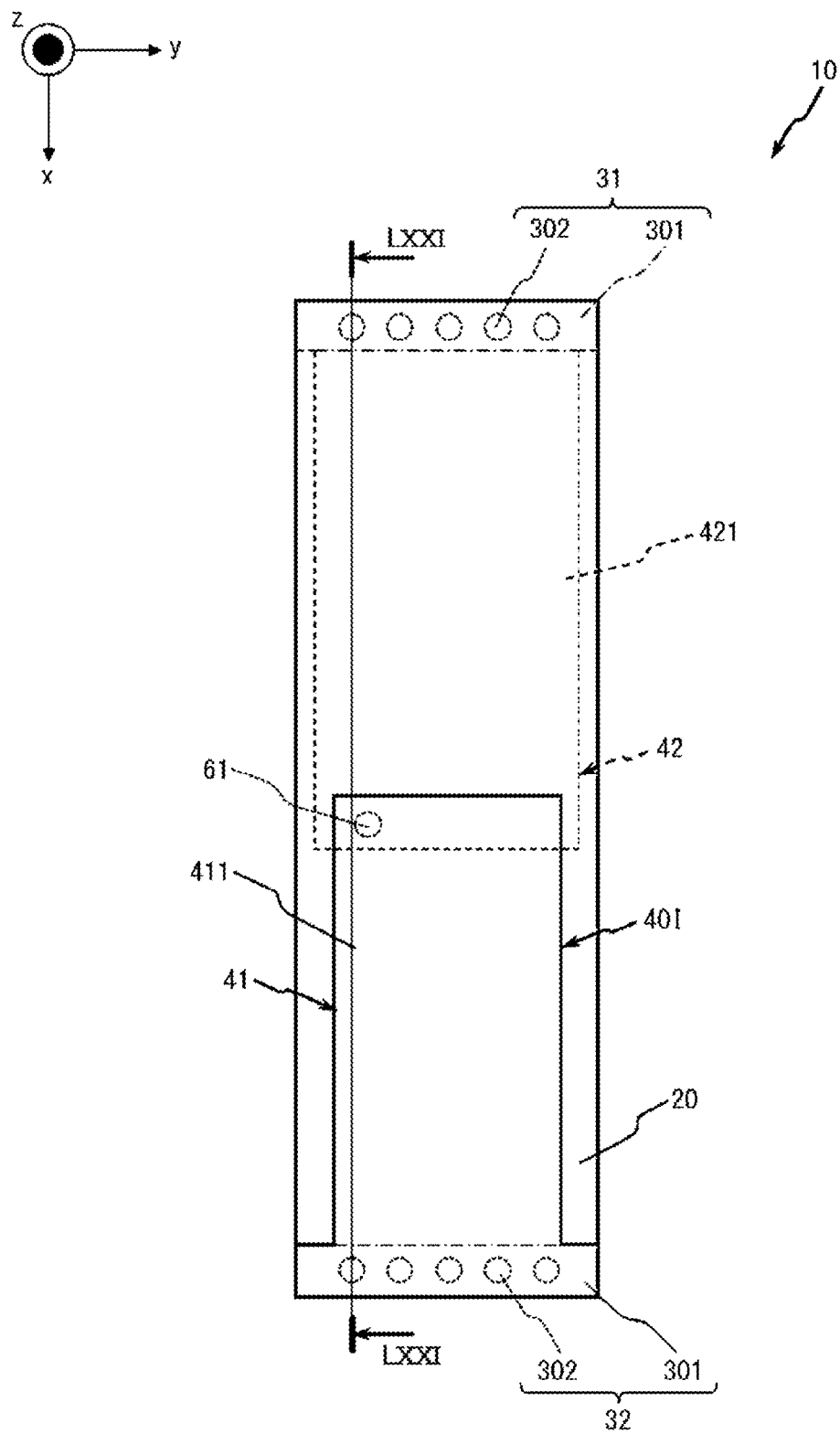
FIG. 70 is a plan view of one embodiment of the antenna.
Figure 71:
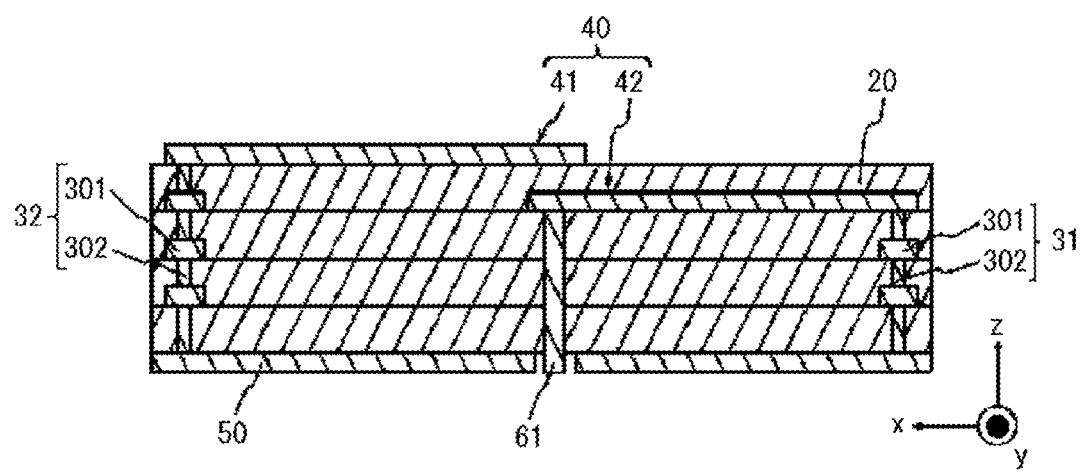
FIG. 71 is a cross-sectional view illustrating one embodiment of the antenna.
Figure 72:
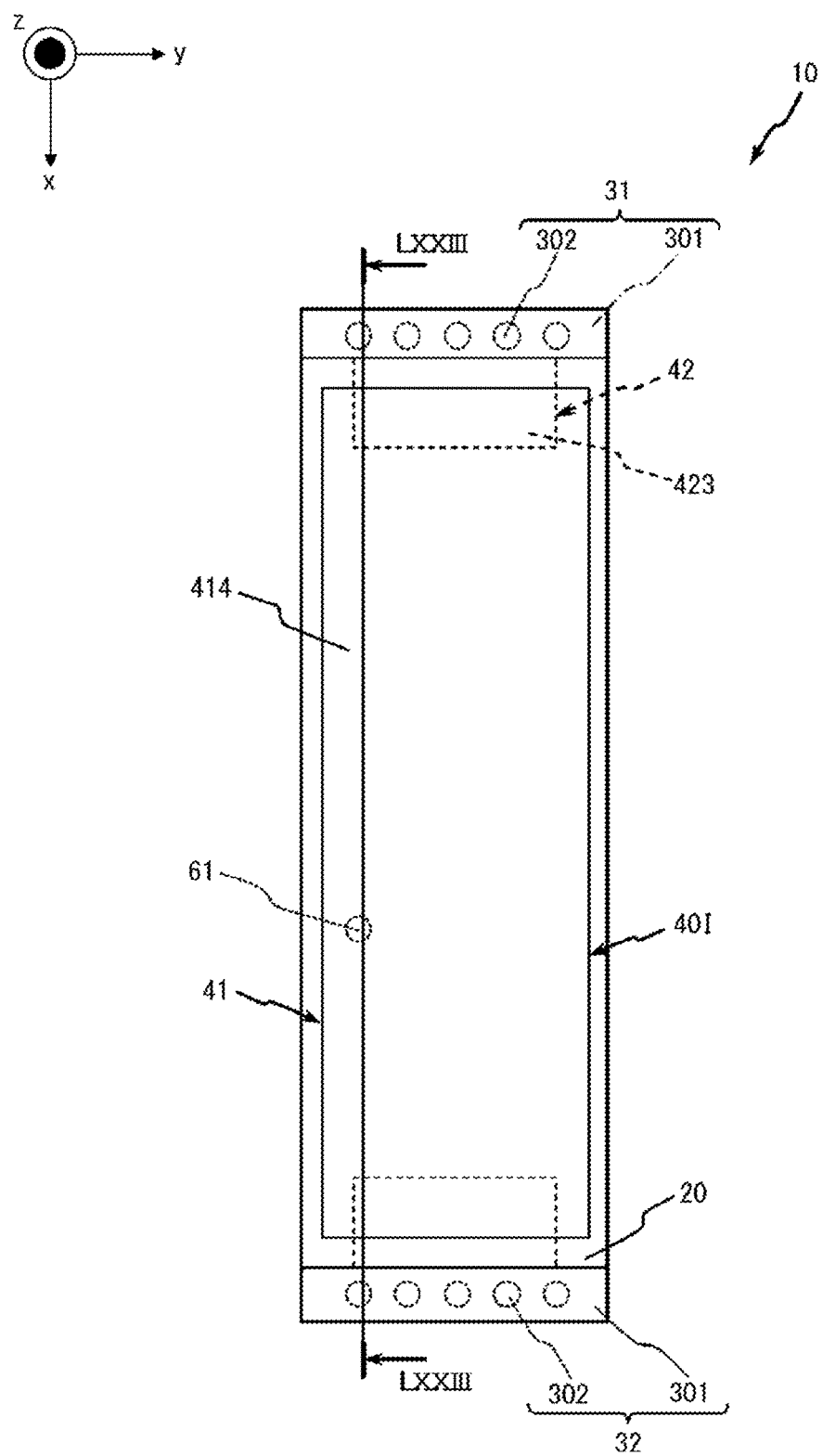
FIG. 72 is a plan view of one embodiment of the antenna.
Figure 73:
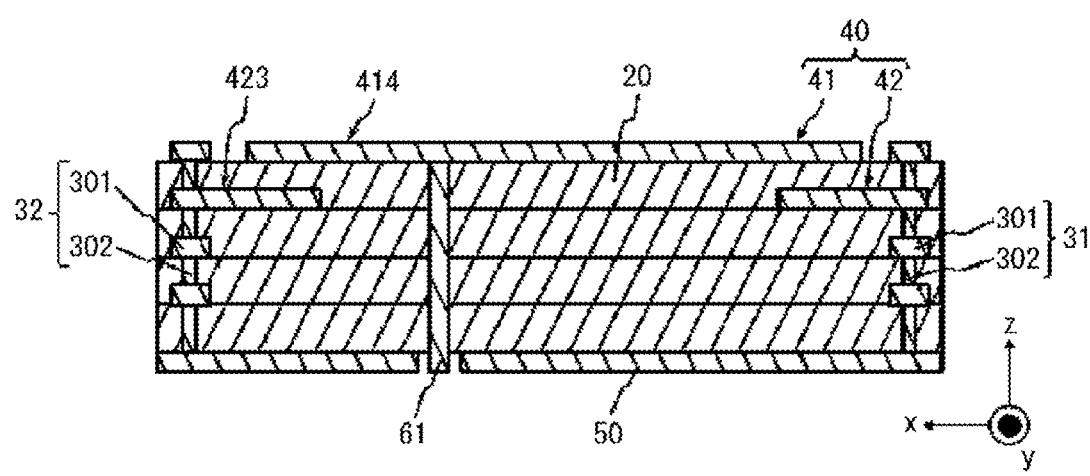
FIG. 73 is a cross-sectional view illustrating one embodiment of the antenna.
Figure 74:
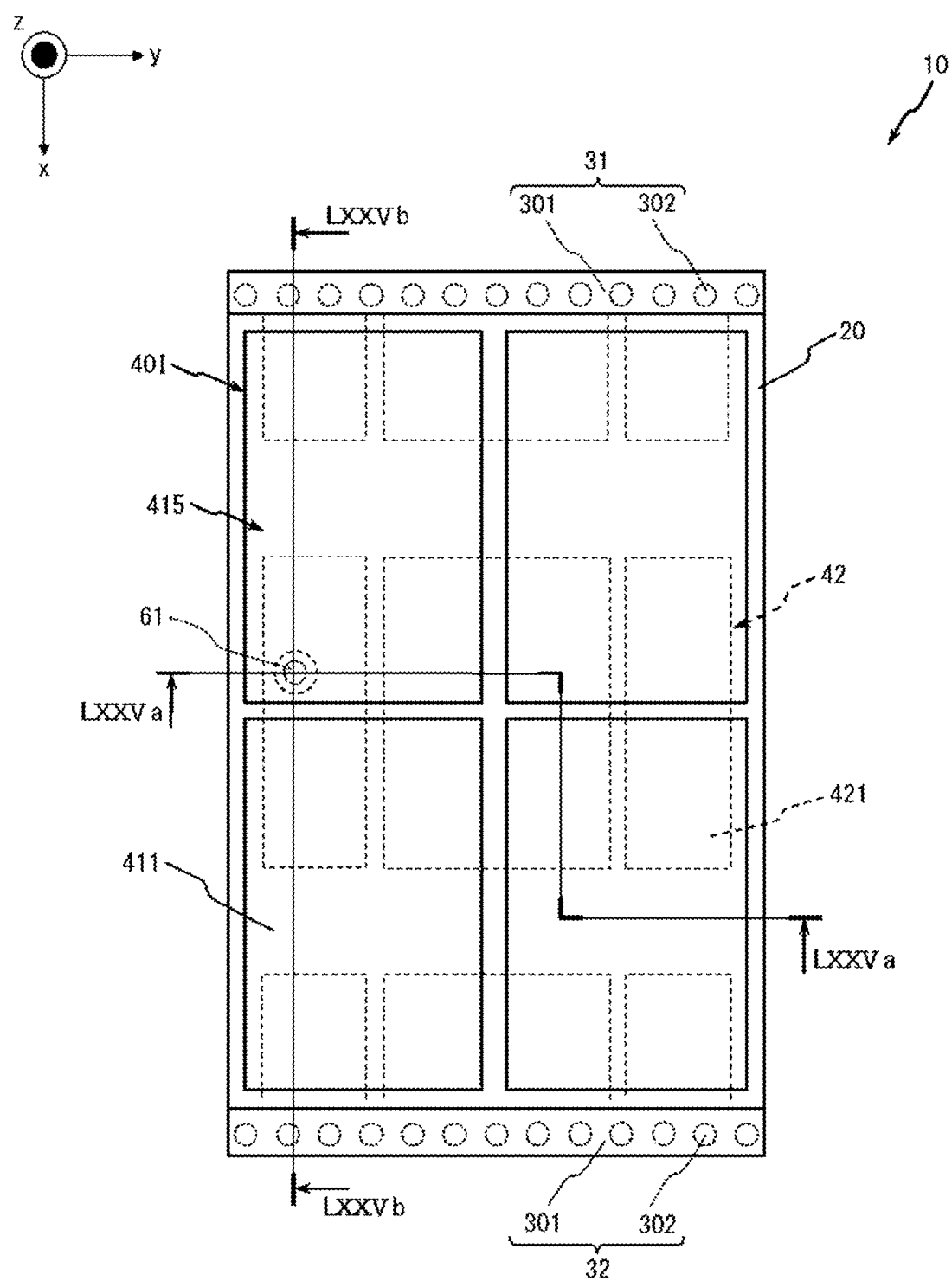
FIG. 74 is a plan view of one embodiment of the antenna.
Figure 75A:
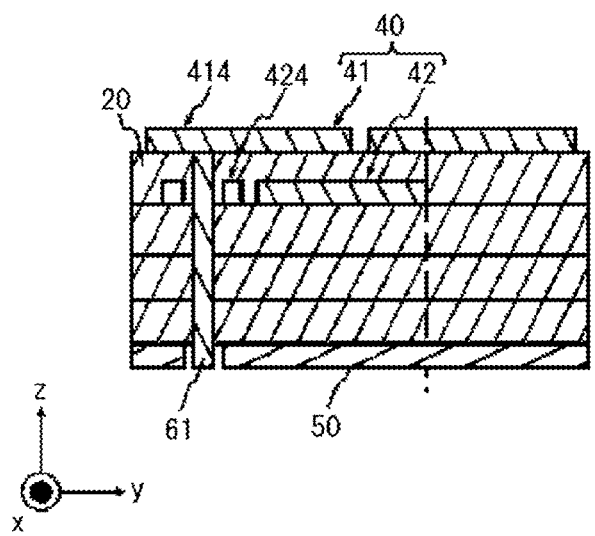
FIG. 75A is a cross-sectional view illustrating one embodiment of the antenna.
Figure 75B:
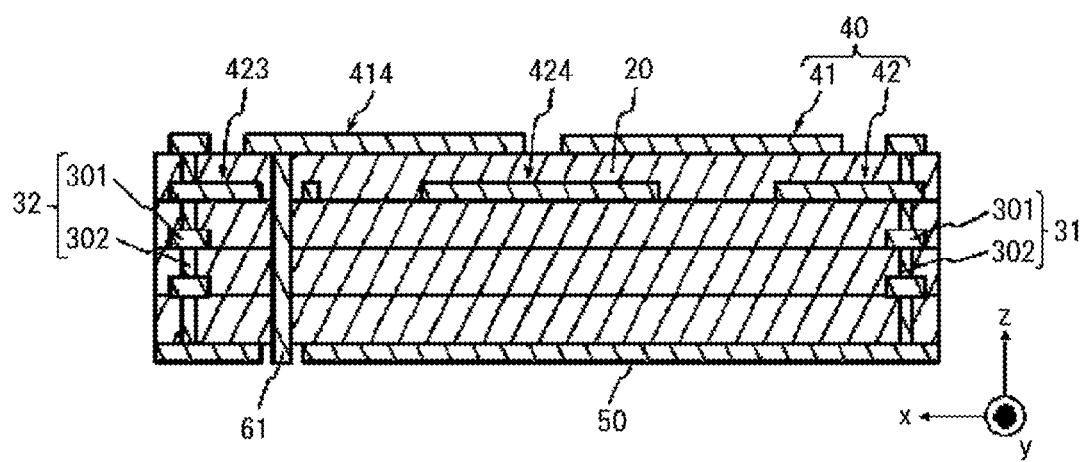
FIG. 75B is a cross-sectional view illustrating one embodiment of the antenna.
Figure 76:
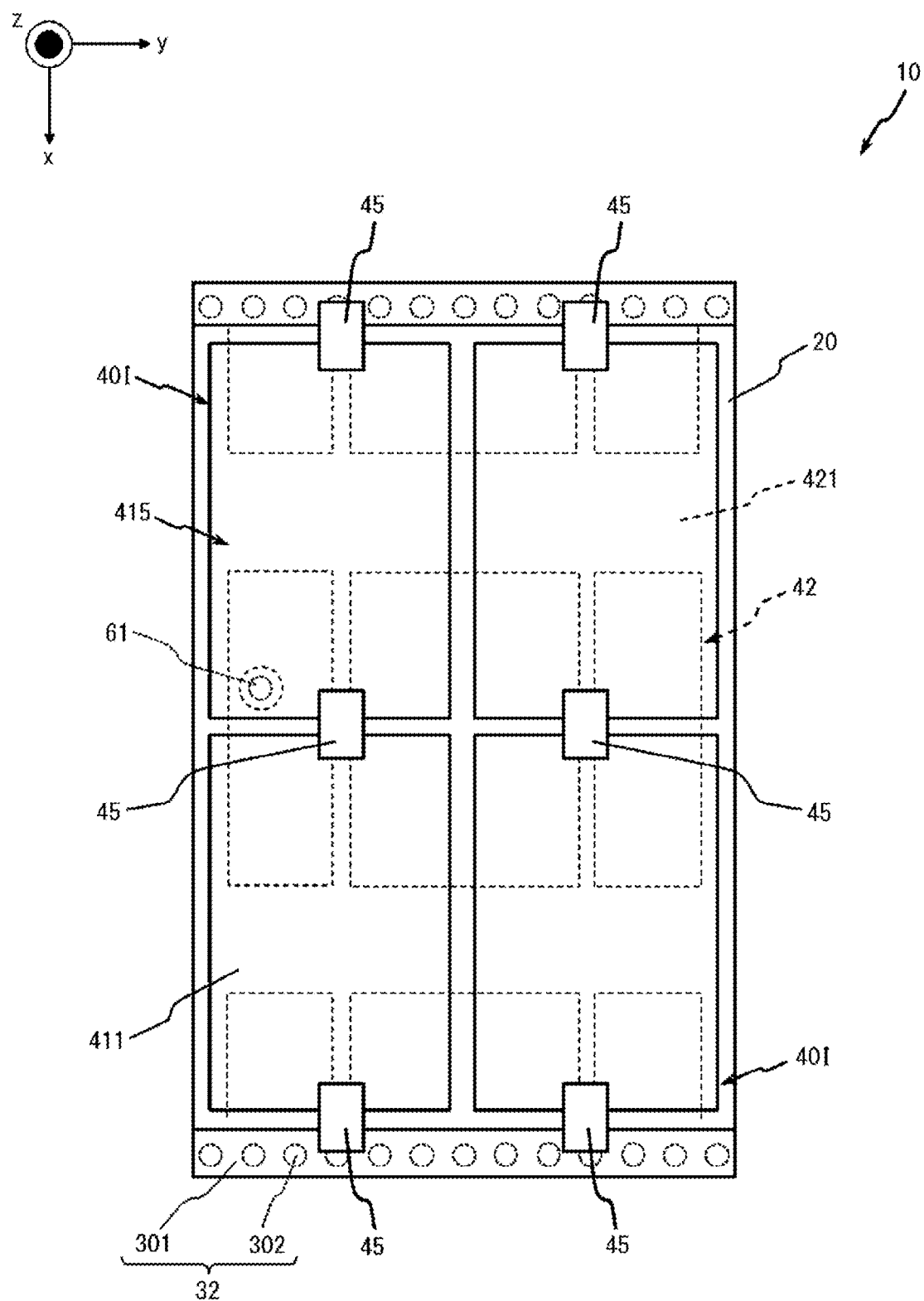
FIG. 76 is a plan view of one embodiment of the antenna.

FIG. 70 illustrates another example of the first antenna 60. FIG. 71 is a cross-sectional view taken along line LXXI-LXXI illustrated in FIG. 70. FIG. 72 illustrates another example of the first antenna 60. FIG. 73 is a cross-sectional view taken along line LXXIII-LXXIII illustrated in FIG. 72. FIG. 74 illustrates another example of the first antenna 60. FIG. 75A is a cross-sectional view taken along line LXXVa-LXXVa illustrated in FIG. 74. FIG. 75B is a cross-sectional view taken along line LXXVb-LXXVb illustrated in FIG. 74. FIG. 76 illustrates another example of the first antenna 60. The first antenna 60 illustrated in FIG. 76 has impedance elements 45.

The operating frequency of the first antenna 60 may be changed by the impedance elements 45. The first antenna 60 includes a first feeding conductor 415 connected to the first feeding line 61 and a first unit conductor 411 not connected to the first feeding line 61. An impedance matching changes when the impedance elements 45 are connected to the first feeding conductor 415 and another conductor. The impedance matching of the first antenna 60 may be adjusted by connecting the first feeding conductor 415 and another conductor by the impedance elements 45. In the first antenna 60, the impedance elements 45 may be inserted between the first feeding conductor 415 and another conductor in order to adjust the impedance matching. In the first antenna 60, the impedance elements 45 may be inserted between two first unit conductors 411 that are not connected to the first feeding line 61 in order to adjust the operating frequency. In the first antenna 60, the impedance elements 45 may be inserted between the first unit conductor 411 that is not connected to the first feeding line 61 and any one of the pair conductors 30 in order to adjust the operating frequency.

The second antenna 70 includes a base 20, pair conductors 30, a third conductor 40, a fourth conductor 50, a second feeding layer 71, and a second feeding line 72. In one example, the third conductor 40 is located within the base 20. In one example, the second antenna 70 has a third base 24 on the base 20. The third base 24 may have a different composition than the base 20. The third base 24 may be located on the third conductor 40. The third base 24 may be located on the second feeding layer 71.

The second feeding layer 71 is located above the third conductor 40 with a space. The base 20 or the third base 24 may be located between the second feeding layer 71 and the third conductor 40. The second feeding layer 71 includes line-type, patch-type, and slot-type resonators. The second feeding layer 71 may be called an antenna element. In one example, the second feeding layer 71 may be electromagnetically coupled to the third conductor 40. The resonance frequency of the second feeding layer 71 changes from a single resonance frequency due to electromagnetic coupling with the third conductor 40. In one example, the second feeding layer 71 receives power transmitted from the second feeding line 72 and resonates with the third conductor 40. In one example, the second feeding layer 71 receives power transmitted from the second feeding line 72 and resonates with the third conductor 40 and the third conductor.

The second feeding line 72 is electrically connected to the second feeding layer 71. In one embodiment, the second feeding line 72 transmits power to the second feeding layer 71. In one embodiment, the second feeding line 72 transmits the power from the second feeding layer 71 to the outside.

Figure 77:
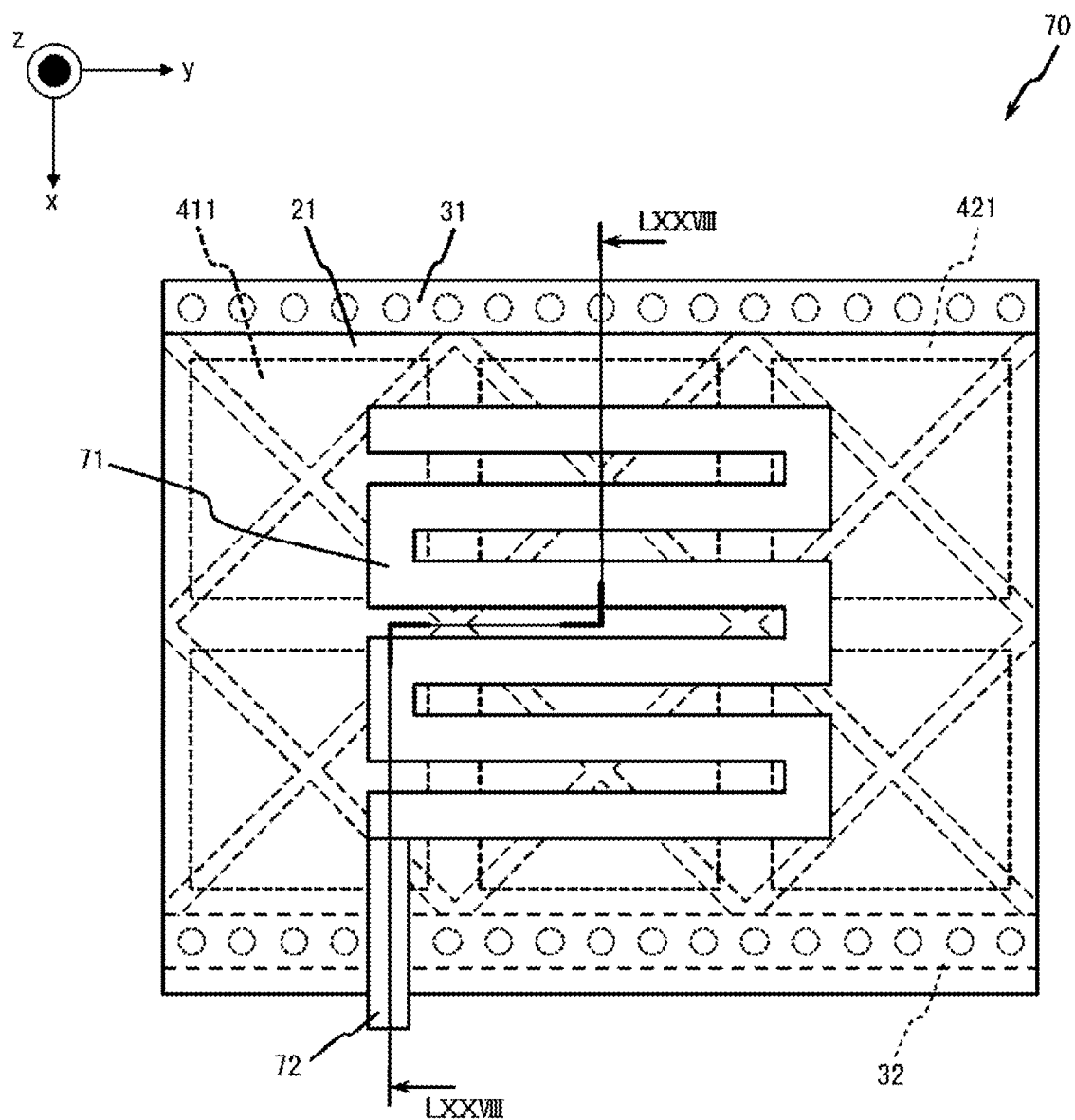
FIG. 77 is a plan view of one embodiment of the antenna.
Figure 78:
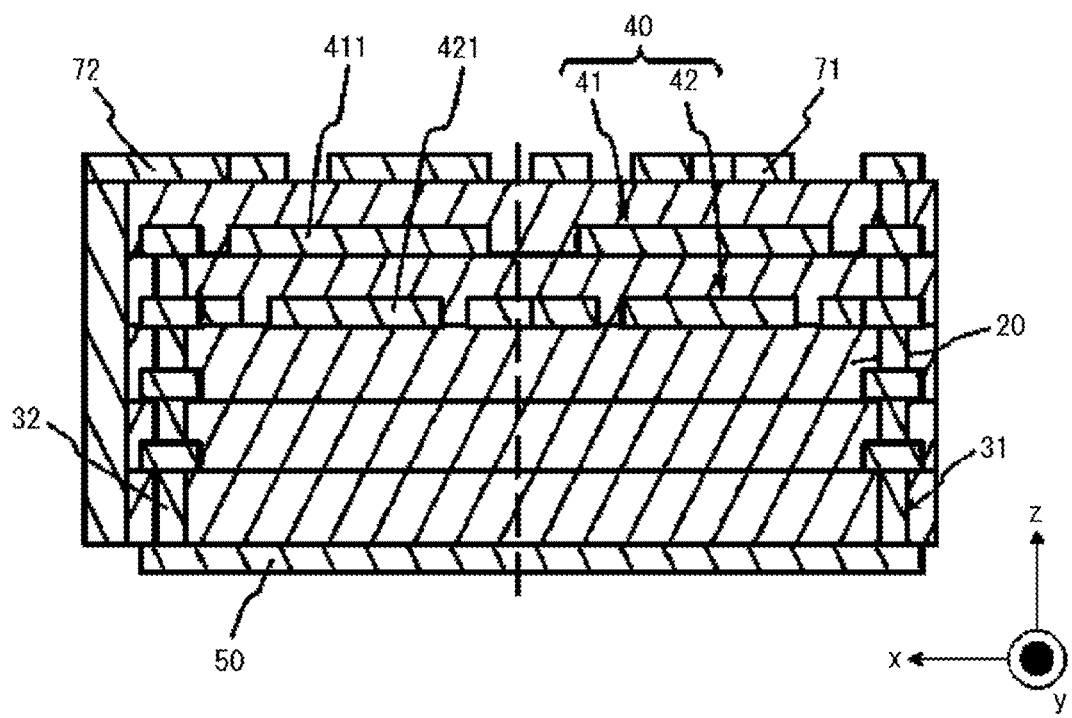
FIG. 78 is a cross-sectional view of the antenna illustrated in FIG. 43.

FIG. 77 is a plan view of the second antenna 70 when the xy plane is viewed in the z direction. FIG. 78 is a cross-sectional view taken along line LXXVIII-LXXVIII illustrated in FIG. 77. In the second antenna 70 illustrated in FIGS. 77 and 78, the third conductor 40 is located in the base 20. The second feeding layer 71 is located on the base 20. The second feeding layer 71 is located so as to overlap the unit structure 10X as viewed in the z direction. The second feeding line 72 is located on the base 20. The second feeding line 72 is electromagnetically connected to the second feeding layer 71 on the xy plane.

(Wireless Communication Module)

Figure 79:
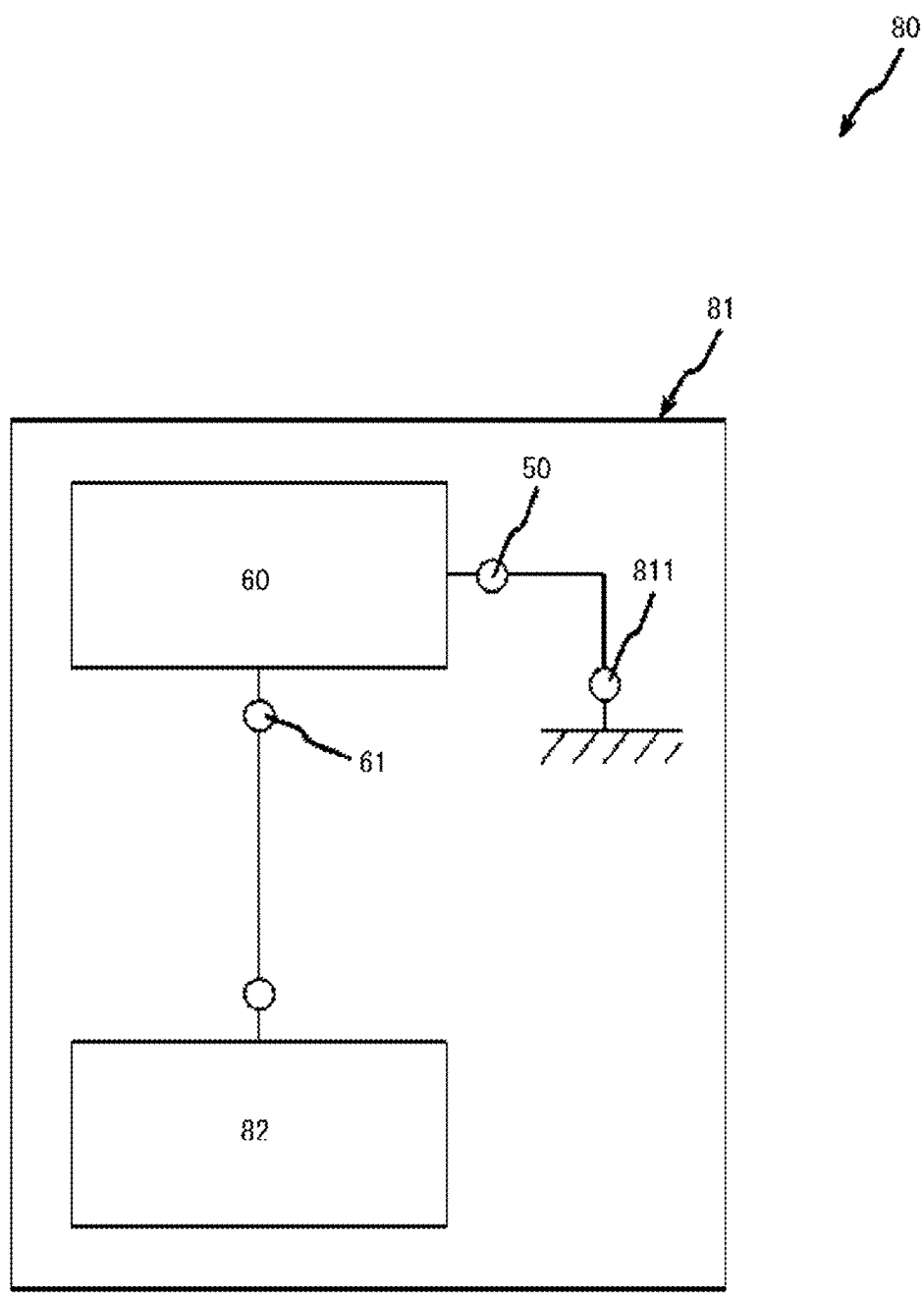
FIG. 79 is a block diagram illustrating one embodiment of a wireless communication module.
Figure 80:
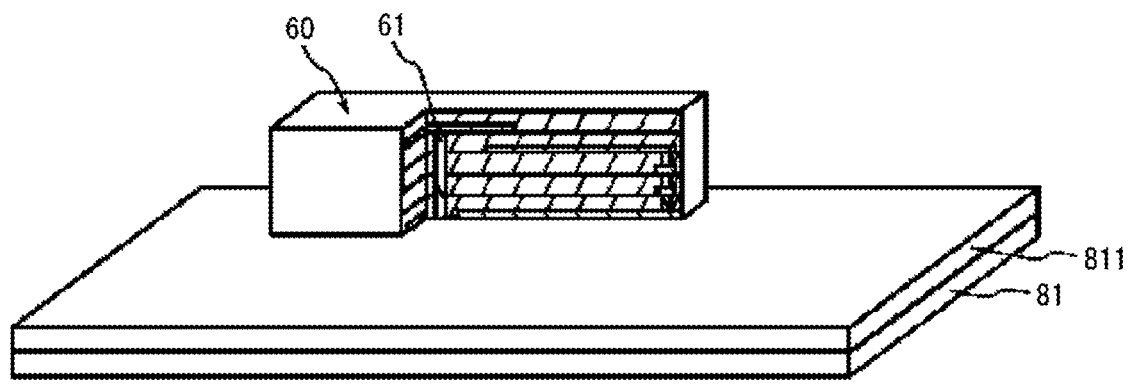
FIG. 80 is a partial cross-sectional perspective view illustrating one embodiment of the wireless communication module.

A wireless communication module of the present disclosure includes a wireless communication module 80 as an example of a plurality of embodiments. FIG. 79 is a block structural diagram of the wireless communication module 80. FIG. 80 is a schematic configuration view of the wireless communication module 80. The wireless communication module 80 includes a first antenna 60, a circuit board 81, and an RF module 82. The wireless communication module 80 may include a second antenna 70 instead of the first antenna 60.

The first antenna 60 is located on the circuit board 81. The first feeding line 61 of the first antenna 60 is electromagnetically connected to the RF module 82 via the circuit board 81. The fourth conductor 50 of the first antenna 60 is electromagnetically connected to a ground conductor 811 of the circuit board 81.

The ground conductor 811 may extend in the xy plane. The ground conductor 811 has a larger surface integral than the fourth conductor 50 in the xy plane. The ground conductor 811 is longer than the fourth conductor 50 in the y direction. The ground conductor 811 is longer than the fourth conductor 50 in the x direction. The first antenna 60 may be located closer to an end side than the center of the ground conductor 811 in the y direction. The center of the first antenna 60 may be different from the center of the ground conductor 811 in the xy plane. The center of the first antenna 60 may be different from the centers of the first conductive layer 41 and the second conductive layer 42. A point where the first feeding line 61 is connected to the third conductor 40 may be different from the center of the ground conductor 811 in the xy plane.

In the first antenna 60, a first current and a second current loop via the pair conductors 30. The first antenna 60 is located on the end side in the y direction with respect to the center of the ground conductor 811 so that the second current flowing through the ground conductor 811 is asymmetric. When the second current flowing through the ground conductor 811 is asymmetric, the antenna structure including the first antenna 60 and the ground conductor 811 has a large polarization component of radiation waves in the x direction. By increasing the polarization component of radiation waves in the x direction, the total radiation efficiency of the radiation waves can be improved.

The RF module 82 may control the power supplied to the first antenna 60. The RF module 82 modulates a baseband signal and supplies the modulated baseband signal to the first antenna 60. The RF module 82 may modulate an electric signal received by the first antenna 60 into a baseband signal.

The first antenna 60 has a small change in the resonance frequency due to the conductor on the circuit board 81 side. The wireless communication module 80 includes the first antenna 60, thereby reducing an influence from the external environment.

The first antenna 60 may be configured integrally with the circuit board 81. When the first antenna 60 and the circuit board 81 are integrally configured, the fourth conductor 50 and the ground conductor 811 are integrally configured.

(Wireless Communication Device)

Figure 81:
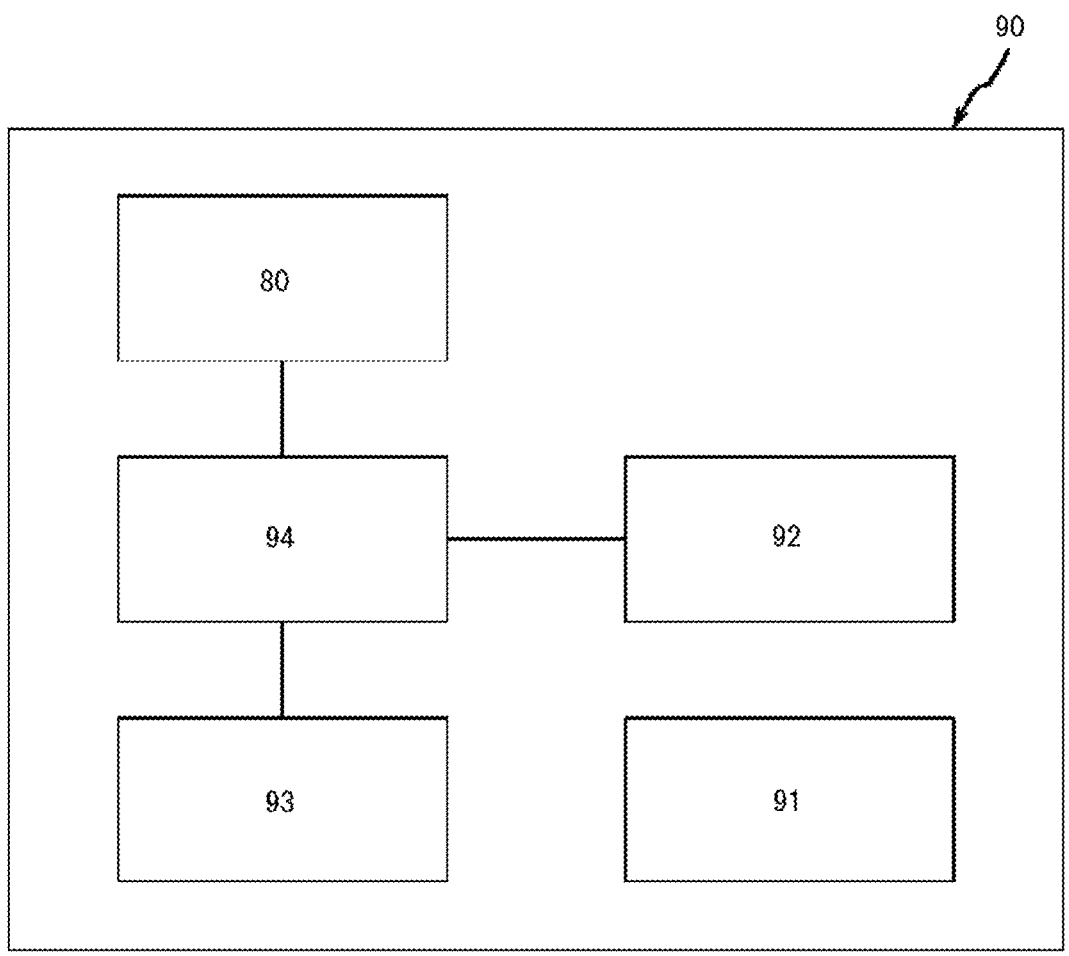
FIG. 81 is a block diagram illustrating one embodiment of a wireless communication device.
Figure 82:
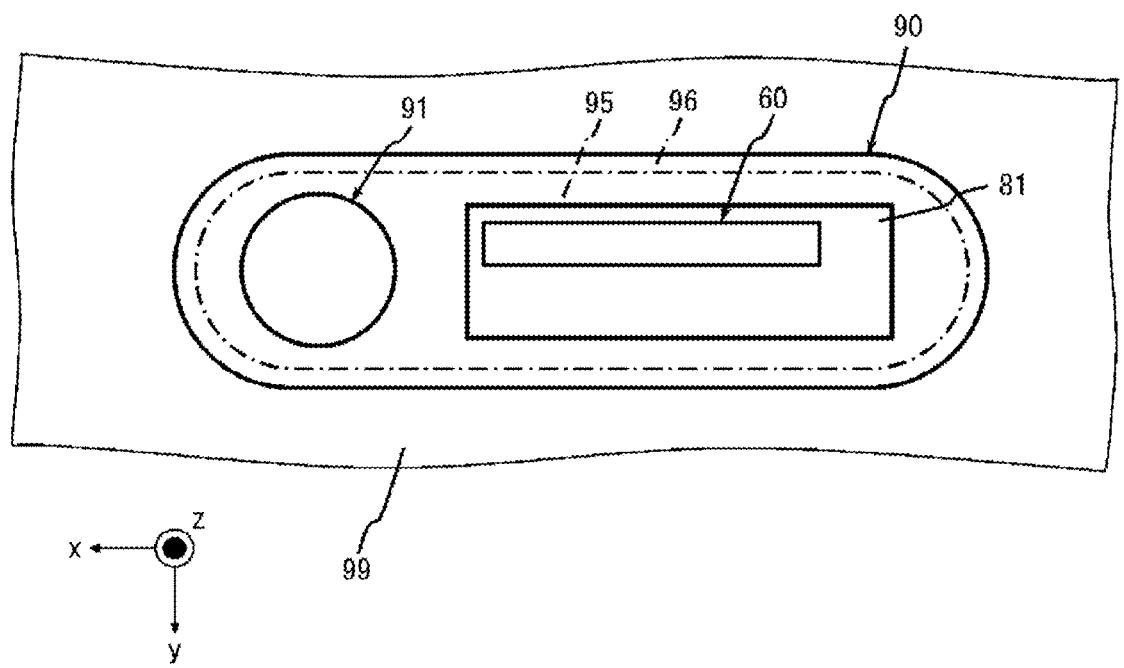
FIG. 82 is a plan view illustrating one embodiment of the wireless communication device.
Figure 83:
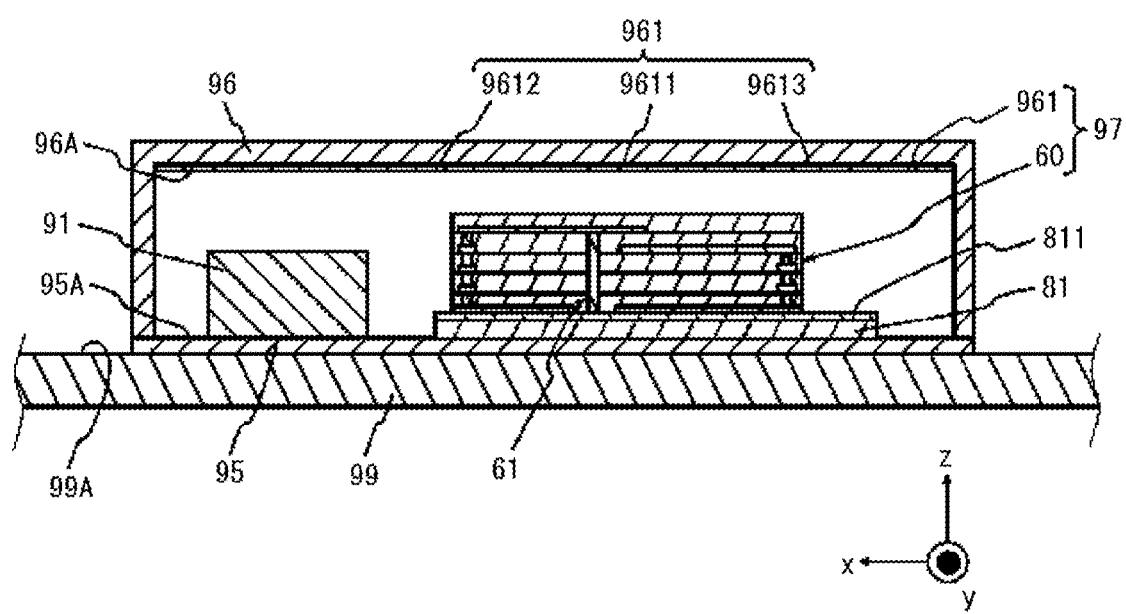
FIG. 83 is a cross-sectional view illustrating one embodiment of the wireless communication device.
Figure 84:
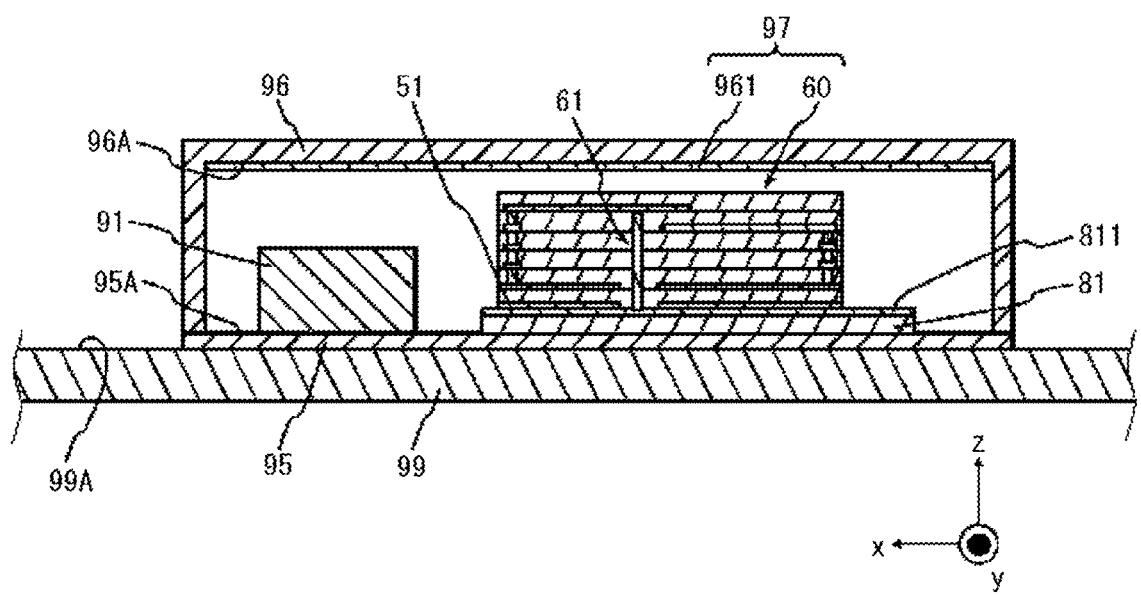
FIG. 84 is a plan view illustrating one embodiment of the wireless communication device.

A wireless communication device of the present disclosure includes a wireless communication device 90 as an example of a plurality of embodiments. FIG. 81 is a block structural diagram of the wireless communication device 90. FIG. 82 is a plan view of the wireless communication device 90. A part of the configuration of the wireless communication device 90 illustrated in FIG. 82 is omitted. FIG. 83 is a cross-sectional view of the wireless communication device 90. A part of the configuration of the wireless communication device 90 illustrated in FIG. 83 is omitted. The wireless communication device 90 includes a wireless communication module 80, a battery 91, a sensor 92, a memory 93, a controller 94, a first case 95, and a second case 96. The wireless communication module 80 of the wireless communication device 90 has the first antenna 60, but may have the second antenna 70. FIG. 84 illustrates one of other embodiments of the wireless communication device 90. The first antenna 60 included in the wireless communication device 90 may include a reference potential layer 51.

The battery 91 supplies power to the wireless communication module 80. The battery 91 may supply the power to at least one of the sensor 92, the memory 93, and the controller 94. The battery 91 may include at least one of a primary battery and a secondary battery. A negative electrode of the battery 91 is electrically connected to a ground terminal of the circuit board 81. The negative pole of the battery 91 is electrically connected to the fourth conductor 50 of the first antenna 60.

Examples of the sensor 92 may include a speed sensor, a vibration sensor, an acceleration sensor, a gyro sensor, a rotation angle sensor, an angular velocity sensor, a geomagnetic sensor, a magnet sensor, a temperature sensor, a humidity sensor, an atmospheric pressure sensor, an optical sensor, an illuminance sensor, a UV sensor, a gas sensor, a gas concentration sensor, an atmosphere sensor, a level sensor, an odor sensor, a pressure sensor, an air pressure sensor, a contact sensor, a wind power sensor, an infrared sensor, a human sensor, a displacement sensor, an image sensor, a weight sensor, a smoke sensor, a liquid leakage sensor, a vital sensor, a battery remaining amount sensor, an ultrasonic sensor, or a global positioning system (GPS) signal receiving device, or the like.

Examples of the memory 93 may include a semiconductor memory. The memory 93 may function as a work memory of the controller 94. The memory 93 may be included in the controller 94. The memory 93 stores a program that describes processing contents for implementing each function of the wireless communication device 90, information used for processing in the wireless communication device 90, and the like.

The information stored in the memory 93 may include, for example, information used by the wireless communication device 90 installed on a wheel 101 of a vehicle 100 illustrated in FIG. 89 to perform wireless communication with another wireless communication device 200, or the like. As the information used for performing wireless communication, the memory 93 may store, for example, identification information for uniquely identifying another wireless communication device 200, or information such as a communication protocol for implementing communication with another wireless communication device 200. The memory 93 may store an interval or a condition in which the measurement of data by the sensor 92 or the transmission of data by the wireless communication module 80 is executed.

The controller 94 may include, for example, a processor. The controller 94 may include one or more processors. The processor may include a general-purpose processor that loads a specific program and executes a specific function, and a dedicated processor that is specialized for specific processing. The dedicated processor may include an application specific IC. The application specific IC is also called an application specific integrated circuit (ASIC). The processor may include a programmable logic device. The programmable logic device is also called a programmable logic device (PLD). The PLD may include a field-programmable gate array (FPGA). The controller 94 may be either a system-on-a-chip (SoC) or a system in a package (SiP), in which one or more processors cooperate. The controller 94 may store, in the memory 93, various kinds of information, a program for operating each component of the wireless communication device 90, or the like.

The controller 94 stores the measurement data measured by the sensor 92 described above in the memory. The controller 94 may measure with the sensor 92 at a predetermined interval or condition. The predetermined interval may be a time interval, for example. The controller 94 may perform measurement by the sensor 92 at regular time intervals such as every one second, one minute, or one hour, and store the measured measurement data in the memory 93. The predetermined condition may be a condition such as an air pressure or temperature of the tire. The controller 94 determines whether or not information such as the air pressure or the temperature detected by the sensor 92 satisfies the predetermined condition. The controller 94 may store the measurement data measured by the sensor 92 in the memory 93 when the information detected by the sensor 92 satisfies the predetermined condition. As a result, power consumption and memory consumption of the wireless communication device 90 installed on the wheel 101 of the vehicle 100 can be reduced.

The controller 94 generates a transmission signal to be transmitted from the wireless communication device 90. The controller 94 may acquire measurement data from the sensor 92, for example. The controller 94 may generate a transmission signal according to the measurement data. The controller 94 may transmit a baseband signal to the RF module 82 of the wireless communication module 80.

The controller 94 transmits the signal from the wireless communication device 90. The controller 94 may transmit the signal from the wireless communication device 90 at a predetermined interval or condition. The predetermined interval may be a time interval. The controller 94 may implement the transmission and reception of information having high real-time performance by shortening the time interval of the signal transmitted from the wireless communication device 90, for example. The predetermined condition may be that a predetermined electromagnetic wave is received by the antenna. For example, when the wireless communication cannot be temporarily performed while the vehicle 100 is moving, the controller 94 may store the signal in the memory 93 without transmitting the signal from the wireless communication device 90. After that, when a predetermined electromagnetic wave is received by the antenna, the controller 94 may transmit the non-transmitted signal stored in the memory 93. As a result, an occurrence of data loss can be reduced in the data transmitted from the wireless communication device 90 installed in the vehicle 100.

The first case 95 and the second case 96 protect another device of the wireless communication device 90. The first case 95 may extend in the xy plane. The first case 95 supports another device. The first case 95 may support the wireless communication module 80. The wireless communication module 80 is located on an upper surface 95A of the first case 95. The first case 95 may support the battery 91. The battery 91 is located on the upper surface 95A of the first case 95. In an example of a plurality of embodiments, the wireless communication module 80 and the battery 91 are arranged on the upper surface 95A of the first case 95 along the x direction. The first conductor 31 is located between the battery 91 and the third conductor 40. The battery 91 is located on the other side of the pair conductors 30 when viewed from the third conductor 40.

The second case 96 may cover another device. The second case 96 includes an under surface 96A located on a z direction side of the first antenna 60. The under surface 96A extends along the xy plane. The under surface 96A is not limited to being flat and may include irregularities. The second case 96 may have an eighth conductor 961. The eighth conductor 961 is located on at least one of the interior, the outside, and the inside of the second case 96. The eighth conductor 961 is located on at least one of an upper surface and a side surface of the second case 96.

The eighth conductor 961 faces the first antenna 60. A first body 9611 of the eighth conductor 961 faces the first antenna 60 in the z direction. The eighth conductor 961 may include, in addition to the first body 9611, at least one of a second body facing the first antenna 60 in the x direction and a third body facing the first antenna in the y direction. A part of the eighth conductor 961 faces the battery 91.

The eighth conductor 961 may include a first extra-body 9612 that extends outside the first conductor 31 in the x direction. The eighth conductor 961 may include a second extra-body 9613 that extends outside the second conductor 32 in the x direction. The first extra-body 9612 may be electrically connected to the first body 9611. The second extra-body 9613 may be electrically connected to the first body 9611. The first extra-body 9612 of the eighth conductor 961 faces the battery 91 in the z direction. The eighth conductor 961 may be capacitively coupled to the battery 91. Capacitance may exist between the eighth conductor 961 and the battery 91.

The eighth conductor 961 is separated from the third conductor 40 of the first antenna 60. The eighth conductor 961 is not electrically connected to each conductor of the first antenna 60. The eighth conductor 961 may be separated from the first antenna 60. The eighth conductor 961 may be electromagnetically coupled to any conductor of the first antenna 60. The first body 9611 of the eighth conductor 961 may be electromagnetically coupled to the first antenna 60. The first body 9611 may overlap the third conductor 40 when viewed in plan in the z direction. Since the first body 9611 overlaps the third conductor 40, propagation due to electromagnetic coupling can be increased. The eighth conductor 961 may have mutual inductance when electromagnetically coupled to the third conductor 40.

The eighth conductor 961 extends along the x direction. The eighth conductor 961 extends along the xy plane. A length of the eighth conductor 961 is longer than the length of the first antenna 60 along the x direction. A length of the eighth conductor 961 along the x direction is longer than the length of the first antenna 60 along the x direction. The length of the eighth conductor 961 may be longer than ½ of the operating wavelength λ of the wireless communication device 90. The eighth conductor 961 may include a portion extending along the y direction. The eighth conductor 961 may bend in the xy plane. The eighth conductor 961 may include a portion extending along the z direction. The eighth conductor 961 may bend from the xy plane to the yz plane or the zx plane.

Figure 85:
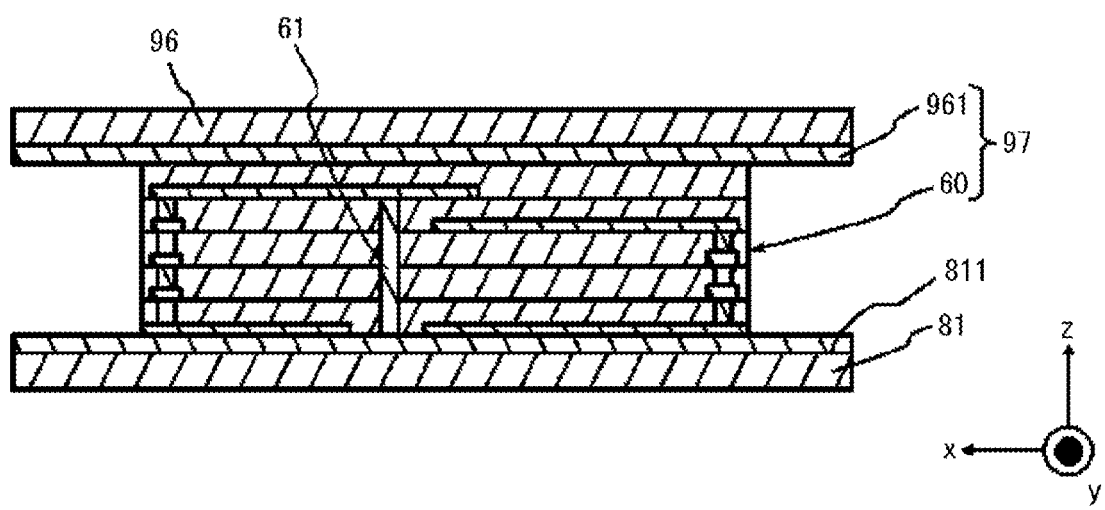
FIG. 85 is a cross-sectional view illustrating one embodiment of the wireless communication device.

In the wireless communication device 90 including the eighth conductor 961, the first antenna 60 and the eighth conductor 961 may be electromagnetically coupled thereby functioning as a third antenna 97. An operating frequency $f_c$ of the third antenna 97 may be different from the resonance frequency of the first antenna 60 alone. The operating frequency $f_c$ of the third antenna 97 may be closer to the resonance frequency of the first antenna 60 than the resonance frequency of the eighth conductor 961 alone. The operating frequency $f_c$ of the third antenna 97 may be within the resonance frequency band of the first antenna 60. The operating frequency $f_c$ of the third antenna 97 may be outside the resonance frequency band of the eighth conductor 961 alone. FIG. 85 illustrates another embodiment of the third antenna 97. The eighth conductor 961 may be configured integrally with the first antenna 60. In FIG. 85, a part of the configuration of the wireless communication device 90 is omitted. In the example of FIG. 85, the second case 96 may not include the eighth conductor 961.

In the wireless communication device 90, the eighth conductor 961 is capacitively coupled to the third conductor 40. The eighth conductor 961 is electromagnetically coupled to the fourth conductor 50. The third antenna 97 includes a first extra-body 9612 and a second extra-body 9613 of the eighth conductor in the air, so that a gain is improved as compared with the first antenna 60.

Figure 86:
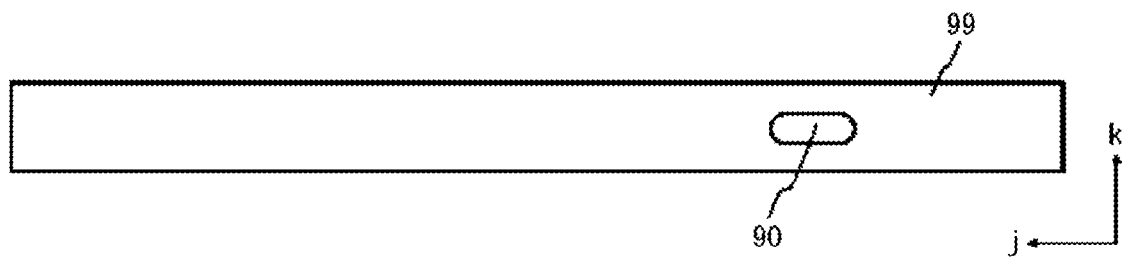
FIG. 86 is a cross-sectional view illustrating one embodiment of an antenna.

The wireless communication device 90 may be located on various objects. The wireless communication device 90 may be located on an electrical conductive body 99. FIG. 86 is a plan view illustrating one embodiment of the wireless communication device 90. The electrical conductive body 99 is a conductor that conducts electricity. Examples of the material of the electrical conductive body 99 include metal, a highly doped semiconductor, conductive plastic, and liquid containing ions. The electrical conductive body 99 may include a non-conductive layer that does not conduct electricity on the surface. The part that conducts electricity and the non-conductive layer may include a common element. For example, the electrical conductive body 99 including aluminum may include a non-conductive layer of aluminum oxide on the surface. The part that conducts electricity and the non-conductive layer may include different elements.

The shape of the electrical conductive body 99 is not limited to a flat plate and may include a three-dimensional shape such as a box shape. Examples of the three-dimensional shape of the electrical conductive body 99 include a rectangular parallelepiped and a cylinder. Examples of the three-dimensional shape may include a partially depressed shape, a partially penetrated shape, and a partially protruding shape. For example, the electrical conductive body 99 may be of an annular (torus) type.

The electrical conductive body 99 includes an upper surface 99A on which the wireless communication device 90 may be mounted. The upper surface 99A may extend over the entire surface of the electrical conductive body 99. The upper surface 99A may be a part of the electrical conductive body 99. The upper surface 99A may have a larger surface integral than the wireless communication device 90. The wireless communication device 90 may be placed on the upper surface 99A of the electrical conductive body 99. The upper surface 99A may have a narrower surface integral than the wireless communication device 90. The wireless communication device 90 may be partially placed on the upper surface 99A of the electrical conductive body 99. The wireless communication device 90 may be placed on the upper surface 99A of the electrical conductive body 99 in various orientations. The orientation of the wireless communication device 90 may be arbitrary. The wireless communication device 90 may be appropriately fixed on the upper surface 99A of the electrical conductive body 99 by a fixing tool. Examples of the fixing tool include those that fix on the surface such as a double-sided tape and an adhesive. The examples of the fixing tool include those that fix at points, such as screws and nails.

The upper surface 99A of the electrical conductive body 99 may include a portion extending along a j direction. The portion extending along the j direction has a longer length along the j direction than a length along a k direction. The j direction and the k direction are orthogonal to each other. The j direction is a direction in which the electrical conductive body 99 extends to be long. The k direction is a direction in which the electrical conductive body 99 has a shorter length than the j direction. The wireless communication device 90 may be placed on the upper surface 99A so that the x direction is along the j direction. The wireless communication device 90 may be placed on the upper surface 99A of the electrical conductive body 99 so as to be aligned with the x direction in which the first conductor 31 and the second conductor 32 are arranged. When the wireless communication device 90 is located on the electrical conductive body 99, the first antenna 60 may be electromagnetically coupled to the electrical conductive body 99. The second current flows through the fourth conductor 50 of the first antenna 60 along the x direction. A current is induced in the electrical conductive body 99 electromagnetically coupled to the first antenna 60, by the second current. When the x direction of the first antenna 60 and the j direction of the electrical conductive body 99 are aligned, the current flowing through the electrical conductive body 99 along the j direction becomes large. When the x direction of the first antenna 60 and the j direction of the electrical conductive body 99 are aligned, radiation due to the induced current increases in the electrical conductive body 99. An angle in the x direction with respect to the j direction may be 45 degrees or less.

The ground conductor 811 of the wireless communication device 90 is separated from the electrical conductive body 99. The ground conductor 811 is separated from the electrical conductive body 99. The wireless communication device 90 may be placed on the upper surface 99A so that a direction along a long side of the upper surface 99A is aligned with the x direction in which the first conductor 31 and the second conductor 32 are arranged. Examples of the shape of the upper surface 99A may include a rhombus and a circle, in addition to a rectangular surface. The electrical conductive body 99 may include a diamond-shaped surface. The diamond-shaped surface may be the upper surface 99A on which the wireless communication device 90 is mounted. The wireless communication device 90 may be placed on the upper surface 99A such that a direction along a long diagonal line of the upper surface 99A is aligned with the x direction in which the first conductor 31 and the second conductor 32 are arranged. The upper surface 99A is not limited to be flat. The upper surface 99A may include irregularities. The upper surface 99A may include a curved surface. The curved surface includes a ruled surface (ruled surface). The curved surface includes a cylindrical surface.

The electrical conductive body 99 extends in the xy plane. The electrical conductive body 99 may have a length along the x direction longer than a length along the y direction. The electrical conductive body 99 may have a length along the y direction shorter than half of the wavelength $\lambda_c$ at the operating frequency $f_c$ of the third antenna 97. The wireless communication device 90 may be located on an electrical conductive body 99. The electrical conductive body 99 is located apart from the fourth conductor 50 in the z direction. The electrical conductive body 99 has a longer length along the x direction than the fourth conductor 50. The electrical conductive body 99 has a larger surface integral in the xy plane than the fourth conductor 50. The electrical conductive body 99 is located apart from the ground conductor 811 in the z direction. The length of the electrical conductive body 99 along the x direction is longer than that of the ground conductor 811. The electrical conductive body 99 has a larger surface integral in the xy plane than the ground conductor 811.

The wireless communication device 90 may be placed on the electrical conductive body 99 in a direction in which the x direction in which the first conductor 31 and the second conductor 32 are arranged is aligned in the direction in which the electrical conductive body 99 extends long. In other words, the wireless communication device 90 may be placed on the electrical conductive body 99 in an orientation in which the direction in which the current of the first antenna 60 flows and the direction in which the electrical conductive body 99 extends long are aligned in the xy plane.

The first antenna 60 has a small change in the resonance frequency due to the conductor on the circuit board 81 side. The wireless communication device 90 includes the first antenna 60 and thereby can reduce an influence from the external environment.

In the wireless communication device 90, the ground conductor 811 is capacitively coupled to the electrical conductive body 99. Since the wireless communication device 90 includes a portion of the electrical conductive body 99 that extends outside the third antenna 97, the gain is improved as compared with the first antenna 60.

Figure 87:
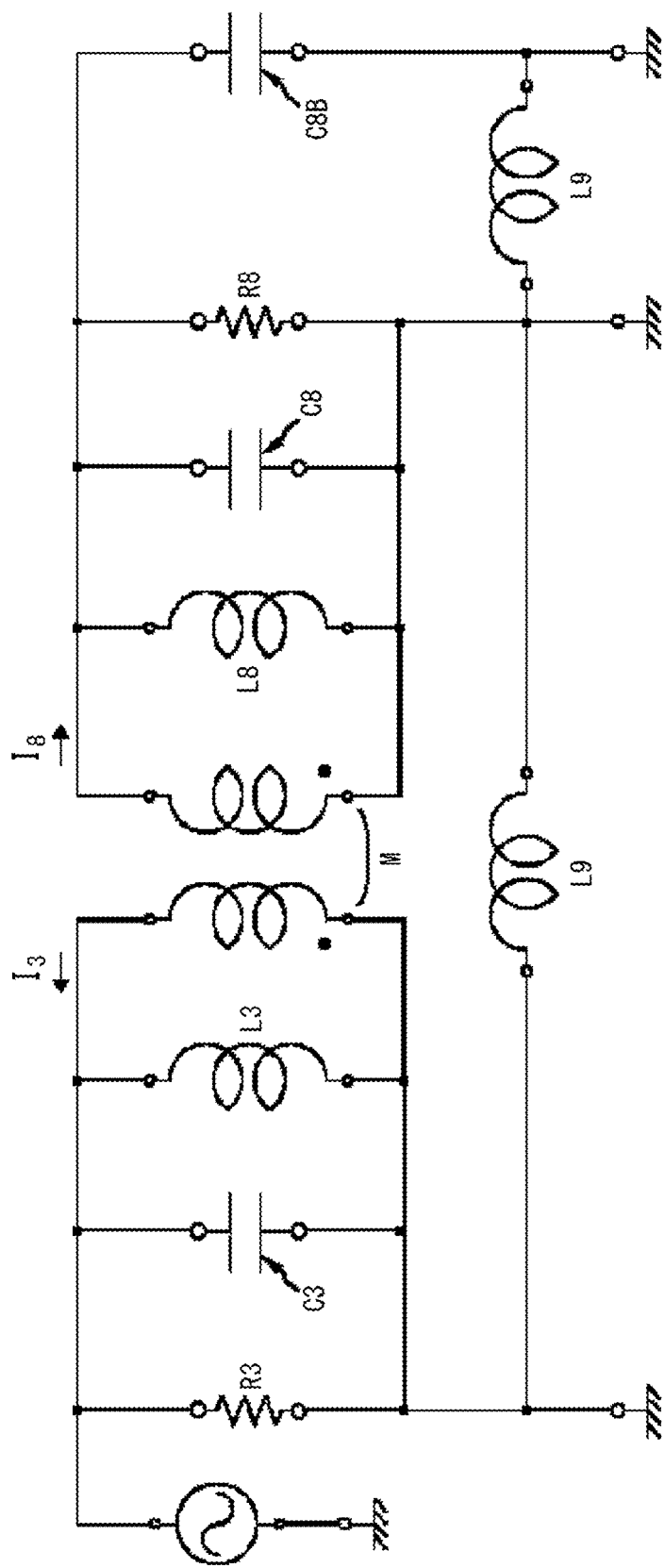
FIG. 87 is a diagram illustrating a schematic circuit of the wireless communication device.
Figure 88:
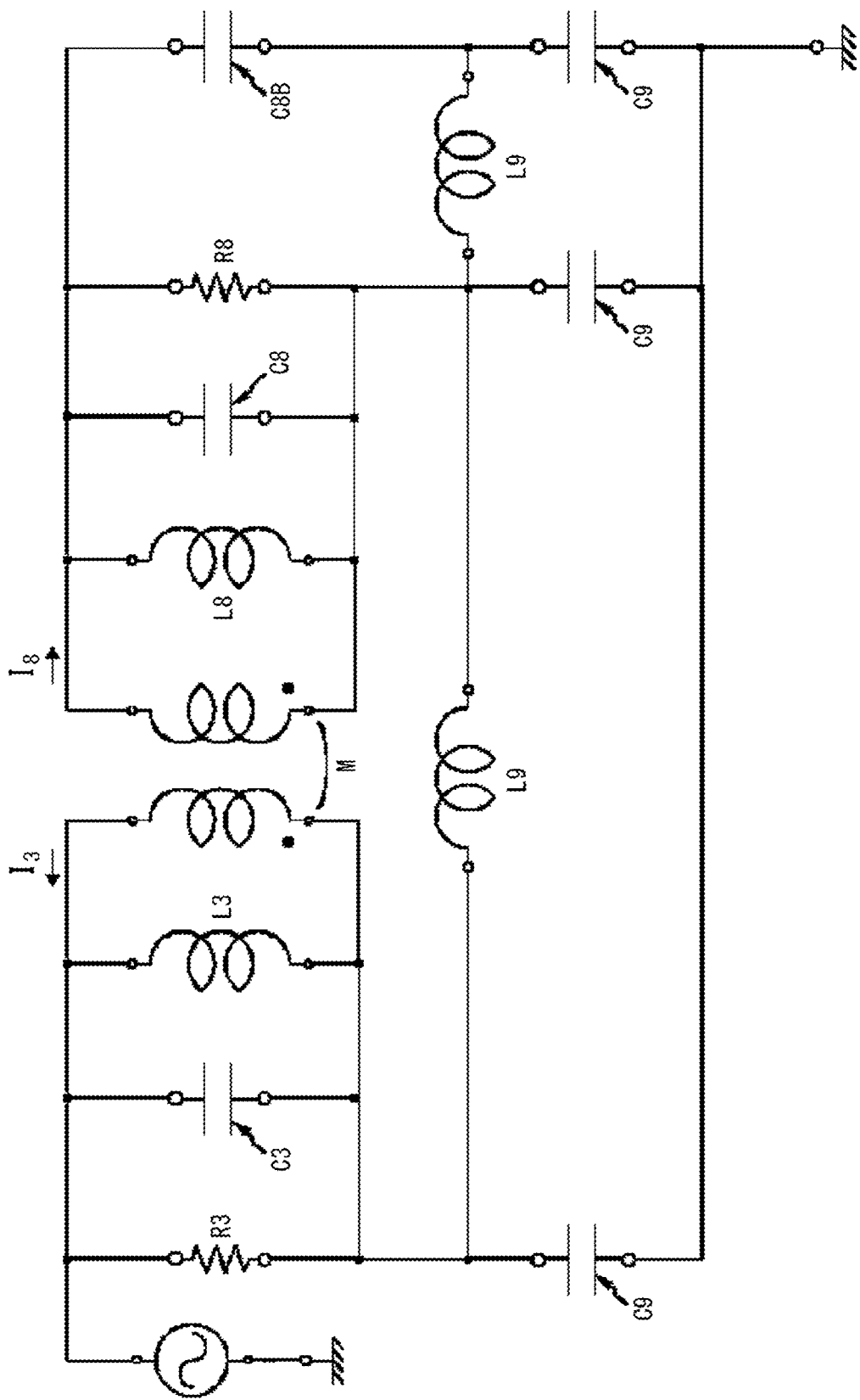
FIG. 88 is a diagram illustrating a schematic circuit of the wireless communication device.

In the wireless communication device 90, a resonance circuit in the air and a resonance circuit on the electrical conductive body 99 may be different. FIG. 87 is a schematic circuit of a resonance structure formed in the air. FIG. 88 is a schematic circuit of a resonance structure formed on the electrical conductive body 99. L3 is inductance of the resonator 10, L8 is inductance of the eighth conductor 961, L9 is inductance of the electrical conductive body 99, and M is mutual inductance of L3 and L8. C3 is capacitance of the third conductor 40, C4 is capacitance of the fourth conductor 50, C8 is capacitance of the eighth conductor 961, C8B is capacitance of the eighth conductor 961 and the battery 91, and C9 is capacitance of the electrical conductive body 99 and the ground conductor 811. R3 is radiation resistance of the resonator 10, and R8 is radiation resistance of the eighth conductor 961. The operating frequency of the resonator 10 is lower than the resonance frequency of the eighth conductor. In the wireless communication device 90, the ground conductor 811 functions as chassis ground in the air. In the wireless communication device 90, the fourth conductor 50 is capacitively coupled to the electrical conductive body 99. In the wireless communication device 90 on the electrical conductive body 99, the electrical conductive body 99 functions as substantial chassis ground.

In a plurality of embodiments, the wireless communication device 90 has an eighth conductor 961. The eighth conductor 961 is electromagnetically coupled to the first antenna 60 and capacitively coupled to the fourth conductor 50. The wireless communication device 90 can increase the operating frequency when placed on the electrical conductive body 99 from the air by increasing the capacitance C8B due to the capacitive coupling. By increasing the mutual inductance M due to the electromagnetic coupling, the wireless communication device 90 can reduce the operating frequency when placed from the air onto the electrical conductive body 99. By changing the balance between the capacitance C8B and the mutual inductance M, the wireless communication device 90 can adjust the change in the operating frequency when placed from the air onto the electrical conductive body 99. By changing the balance between the capacitance C8B and the mutual inductance M, the wireless communication device 90 can reduce the change in the operating frequency when placed from the air onto the electrical conductive body 99.

The wireless communication device 90 includes the eighth conductor 961 that is electromagnetically coupled to the third conductor 40 and capacitively coupled to the fourth conductor 50. Having the eighth conductor 961, the wireless communication device 90 can adjust the change in the operating frequency when placed on the electrical conductive body 99 from the air. Having the eighth conductor 961, the wireless communication device 90 can reduce the change in the operating frequency when placed on the electrical conductive body 99 from the air.

Similarly, in the wireless communication device 90 that does not include the eighth conductor 961, the ground conductor 811 functions as chassis ground in the air. Similarly, in the wireless communication device 90 that does not include the eighth conductor 961, the electrical conductive body 99 functions as substantial chassis ground on the electrical conductive body 99. The resonance structure including the resonator 10 can oscillate even if the chassis ground changes. This corresponds to the fact that the resonator 10 including the reference potential layer 51 and the resonator 10 not including the reference potential layer 51 can oscillate.

(Wheel with Wireless Communication Device Installed)

Figure 90:
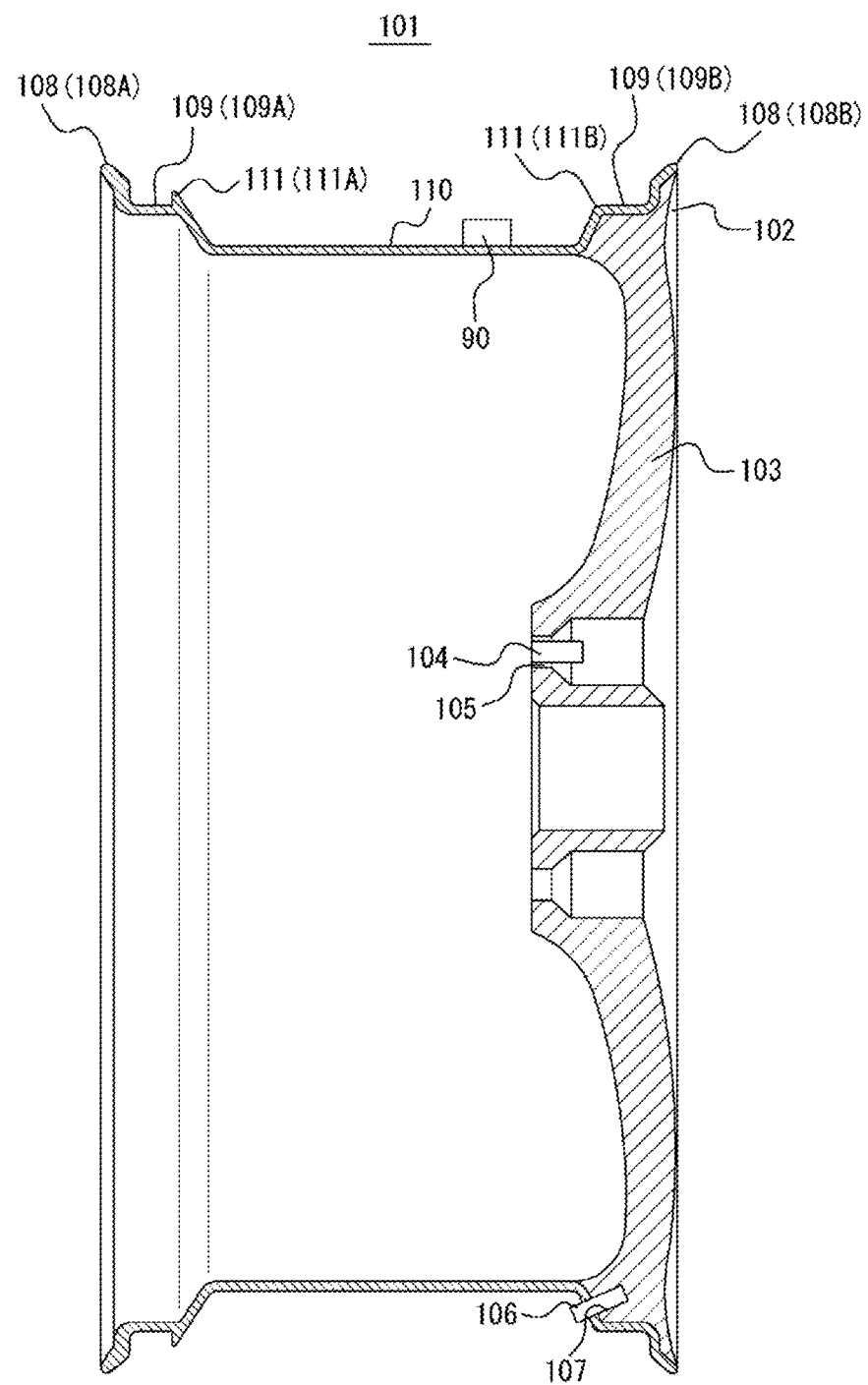
FIG. 90 is a schematic view illustrating a member of a wheel on which an antenna may be installed.

FIG. 90 is a cross-sectional view of a wheel 101 of a vehicle 100 in which the wireless communication device 90 according to one embodiment of the present disclosure may be installed. The wheel 101 may include members such as a rim 102, a disc 103, a bolt 104, a bolt hole 105, an air valve 106, and a valve hole 107. In the rim 102, from the outside in a width direction of the wheel, a pair of flanges 108 (inner flange 108A and outer flange 108B), a pair of bead seats 109 (inner bead seat 109A and outer bead seat 109B), and a well 110 may be included. The bead of the tire is mounted on the bead seat 109. The flange 108 extends from the bead seat 109 to the outside in the width direction of the wheel to support the bead of the tire from the side surface. The well 110 has a concave shape between the pair of bead seats 109 toward an inner side in a radial direction of the wheel to facilitate the attachment and detachment of the tire. Therefore, the well 110 has an inclined surface that decreases toward the inner side in the radial direction of the wheel as closer to the inner side in the width direction of the wheel, from a boundary with the bead seat 109 to a bottom surface of the well 110. The bead seat 109 may be provided with a pair of humps 111 (inner hump 111A and outer hump 111B) on the inner side in the width direction of the wheel. The hump 111 protrudes to the outside in the radial direction of the wheel to prevent the bead of the tire from falling into the well 110. The wireless communication device 90 may be installed on any member of the wheel 101 of the vehicle 100. For example, in an application for measuring air pressure of the tire, the wireless communication device 90 may be installed in a place such as the rim 102 (particularly, the well 110), the air valve 106, the valve hole 107, or the like, which is located inside the tire when the tire is mounted.

Figure 91:
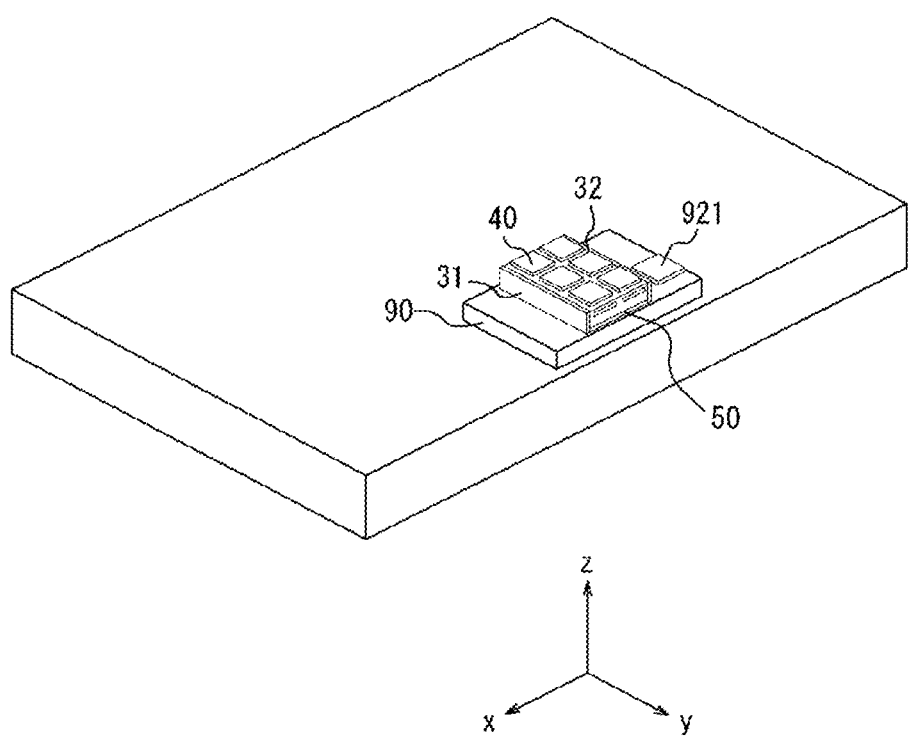
FIG. 91 is a schematic view illustrating one embodiment of a member on which a wireless communication device is installed.

FIG. 91 illustrates the wireless communication device 90 installed on an installation surface of the wheel 101. As described above with reference to FIG. 82, the wireless communication device 90 includes the antenna. Specifically, the antenna includes a first conductor 31, a second conductor 32, one or more third conductors 40, a fourth conductor 50, and a feeding line. The first conductor 31 and the second conductor 32 face each other in the first axis (the x direction in FIG. 91). One or more third conductors 40 are located between the first conductor 31 and the second conductor 32, and extend in the first axis. The fourth conductor 50 is connected to the first conductor 31 and the second conductor 32 and extends in the first axis. The feeding line is electromagnetically connected to the third conductor 40. The first conductor 31 and the second conductor 32 are capacitively connected via the third conductor 40. A surface of the fourth conductor 50 is installed so as to face the installation surface of the wheel 101 in the second axis (the z direction in FIG. 91) perpendicular to the first axis.

The wireless communication device 90 may be installed at a predetermined position according to the shape of the member on which the wireless communication device 90 is installed. When the wireless communication device 90 is installed on a wide member as illustrated in FIG. 91, the wireless communication device 90 may be installed on an end of the member. The wireless communication device 90 is installed such that the first axis (the x direction in FIG. 91) in which the first conductor 31 and the second conductor 32 face each other is substantially parallel to an outer peripheral line of the member. As a result, intensity of transmission and reception of electromagnetic waves by the antenna having the above-described configuration of the wireless communication device 90 is improved, and a communication quality is improved.

Figure 92:
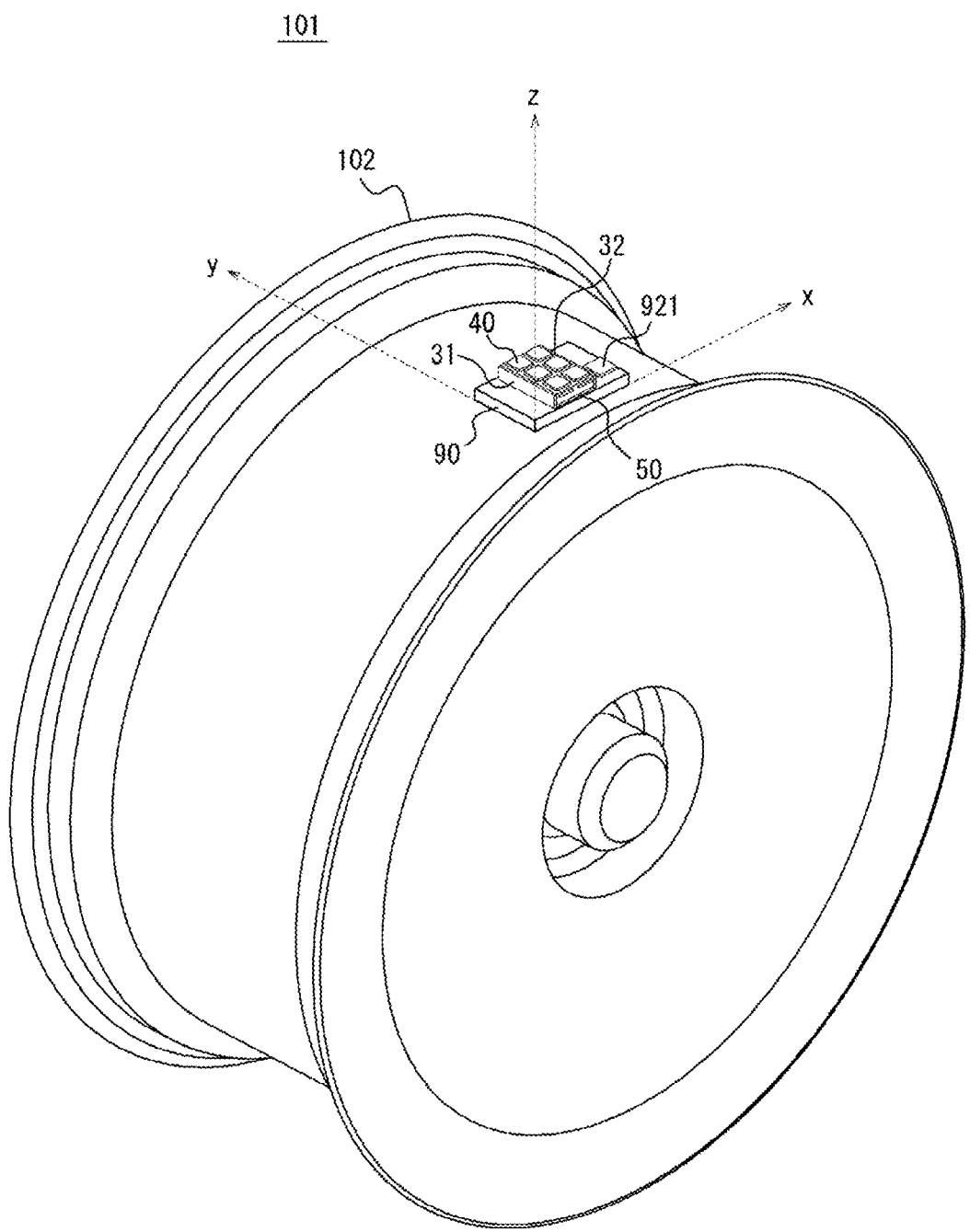
FIG. 92 is a schematic view illustrating one embodiment of a wheel on which the wireless communication device is installed.

As illustrated in FIG. 92, in the application for measuring the air pressure of the tire, the wireless communication device 90 may be installed on an outer peripheral surface of the rim 102 facing the inside of the tire when the tire is mounted. When the wireless communication device 90 is installed on the outer peripheral surface of the rim 102, the first axis (the x direction in FIG. 92) may be installed so as to be substantially parallel to the direction of the outer peripheral line of the rim 102, that is, a circumferential direction of the wheel 101.

As described above, when the rim 102 of the wheel 101 has the well 110 having a concave shape on the inner side in the radial direction of the wheel 101, the wireless communication device 90 may be installed on the inclined surface of the well 110. When the wireless communication device 90 is installed on the inclined surface of the well 110, the first axis (the x direction in FIG. 92) may be installed so as to be substantially parallel to the circumferential direction of the wheel 101. As illustrated in FIG. 93, when the wheel 101 is installed in the vehicle 100, the wireless communication device 90 may be installed so as to be located on the inclined surface of the well 110 on the outer side in the width direction of the vehicle 100. As a result, since the antenna is directed toward another wireless communication device 200 installed in the vehicle 100, the intensity of transmission and reception of electromagnetic waves with another wireless communication device 200 is improved and the communication quality is improved. The wireless communication device 90 may be installed on the inclined surface of the well 110 located inside the vehicle 100 in the width direction so that the antenna faces the outside of the vehicle.

The wireless communication device 90 may further include a battery 91 that supplies power to the antenna. A pole terminal of the battery 91 is electrically connected to the fourth conductor 50. As a result, the wireless communication device 90 can operate without being supplied with the power from the outside. In FIG. 82, the antenna and the battery are installed separately on the same case, but the antenna and the battery may be installed so that at least a part thereof overlaps in the second axis. In this case, the surface of the fourth conductor 50 of the antenna is installed so as to face an installation surface of the battery 91 in the second axis. As a result, a surface integral of the case of the wireless communication device 90 can be reduced. On the other hand, the battery 91 is also a conductor, but due to the characteristics of the antenna described above, the antenna is unlikely to be affected by the battery 91 when radiating the electromagnetic waves.

The wireless communication device 90 may further include a sensor 92 and a controller 94. The controller 94 transmits a signal from the antenna based on information detected by the sensor 92. The controller 94 of the wireless communication device 90 acquires the information detected by the sensor 92. The controller 94 generates a transmission signal based on the information detected by the sensor 92. After that, the controller 94 transmits the transmission signal from the antenna to another wireless communication device. In generating the transmit signal, the controller 94 may convert all or a part of the information detected by the sensor 92 into the transmission signal. The controller 94 may perform predetermined arithmetic processing on the information detected by the sensor 92 and convert the result into the transmission signal. The controller 94 may calculate, for example, an average or a sum of data measured by the sensor 92 during a predetermined time, and convert the average or the sum into the transmission signal.

In the application for measuring the air pressure of the tire, the sensor 92 included in the wireless communication device 90 described above may be an air pressure sensor 921.

The wireless communication module 80 is communicatively connected to the sensor 92. The controller 94 may be capable of transmitting the information detected by the sensor 92 from the first antenna 60 included in the wireless communication module 80. The wireless communication module 80 may be separate from the sensor 92 and the controller 94. In this case, the wireless communication module 80 including the first antenna 60 may be directly installed on a member of the vehicle, and the other configuration of the wireless communication device 90 and the wireless communication module 80 may be connected by a signal line.

(Tire Pressure Monitoring System)

A tire pressure monitoring system 300 using the wireless communication device 90 installed on the wheel 101 of the vehicle 100 according to one embodiment of the present disclosure will be described below.

As illustrated in FIG. 89, the tire pressure monitoring system 300 includes the first wireless communication device 90 which is the wireless communication device 90 installed on the wheel 101 of the vehicle 100 described above. The tire pressure monitoring system 300 includes a second wireless communication device 200. The second wireless communication device 200 may be installed in the same vehicle 100 as the first wireless communication device 90. The first wireless communication device 90 has an air pressure sensor 921 as the sensor 92. The first wireless communication device 90 transmits a signal from the antenna to the second wireless communication device 200 based on the information detected by the air pressure sensor 921 of the first wireless communication device 90. The second wireless communication device 200 controls the vehicle 100 based on the signal received from the first wireless communication device 90.

The second wireless communication device 200 may be installed in any place. The second wireless communication device 200 may be installed at the center position of a plurality of wheels 101 attached to the vehicle 100. For example, the second wireless communication device 200 may be installed in the vicinity of the member of the vehicle 100 to be controlled, and be communicatively connected to a member to be controlled by wire, as described later. The second wireless communication device 200 may be a mobile terminal installed outside the vehicle 100, another vehicle, a server, a satellite, a traffic light, or the like. The second wireless communication device 200 receives the signal transmitted by the first wireless communication device 90.

The second wireless communication device 200 may control the vehicle 100 based on the signal received from the first wireless communication device 90. For example, the control of the vehicle 100 may include control related to traveling of the vehicle 100, such as acceleration, deceleration, stop, and steering of the vehicle 100. The control of the vehicle 100 may include control of functions provided by the vehicle 100, such as displaying information on a front panel, outputting sound from a speaker, turning on and off a light, starting and stopping wipers and defrosters, adjusting a temperature of an air conditioner, locking and unlocking a door lock, and turning on and off of interior lights.

The second wireless communication device 200 may transmit a signal for checking an operation to the first wireless communication device 90 when the vehicle 100 is started. For example, upon receiving an instruction to start the vehicle 100 based on a user operation or the like, the second wireless communication device 200 transmits the signal for checking the operation to the first wireless communication device 90. The second wireless communication device 200 may determine whether an operating state of the first wireless communication device 90 is normal based on a response to the operation check from the first wireless communication device 90. When it is determined that the operating state of the first wireless communication device 90 is normal, the second wireless communication device 200 may start the vehicle 100. With this configuration, the abnormality of the wireless communication device 90 can be detected before the vehicle 100 is started, and safety of the vehicle 100 during operation is improved.

The second wireless communication device 200 may include an arbitrary antenna. For example, when installed on a member of a conductor such as metal of the vehicle 100, the second wireless communication device 200 may also include an antenna having the same configuration as the first wireless communication device 90.

An example in which the air pressure of the tire is monitored by the tire pressure monitoring system 300 according to one embodiment of the present disclosure will be described. The tire pressure monitoring system 300 includes the first wireless communication device 90 and the second wireless communication device 200. The first wireless communication device 90 may include an air pressure sensor 921 to measure the air pressure of the tire attached to the wheel 101. In this case, the first wireless communication device 90 is installed on each of the plurality of wheels 101 of the vehicle 100. The first wireless communication device 90 determines whether or not a value acquired by the air pressure sensor 921 is equal to or greater than a preset air pressure threshold value. When it is determined that the acquired value does not reach the threshold value of the air pressure, the wireless communication device 90 transmits the information such as the air pressure acquired by the air pressure sensor 921 to the second wireless communication device 200. When the second wireless communication device 200 receives the signal, the second wireless communication device 200 may turn on a sign indicating that the air pressure is insufficient on the front panel in front of the driver's seat. Therefore, the second wireless communication device 200 may be installed on a dash panel located near the front panel. When the sign is displayed on the front panel, the user injects air into the tire or replaces the tire. When it is determined that the value acquired by the air pressure sensor 921 is equal to or greater than the air pressure threshold value, the first wireless communication device 90 does not transmit the information such as the current air pressure to the second wireless communication device 200. As a result, the second wireless communication device 200 turns off the sign turned on the front panel.

The application of the tire pressure monitoring system 300 according to one embodiment of the present disclosure is not limited to the tire pressure monitoring. The wireless communication device 90 may include a plurality of sensors 92. For example, the wireless communication device 90 may include a temperature sensor together with the air pressure sensor 921. As a result, the wireless communication device 90 can detect temperature information of the tire. Therefore, the tire pressure monitoring system 300 may be used to monitor a tire condition such as a tire wear condition based on the air pressure and temperature information of the tire.

Similarly, the wireless communication device 90 may include a gyro sensor. As a result, the wireless communication device 90 can detect information on the number of revolution of the wheel 101. Therefore, the tire pressure monitoring system 300 may be used to monitor a speed per hour, a traveling distance, and the like of the vehicle 100 based on the information on the number of revolution of the wheel 101.

As described above, the antenna according to one embodiment of the present disclosure is installed on the installation surface of the wheel 101. The antenna includes a first conductor 31, a second conductor 32, one or more third conductors 40, a fourth conductor 50, and a feeding line. The first conductor 31 and the second conductor 32 face each other in the first axis. One or more third conductors 40 are located between the first conductor 31 and the second conductor 32, and extend in the first axis. The fourth conductor 50 is connected to the first conductor 31 and the second conductor 32 and extends in the first axis. The feeding line is electromagnetically connected to the third conductor 40. The first conductor 31 and the second conductor 32 are capacitively connected via the third conductor 40. A surface of the fourth conductor 50 faces the installation surface of the wheel 101 in the second axis perpendicular to the first axis. The antenna having such a configuration serves as an artificial magnetic conductor having a ground conductor. As a result, even when the antenna is installed on a conductor such as metal, the antenna is unlikely to be affected by the conductor when radiating electromagnetic waves. Therefore, the intensity of transmission and reception of electromagnetic waves by the antenna is improved, and the communication quality is improved. By installing the antenna on the wheel 101, shocks and vibrations that the antenna receives during operation of the vehicle 100 are reduced. Therefore, it is possible to prevent the occurrence of antenna failure and fault. In this way, the usefulness of the wireless communication technology using the antenna installed on the conductive member such as the metal of the wheel 101 is improved.

The installation surface of the wheel 101 on which the antenna according to one embodiment of the present disclosure is installed is the outer peripheral surface of the rim 102. The first axis is substantially parallel to the circumferential direction of the wheel 101. As a result, the intensity of transmission and reception of electromagnetic waves by the antenna is improved, and the communication quality is improved.

The rim 102 of the wheel 101 on which the antenna according to one embodiment of the present disclosure is installed has a well 110 having a concave shape in the inner side in the radial direction of the wheel 101. The installation surface of the wheel 101 on which the antenna is installed is the inclined surface of the well 110. The first axis is substantially parallel to the circumferential direction of the wheel 101. As a result, the intensity of transmission and reception of electromagnetic waves by the antenna is improved, and the communication quality is improved.

The wireless communication device 90 according to one embodiment of the present disclosure is installed on the installation surface of the wheel 101. The wireless communication device 90 includes the antenna described above. The wireless communication device 90 further includes a battery 91 that supplies power to the antenna. At least a part of the antenna and the battery 91 overlap in the second axis. As a result, the surface integral of the installation surface of the wireless communication device 90 can be reduced. Therefore, the usefulness of the wireless communication device 90 installed on the wheel 101 is improved.

The wireless communication device 90 according to one embodiment of the present disclosure further includes a sensor 92 and a controller 94. The controller 94 transmits a signal from the antenna based on information detected by the sensor 92. By installing the wireless communication device 90 on the wheel 101, shocks and vibrations that the sensor 92 receives during operation of the vehicle 100 are reduced. Therefore, an accuracy of information detection by the sensor 92 is improved. As a result, the usefulness of the wireless communication device 90 installed on the member of the vehicle is improved.

The sensor 92 of the wireless communication device 90 according to one embodiment of the present disclosure is an air pressure sensor. As a result, the air pressure of the tire installed on the wheel 101 can be detected, and the information on the air pressure of the tire can be wirelessly transmitted to the outside.

The configuration according to the present disclosure is not limited to the embodiments described above, and various modifications or changes can be made. For example, the functions and the like included in each component can be rearranged so as not to logically contradict each other, and a plurality of components can be combined into one or divided.

For example, in the above-described embodiment, the example in which the antenna or the wireless communication device is installed on the surface of the wheel or the member of the wheel is illustrated. However, the antenna or the wireless communication device does not necessarily need to be installed on the surface of the wheel or the member of the wheel. For example, the antenna or the wireless communication device may be included as a part of the wheel or the member of the wheel such that the antenna is located on the surface of the wheel.

The diagrams illustrating the configuration according to the present disclosure are schematic. The dimensional ratios and the like on the drawings do not always match the actual ones.

In the present disclosure, descriptions such as "first", "second", and "third" are examples of identifiers for distinguishing the configuration. The configurations distinguished by the descriptions such as "first" and "second" in the present disclosure can exchange the numbers in the configurations. For example, the first frequency can exchange the identifiers "first" and "second" with the second frequency. The exchange of identifiers is done simultaneously. Even after exchanging the identifiers, the configurations are distinguished. The identifier may be deleted. The configuration in which the identifier is deleted is distinguished by a code. For example, the first conductor 31 can be the conductor 31. Based on only the description of the identifiers such as "first" and "second" in the present disclosure, it should not be used to interpret the order of configuration, the basis for the existence of small numbered identifiers, or the basis for the existence of large numbered identifiers. The present disclosure includes the configuration in which the second conductive layer 42 has the second unit slot 422, but the first conductive layer 41 does not have the first unit slot.

The invention claimed is:

1. An antenna installed on an installation surface of a wheel, the antenna comprising:
   a first conductor and a second conductor that face each other in a first axis;
   a third conductor that is located between the first conductor and the second conductor and extends in the first axis, wherein at least one of the first conductor and the second conductor is in direct physical contact with the third conductor;
   a fourth conductor that is connected to the first conductor and the second conductor and extends in the first axis; and
   a feeding line that is electromagnetically connected to the third conductor, wherein the first conductor and the second conductor are capacitively connected via the third conductor,
   a surface of the fourth conductor faces the installation surface of the wheel in a second axis perpendicular to the first axis, and
   the third conductor includes
      a first conductive layer extending along a first plane perpendicular to the second axis, and
      a second conductive layer extending along a second plane perpendicular to the second axis.

2. The antenna according to claim 1, wherein
   the installation surface of the wheel is an outer peripheral surface of a rim, and
   the first axis is substantially parallel to a circumferential direction of the wheel.

3. The antenna according to claim 1, wherein
   a rim of the wheel includes a well having a concave shape in an inner side in a radial direction of the wheel,
   the installation surface of the wheel is an inclined surface of the well, and
   the first axis is substantially parallel to a circumferential direction of the wheel.

4. The antenna according to claim 1, wherein
   the first conductive layer is in direct physical contact with at least one of the first conductor and the second conductor, and
   the second conductive layer is not in direct physical contact with the first conductor and is not in direct physical contact with the second conductor.

5. The antenna according to claim 1, wherein
   the first conductive layer is not in direct physical contact with the first conductor and is not in direct physical contact with the second conductor, and
   the second conductive layer is in direct physical contact with at least one of the first conductor and the second conductor.

6. The antenna according to claim 1, wherein the third conductor includes
   the first conductive layer is in direct physical contact with at least one of the first conductor and the second conductor, and
   the second conductive layer is in direct physical contact with at least one of the first conductor and the second conductor.

7. The antenna according to claim 1, wherein the third conductor is configured to resonate such that a phase difference between an incident wave and a reflected wave is −90 degrees to +90 degrees in an operating frequency band.

8. The antenna according to claim 1, wherein the third conductor is configured to resonate such that a phase difference between an incident wave and a reflected wave at an operating frequency is 0 degrees.

9. The antenna according to claim 1, wherein the third conductor includes a unit resonator, the unit resonator including at least one of a resonator slot, a resonator patch, or a resonator line.

10. The antenna according to claim 1, wherein
    the first conductive layer includes at least one first unit resonator, and
    the second conductive layer includes a plurality of second unit resonators,
    wherein the at least one first unit resonator overlaps each second unit resonator of the plurality of second unit resonators.

11. A wireless communication device installed on an installation surface of a wheel, the wireless communication device comprising:
    an antenna, wherein
    the antenna includes
       a first conductor and a second conductor that face each other in a first axis,
       a third conductor that is located between the first conductor and the second conductor and extends in the first axis, wherein at least one of the first conductor and the second conductor is in direct physical contact with the third conductor,
       a fourth conductor that is connected to the first conductor and the second conductor and extends in the first axis, and
       a feeding line that is electromagnetically connected to the third conductor, the first conductor and the second conductor are capacitively connected via the third conductor,
    a surface of the fourth conductor faces the installation surface of the wheel in a second axis perpendicular to the first axis, and
    the third conductor includes
       a first conductive layer extending along a first plane perpendicular to the second axis, and
       a second conductive layer extending along a second plane perpendicular to the second axis.

12. The wireless communication device according to claim 11, further comprising
    a battery configured to supply power to the antenna, wherein
    the antenna and the battery at least partially overlap each other in the second axis.

13. The wireless communication device according to claim 11, further comprising
    a sensor and a controller, wherein
    the controller is configured to transmit a signal from the antenna based on information detected by the sensor.

14. The wireless communication device according to claim 13, wherein
    the sensor is an air pressure sensor.

15. A wheel comprising
    an antenna, wherein
    the antenna includes
       a first conductor and a second conductor that face each other in a first axis,
       a third conductor that is located between the first conductor and the second conductor and extends in the first axis, wherein at least one of the first conductor and the second conductor is in direct physical contact with the third conductor,
       a fourth conductor that is connected to the first conductor and the second conductor and extends in the first axis, and a feeding line that is electromagnetically connected to the third conductor, the first conductor and the second conductor are capacitively connected via the third conductor, a surface of the fourth conductor faces the installation surface of the wheel in a second axis perpendicular to the first axis, and the third conductor includes
- a first conductive layer extending along a first plane perpendicular to the second axis, and
- a second conductive layer extending along a second plane perpendicular to the second axis.

16. A tire pressure monitoring system comprising:

a first wireless communication device installed on an installation surface of a wheel; and a second wireless communication device, wherein the first wireless communication device includes an antenna and an air pressure sensor, wherein the antenna includes
- a first conductor and a second conductor that face each other in a first axis,
- a third conductor that is located between the first conductor and the second conductor and extends in the first axis, wherein at least one of the first conductor and the second conductor is in direct physical contact with the third conductor,
- a fourth conductor that is connected to the first conductor and the second conductor and extends in the first axis, and
- a feeding line that is electromagnetically connected to the third conductor, the first conductor and the second conductor are capacitively connected via the third conductor, a surface of the fourth conductor faces the installation surface of the wheel in a second axis perpendicular to the first axis, the first wireless communication device is configured to transmit a signal from the antenna to the second wireless communication device based on information detected by the air pressure sensor, and the third conductor includes
- a first conductive layer extending along a first plane perpendicular to the second axis, and
- a second conductive layer extending along a second plane perpendicular to the second axis.

17. A vehicle comprising:

a first wireless communication device installed on an installation surface of a wheel; and a second wireless communication device, wherein the first wireless communication device includes an antenna and an air pressure sensor, the antenna includes
- a first conductor and a second conductor that face each other in a first axis,
- a third conductor that is located between the first conductor and the second conductor and extends in the first axis, wherein at least one of the first conductor and the second conductor is in direct physical contact with the third conductor,
- a fourth conductor that is connected to the first conductor and the second conductor and extends in the first axis, and
- a feeding line that is electromagnetically connected to the third conductor, the first conductor and the second conductor are capacitively connected via the third conductor, a surface of the fourth conductor faces the installation surface of the wheel in a second axis perpendicular to the first axis, the first wireless communication device is configured to transmit a signal from the antenna to the second wireless communication device based on information detected by the air pressure sensor, and the third conductor includes
- a first conductive layer extending along a first plane perpendicular to the second axis, and
- a second conductive layer extending along a second plane perpendicular to the second axis.

\* \* \* \* \*